US006657614B1

(12) United States Patent
Ito et al.

(10) Patent No.: US 6,657,614 B1
(45) Date of Patent: Dec. 2, 2003

(54) DETECTING APPARATUS, INPUT APPARATUS, POINTING DEVICE, INDIVIDUAL IDENTIFICATION APPARATUS, AND RECORDING MEDIUM

(75) Inventors: Kensuke Ito, Nakai-Machi (JP); Kaoru Yasukawa, Nakai-Machi (JP); Hajime Sugino, Nakai-Machi (JP); Tadashi Shimizu, Nakai-Machi (JP); Katsura Sakai, Nakai-Machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/551,648

(22) Filed: Apr. 18, 2000

(30) Foreign Application Priority Data

Apr. 21, 1999 (JP) .......................................... 11-113215

(51) Int. Cl.$^7$ ................................................ G09G 5/00
(52) U.S. Cl. ................. 345/168; 340/407.1; 340/407.2; 341/22; 708/142
(58) Field of Search ...................... 29/25.42; 178/18.05; 345/173, 175, 168; 340/407.2, 407.1; 382/115; 341/22; 708/142

(56) References Cited

U.S. PATENT DOCUMENTS

| 4,731,694 A | * | 3/1988 | Grabner et al. ............ 29/25.42 |
| 5,159,159 A | * | 10/1992 | Asher ....................... 178/18.05 |
| 5,907,375 A | * | 5/1999 | Nishikawa et al. ........... 345/173 |
| 6,337,918 B1 | * | 1/2002 | Holehan ..................... 345/175 |
| 6,421,453 B1 | * | 7/2002 | Kanevsky et al. ............ 382/115 |

FOREIGN PATENT DOCUMENTS

| JP | A-10-269182 | 10/1988 |
| JP | A-6-266829 | 9/1994 |

* cited by examiner

Primary Examiner—Steven Saras
Assistant Examiner—Srilakshmi K. Kumar
(74) Attorney, Agent, or Firm—Oliff & Berridge, PLC

(57) ABSTRACT

The present invention provides a detection apparatus, an input apparatus, an individual identification apparatus, and a recording medium that utilize information about users' bodies which disables the fraud of impersonating authorized users and is extremely difficult to forge and is obtained without giving the users a sense of inhibitions, without restraining their bodies during use, and independent of their mental states and health. A FIFO memory outputs, as one set of features, a total of 60 voltage values, which are broken down as 20 voltage values sampled every 12.5 ms (80 Hz) before the instant when timing is inputted at the peak position of an amplitude waveform signal generated by one click operation, 39 voltage values sampled every 12.5 ms after the instant, and a voltage value at the peak, and a CPU calculates a feature vector and a feature matrix for individual registration, stores them as personal data in a RAM, and identifies one set of features newly inputted, based on the personal data stored in the RAM.

50 Claims, 36 Drawing Sheets

CHANGES OF FINGER CONTACT AREA AT BUTTON INSPECTION

SHAPE OF FINGER
CONTACT SECTION

CHANGES IN FINGER CONTACT
AREA WITH RESPECT TO TIME

CHANGES IN BUTTON PRESSING
AMOUNT WITH RESPECT TO TIME

RELATIONSHIP BETWEEN BUTTON PRESSING
AMOUNT AND FINGER CONTACT AREA

CHANGES IN VOLTAGE BETWEEN TWO
RESISTANCE ELEMENT LAYERS DURING
SINGLE CLICKING

CHANGES IN VOLTAGE BETWEEN TWO
RESISTANCE ELEMENT LAYERS DURING
DOUBLE CLICKING

EXAMPLE OF
SINGLE CLICK WAVEFORM

EXAMPLE OF
DOUBLE CLICK WAVEFORM

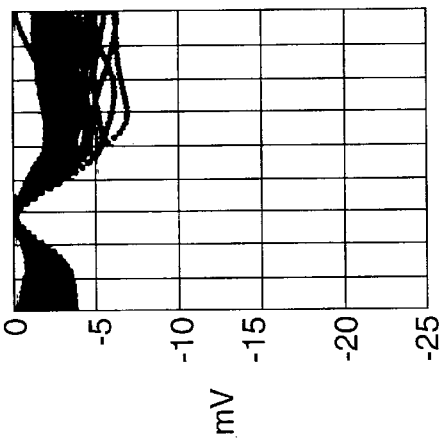
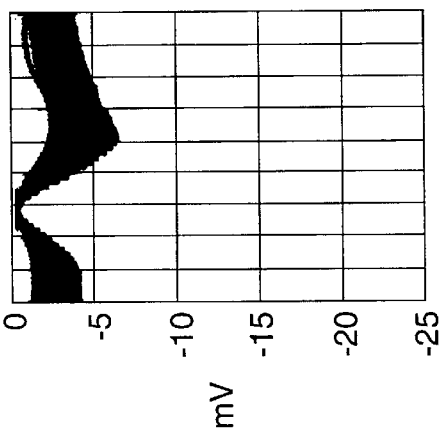
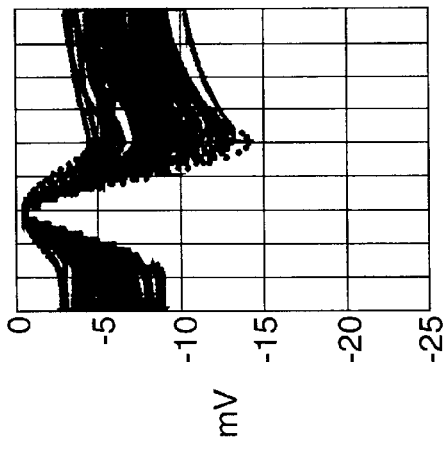
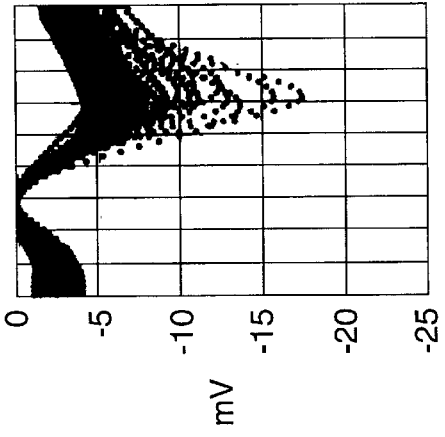
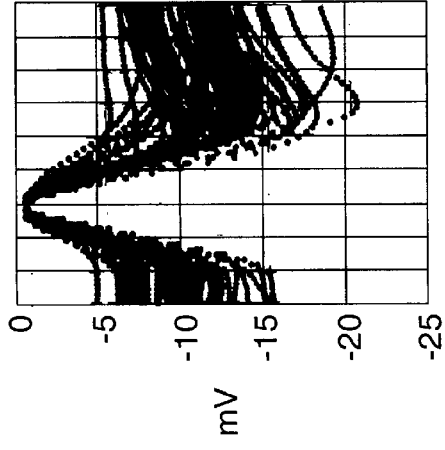

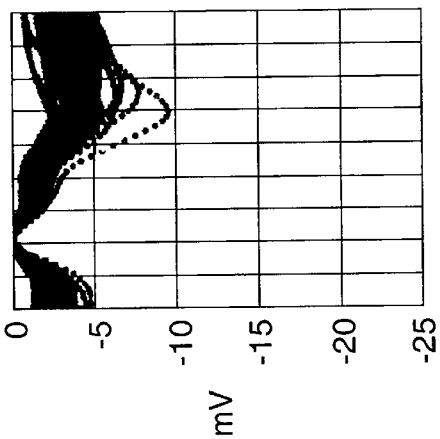
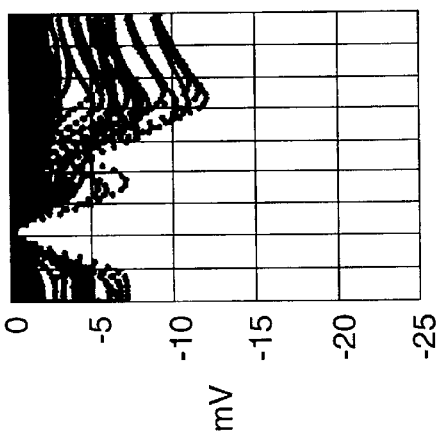
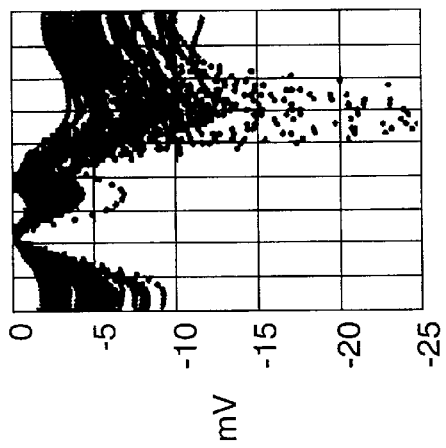
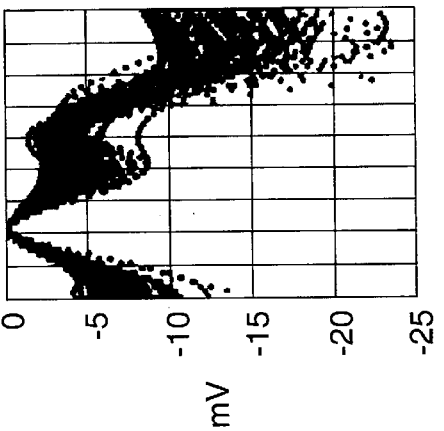
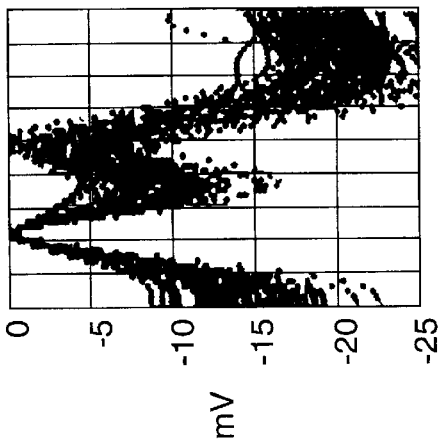

FIRST
STRAIN
GAUGE
78a

SECOND
STRAIN
GAUGE
78b

THIRD
STRAIN
GAUGE
78c

FOURTH
STRAIN
GAUGE
78d

DETECTING APPARATUS, INPUT APPARATUS, POINTING DEVICE, INDIVIDUAL IDENTIFICATION APPARATUS, AND RECORDING MEDIUM

BACKGROUND OF THE INVENTION

1. Field of the Invention

The present invention relates to a detecting apparatus, an input apparatus, a pointing device, an individual identification apparatus, and a recording medium, and more particularly to a detecting apparatus, an input apparatus, a pointing device, an individual identification apparatus, and a recording medium that identify individuals by using the natural features and acquired features of their bodies as identification information.

2. Description of the Prior Art

There are conventionally known methods for identifying individuals, used with individual identification apparatuses. Some use, as keys, unchangeable features of a body such as a fingerprint, iris, retina, hand print, and face. Others use, as keys, properties changing with time, such as a voiceprint and signature.

Generally, to use the features of a body such as a fingerprint, iris, retina, hand print, and face as keys, they are in advance measured by a digital camera or the like, and it is determined whether those thus measured match those registered. This is also true for information changing with time, such as a voiceprint and signature; inputted audio information and text information are digitized, and it is determined whether the digitized information matches registered digital information.

In "USER AUTHENTICATION METHOD AND USER AUTHENTICATION SYSTEM" disclosed in Japanese Published Unexamined Patent Application No. Hei 10-269182, a system is proposed which uses the peculiarities of operations of keyboard and mouse buttons to identify individuals with high accuracy. The Japanese Published Unexamined Patent Application No. Hei 10-269182 proposes identifying individuals by patterns obtained based on the peculiarities of operations of keyboard and mouse buttons.

Specifically, in the Japanese Published Unexamined Patent Application No. Hei 10-269182, when a predetermined password is entered, the timings of turning on and off a keyboard are measured, and when mouse buttons are clicked plural times, on/off timings are measured. The obtained timings are converted to binary values to create patterns, which are stored as personal information. An inputted pattern and registered timing patterns are compared to identify individuals.

The method of using the peculiarities of keyboard operations for individual identification is used in, e.g., BIOPASS-WORD (http://www.biopassword.com.). Anotherproposedmethodfor identifying individualsuses individual walking patterns.

By the way, it is generally performed in a computer's access management or the like that the individual identification method as described above is used for user identification at first log-in or connection to a network to determine whether a user is a registered principal or one of plural registered persons.

However, the above-described method used for a computer's access management cannot prevent the fraud of impersonating authorized users. Specifically, generally, in a computer's access management, once it has been determined that a user is a registered principal or one of plural registered persons, the lock is unlocked and no subsequent check is made.

In other words, whether the features of a body such as a fingerprint, iris, retina, hand print, and face are used as keys or keyboard operation patterns are used as keys, their measurement subjects are verified only at the first log-in or at the time of connection to a network, and after the verification, they are generally not measured repeatedly.

Consequently, where a principal is away from his seat or an access right is obtained by forging the measurement subjects or other methods, the fraud could freely gain access to secret information.

Also when a voice print or signature changing with time is used, the same problem could occur because it is usually improbable for users to keep uttering their voice or using a pen for the duration of operations of a terminal such as a computer.

The above-described method for identifying individuals by using the features of abodyas keys, which has developed originally for the purpose of identifying one of a large number of candidates, is capable of identifying one of a large number of candidates. However, it is not suitable for determining that a user is a registered principal or one of plural registered persons over time.

The above-described method has a basic problem in that because of the nature of using the features of a body as keys, identification subjects corresponding to the keys are easily forged because they always become identical, so that frauds by forging cannot be completely prevented.

For example, with the method of using a fingerprint, hand print, and face, there is a highly probable risk that they are relatively easily duplicated because it uses appearances. Also with the method of using irises, since iris patterns are scanned by a camera, they could be stolen by the same method.

Although the method of using retinas is resistant to forgery, they may be stolen by some method since the method uses shapes. Voice prints may be stolen by recording them. Signatures may also be stolen since users conduct much training so as to develop constantly stable signature.

Furthermore, once these measurement subjects have been stolen or forged, since principals cannot change measurement subjects such as fingerprints, there is another problem that principals stolen cannot use the measurement subject for individual identification during their lifetime.

These methods have problems as described below. With the method of using fingerprints, users have a strong sense of mental resistance against it because of its image of criminal investigation and therefore there is a difficult problem, independent of technology, that its image must be removed to achieve widespread use. With the method of using blood vessel patterns of retinas, there is a problem in that users suffer from a mental burden because of the need to irradiate eyes with light.

The method of using face shapes lacks stability because of the need to confine postures and illumination conditions within a given range. Voice prints and signatures depend on mental states and health and lack stability. Furthermore, fingerprints, faces, and hand prints may not, in some cases, be used because of accessories such as glasses and finger rings, and appearance change due to makeup or chemical agents, contamination, and the like.

The method of identifying individuals from keyboard operation patterns is applicable only to adequately stable typing patterns such as password entry. As a matter of course, with this method, no information can be obtained from one button operation.

There is not much information that can be obtained from typing patterns alone, produced from a small number of key operations such as password entry, including a double-clicking operation, so that it is impossible to correctly distinguish many persons. Further, the method cannot be used except during specific operations such as text preparation and programming. The accuracy of the method depends greatly on factors such as the level of typing skill, mental states, and health.

As another method for identifying individuals, a method is proposed that uses individual walking patterns. This method can be used for the management of access to buildings or the like but cannot for a computer's access management.

SUMMARY OF THE INVENTION

The present invention has been made in view of the above circumstances and provides a detecting apparatus, an input apparatus, a pointing device, an individual identification apparatus, and a recording medium that use information about users' bodies, which disables the fraud of impersonating authorized users, and is extremely difficult to forge and is obtained without giving the users a sense of inhibitions, without restraining their bodies during use, and independent of their mental states and health.

According to an aspect of the present invention, the detecting apparatus has a pressed member having a side being pressed with a finger, a detector which detects a feature reflecting a change of a contact state between the finger and the side or a feature reflecting a change of a pressing state with the finger against the side.

Specifically, the movements of a finger when a pressed member (hereinafter referred to as a button) such as keyboard buttons and mouse buttons is pressed can be regarded as changes of a contact state of the finger surface with the side at movement of an approximately vertical direction of the finger with respect to the palm during button operations, that is, at vertical movement of the finger, and as changes of a pressing state such as time displacements of finger positions with respect to the button surface at vertical movement of the finger.

The finger movements depend on peculiarities (acquired features) that are different among individuals, and the size, shape, and flexibility of fingers are governed by individual differences (natural features) Therefore, individuals can be identified by detecting during keyboard typing or during mouse clicking, when a side is pressed, at least one of features reflecting changes of a contact state between a pressing finger and the side, and features reflecting changes of a pressing state of the pressing finger and the side.

According to another aspect of the present invention, the features reflecting changes of a contact state are at least one of a contact area changing with time between the finger and a side when the side is pressed, a finger shape changing with time when the side is pressed, and undulation of the finger surface changing with time when the side is pressed, and the features reflecting changes of a pressing state are at least one of pressing force changing with time when the side is pressed, a pressing amount changing with time to the side when the side is pressed, changes of stress occurring inside a subject when its side is pressed, changes of the speed of finger movement when the side is pressed, and changes of a finger movement position when the side is pressed.

A contact area between the finger and the side when it is pressed changes with time as shown in FIG. 2, for example. The contact area between the finger and a button becomes minimum ($S_1$ and $S_5$) when a finger tip lightly touches the button, increases gradually (from $t_2$ to $t_3$) in proportion to the magnitude of pressing force applied to the button after the button is pressed, and becomes maximum ($S_3$) when the magnitude of pressing force applied to the button becomes maximum ($t_3$). When the button is released, the contact area decreases gradually (from $t_3$ to $t_4$) from the maximum value and returns to standby values ($S_1$ and $S_5$) or zero. Thus, the contact area changes corresponding to the vertical movement of the finger.

The shape of the finger changing with time when the side is pressed also exhibits a similar tendency. For example, as shown in FIG. 3, when the shape of the finger contacting with the side is elliptic, a length change of the long axis l and a length change of the short axis m of the ellipse when a finger presses the side can be detected as physical amounts representing the finger shapes changing with time. In this case, more information can be obtained because the two parameters, the long axis l and the short axis m, are used. Of course, besides measuring actual measurement values themselves of the lengths of the long axis l and the short axis m, a system may be constructed to detect measurement values indirectly reflecting the lengths of the long axis l and the short axis m, such as electrical resistance measurement values by a group of linear or minute electrodes as will be described later.

The time-dependent actual measurement values themselves of undulations such as a fingerprint when the side is pressed, callosity, verruca, and wrinkle on the finger surface and measurement values reflecting the irregularities changing with time can be used as individual identification information because they exhibit the similar tendency.

Changes of pressing force given by the finger (or values reflecting changes of the pressing force) may also be measured. The same curve as that of FIG. 4 can be obtained from changes of pressing force on a contact portion between the finger and a button if the finger tip deforms linearly with respect to the pressing force. Even if not linear, the information is effective as information representing individual differences.

The amount of pressing force changing applied to the side when it is pressed can be obtained as data as shown in FIG. 5, for example. Specifically, the tilts of the curve shown in FIG. 5 indicate the movement speed of a button, the button is pressed downward as time elapses, and where it is sufficiently pressed ($t_a$, $t_3$, $t_b$), a displacement becomes zero, and then the button returns to its original position. Although the shape of the curve depends on the design of a button, even if the same button is used, since the speed and acceleration at which the button is pressed vary among persons, individuals can be identified by differences of curve shapes. It is considered that the individual differences of curve shapes are governed by peculiarities acquired when pressing buttons.

FIG. 6 is a graph of numeric representation of the relationship between button surface positions during button operations of FIG. 2, and contact areas between the button and the finger. Button surface positions, or button pressing force amounts, usually form a proportional relationship with action from the button to the finger. Accordingly, the horizontal axis y of FIG. 6 can be replaced by force acting on the finger (herein, since the position of the button at maximum pressing force is defined as a starting point of 0, acting force $F = k \cdot s(-y)$, where k is a spring constant).

The relationship between pressing force applied to the finger and a resulting change of a contact area is little influenced by time t. The tilt of the curve is governed by the elasticity of the finger. The elasticity of the finger is considered to be determined by primarily natural elements such as the shape, size, and positional relationship of skin, hypoderma, phalanx, and the like, and the mechanical natures of the respective elasticity and the like, plus acquired elements such as stimuli to the skin, and change of keratin layers due to added age. Specifically, since the acquired elements ordinarily change only a little during a short period of time, they can be used as data representing individual differences and turn into data having high identification accuracy in combination with the natural elements.

At button surface position $y_3=0$ of FIG. 6, a contact area S changes from $S_3$ to $S'_3$ (a curve indicated by a dashed line) when pressing force (hereinafter referred to as overpress) beyond a displacement amount of the button is applied. The period from $t_a$ to $t_b$ of FIG. 5 is the overpress time. In the curve of FIG. 6, only the curve shape of the overpress portion is primarily produced by differences of individual peculiarities.

The curve of FIG. 5 representing the peculiarities of button pressing operations and the overpress portion curve of FIG. 6 produce some variations for each measurement even for an identical person, while the shape of the curve except for the overpress portion changes little for an identical person so long as the position of a finger with respect to a button is stable. Any information, that is, the curve shape, can be used as identification information because it is different depending on persons, including variations for each measurement.

FIG. 4 shows the relationship between time t and contact area S. The shape of the curve, as apparent from the foregoing description, exhibits a combination of the peculiarities of button pressing speeds (FIG. 5), the peculiarities of overpress (the portion indicated by the dashed line of FIG. 6), and nature features of the finger tip (the solid line of FIG. 6). Accordingly, the curve shape is different depending on persons and can therefore be used as identification information. The dashed line portion with $S_3'$ at its peak between times $t_a$ and $t_b$ represents a route during overpressing.

Actual measurement values of changes of stress occurring inside a subject when its side is pressed, changes of the speed of finger movement when the side is pressed, and changes of a finger movement position when the side is pressed, and measurement values reflecting these changes can also be used for individual identification because they present physical amounts having the same tendency. By constructing a system so that not only these features are individually detected but also measurement values on a combination of, e.g., a contact area, finger shape, pressing force, button pressing amount, and irregularities on the finger are detected, individual identification data for accurate individual identification is obtained.

These measurement subjects, as described previously, fluctuate within a certain range and change with time because they contain movement peculiarities, unlike body portions not changing in shape such as a fingerprint, hand print, retina and iris. For this reason, information about these measurement subjects provides individual identification data that is extremely difficult to forge or replicate.

An input apparatus according to another aspect of the present invention includes a detecting apparatus set forth in the present invention.

A pointing device according to another aspect of the present invention includes an indication unit that gives indications to a connected equipment when pressing force is applied by a finger, and the indication unit is provided with a detector of a detecting apparatus set forth in the present invention.

The detector of the detecting apparatus detects at least one of features reflecting changes of a contact state between a finger and the side when it is pressed, and features reflecting changes of a pressing state of the pressing finger and the side when it is pressed, and corresponds to, e.g., a measuring part or a measured unit set forth in the present invention.

Furthermore, an individual identification apparatus according to another aspect of the present invention includes a storage part that stores at least one of features reflecting the movements of an individual's finger, and values obtained by processing the features, and an identification part that identifies individuals based on an inputted feature and storage values stored in the storage part.

Specifically, the individual identification apparatus according to another aspect of the present invention stores, as a storage value for identifying an individual, at least one of features reflecting the movements of an individual's finger, and values obtained by processing the features, and the identification part determines whether an inputted feature indicates the individual represented by the storage value.

The storage part may store a storage value of one individual or storage values of plural individuals. When the storage part stores a storage value of only one individual, or if the storage part stores storage values of plural individuals and the identification part can judge which individual an inputted feature indicates, the identification part reads one storage value from the storage part, and compares the storage value with the inputted feature to determine whether these represent one identical individual.

If the storage part stores storage values of plural individuals and the identification part cannot judge which individual an inputted feature indicates, the identification part reads all storage values from the storage part and compares all storage values and the inputted feature to determine whether a person matching the inputted feature exists in persons represented by all the storage values.

The identification part, as an example of an identification method, calculates the distance between a read storage value and an inputted feature, and judges as an identical individual if the distance is smaller than a predetermined threshold distance.

According to this method, a matching check can be made to authenticate principals simply by comparing with a threshold distance. As distances to be calculated, distances used in statistical discriminant analysis and cluster analysis, e.g., street distances, Euclidean distances, standardization Euclidean distances, Minkowski distances, Maharanobis distances, and other distances can be used (Behavior Metrics Series "Science of Truth and Falsehood" by Masakatsu Murakami, Asakura Publishing Co., Ltd., 1996). The first four types of distances are obtained as distances between waveform vectors of unknown users and registered feature vectors. Maharanobis distance $d^2_j$ can be calculated from an expression (1) below, where the average of population of k groups, $\mu_j=(\mu_{1j}, \mu_{2j}, \ldots \mu_{pj})'$ (j=1, 2, ... k)$\mu j$; an observed value, $X=(x_1, x_2, \ldots x_p)'$; a variance/covariance matrix, $\Sigma_j$; and its inverse matrix, $\Sigma_j^{-1}$.

$$d^2_j=(X-\mu_j)'\Sigma^{-1}(X-\mu_j) \tag{1}$$

Maharanobis distance $d^2_j$ is calculated from a waveform vector of an unknown user, a registered feature vector (average vector), and the inverse matrix of a feature matrix (a variance/covariance matrix or correlation matrix). Since a threshold distance may differ for each registrant, preferably it should be stored in the storage part together with the identification number of a registrant.

An individual identification apparatus according to another aspect of the present invention includes a feature extraction part that extracts features reflecting the feature of finger movements from physical amounts reflecting the movements of a finger pressing a press subject; a storage part that stores at least one of features reflecting the movements of an individual's finger, and values obtained by processing the features, and an identification part that identifies individuals based on features inputted from the feature extraction part and storage values stored in the storage part.

Specifically, in the individual identification apparatus according to another aspect of the present invention, the feature extraction part extracts features reflecting the feature of finger movements from physical amounts reflecting the movements of a finger pressing a subject to be pressed, and outputs them to the storage part or the identification part.

The storage part stores features outputted from the feature extraction part, and the identification part uses the features outputted from the feature extraction part as the inputted features and compares them with the features read from the storage part to make identification. The storage part and the identification part function like the storage part and the identification part of the individual identification apparatus according to another aspect of the present invention.

The individual identification apparatus according to another aspect of the present invention includes a detection part that detects physical amounts reflecting the movements of a finger pressing a subject to be pressed, a feature extraction part that extracts features reflecting the feature of finger movements from the detected physical amounts, a storage part that stores at least one of features reflecting the movements of an individual's finger, and values obtained by processing the features, and an identification part that identifies individuals based on the features inputted from the feature extraction part and the features stored in the storage part.

Specifically, in the individual identification apparatus according to another aspect of the present invention, the detection part detects physical amounts reflecting the movements of a finger pressing a press subject and outputs them to the feature extraction part. The feature extraction part extracts features reflecting the feature of finger movements from the physical amounts detected by the detection part and outputs them to the storage part or the identification part. The feature extraction part, the storage part, and the identification part function like the feature extraction part, the storage part, and the identification part of the individual identification apparatus according to another aspect of the present invention.

The individual identification apparatus according to another aspect of the present invention includes a device, a detecting element that detects amounts in accordance with the movements of a part of a body during an operation of the device, a storage part that stores features of plural persons in accordance with the movements of the part of the body before and after the device is operated, a temporary storage part that holds the detection amounts while updating them as required for a predetermined period of time, and an identification part that, when the device is operated, identifies individuals based on the features stored in the storage part, as well as both detection amount before the device is operated, stored in the temporary storage part, and detection amount after the device is operated.

The individual identification apparatus according to another aspect of the present invention, which includes the detection element that detects the movements of a part of a body such as the movements of a finger and the movements of an arm immediately before and after the device is operated, identifies individuals based on features detected in accordance with the movements of the part of the body immediately before the device is operated, and features detected in accordance with the movements of the part of the body immediately after the device is operated, so that features containing information about the movements of the part of a person and other information are obtained, providing much greater accuracy for individual identification.

The individual identification apparatus according to another aspect of the present invention performs processing based on a recording medium recording a program that reads a storage value from the storage part that stores at least one of features reflecting the movements of an individual's finger and values obtained by processing the features, and identifies individuals based on an inputted feature and the read storage value.

The individual identification apparatus according to another aspect of the present invention may perform processing based on a recording medium recording a program that identifies individuals based on features of plural persons, stored in the storage part, in accordance with the movements of a part of a body before and after the device or switch is operated; and detection amounts before the device is operated, and detection amounts after the device is operated, stored in the temporary storage part that stores detection values in accordance with the movements of the part of individual bodies while updating them as required for a predetermined period of time. The recording medium is recorded in a predetermined recording area.

BRIEF DESCRIPTION OF THE DRAWINGS

Preferred embodiments of the present invention will be described in detail based on the followings, wherein:

FIG. 13 graphically shows 100 sets of features when single clicking was performed 100 times by an identical person;

FIG. 14 graphically shows 100 sets of features when double clicking was performed 100 times by an identical person;

DESCRIPTION OF THE PREFERRED EMBODIMENTS

Embodiments of the present invention will be described in detail with reference to FIGS. 1 to 45. In the embodiments, an individual identification apparatus of the present invention is applied as an individual identification apparatus incorporated in a personal computer. The personal computer is provided with an identification part for identifying individuals, and a mouse 11 corresponding to an input apparatus of the present invention is provided with a measurement sensor 10 (described in detail later) corresponding to a measurement unit of the input apparatus. When the mouse 11 is clicked, the identification part within the personal computer identifies an individual based on data obtained by the measurement sensor 10 electrically, optically, or mechanically detecting the feature of finger movements.

First Embodiment

The individual identification apparatus of a first embodiment detects changes of electrical resistance to obtain individual identification information reflecting finger movements, a sort of body movement. The individual identification apparatus of this embodiment is constructed to detect the physical amounts by using a material, disposed on a mouse button (a side), that changes in electrical resistance in accordance with changes of a contact area between a finger and the side.

Changes of electrical resistance are reflected by changes of a contact area and changes of contact pressure between a finger and an electrode disposed on the button or inside it, or changes of finger conductivity by sweat in the case of a construction in which the electrode and the finger in contact with each other. Information about changes of a contact area and changes of contact pressure contains both acquired peculiarities such as a force and a speed during button pressing, and natural individual differences such as the softness and shape of a finger. A sweat state reflects individual differences and a mental state at a particular time.

Figure 1:
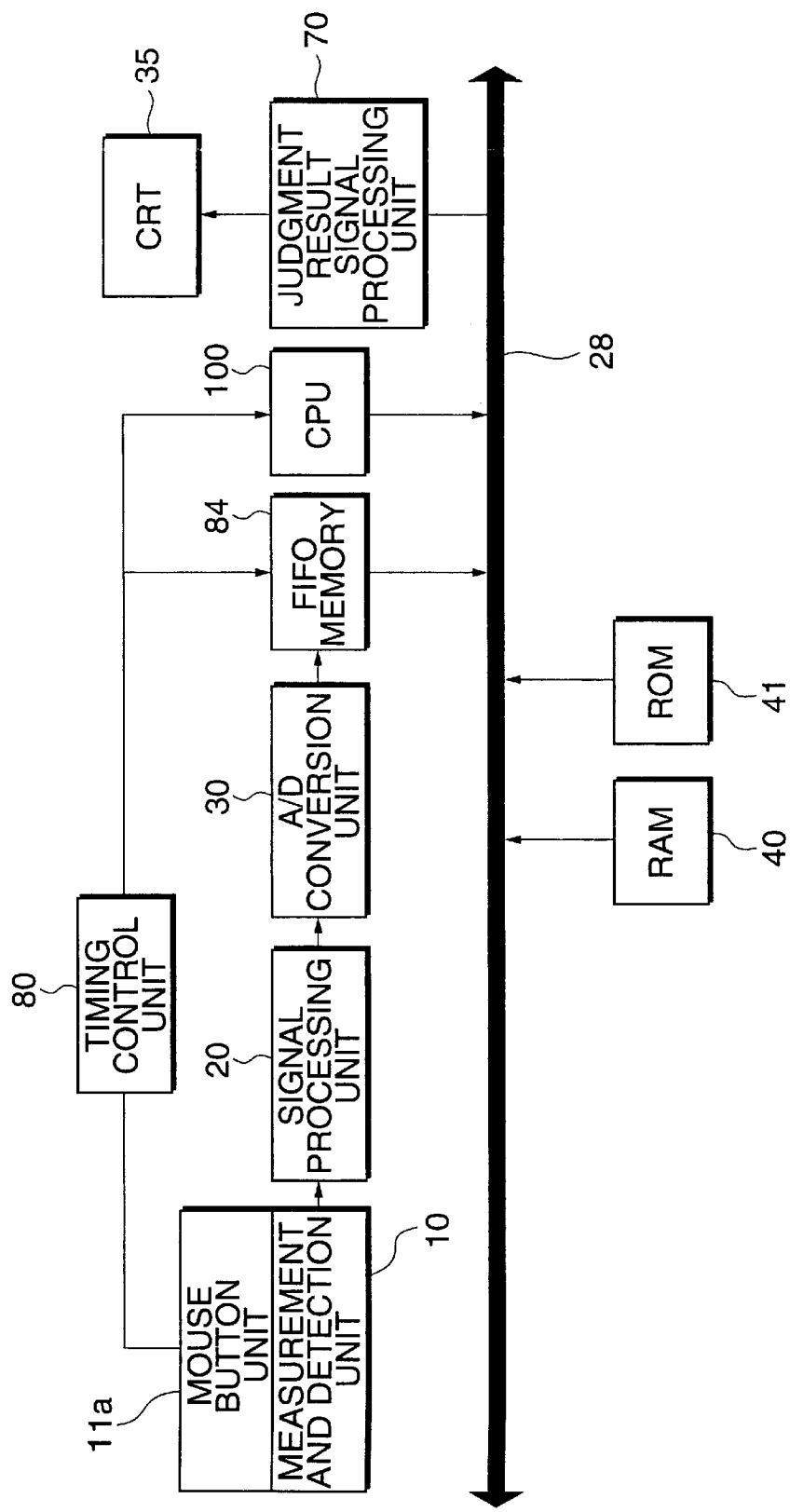
FIG. 1 is a block diagram showing a schematic configuration of a first embodiment of the present invention.

As shown in FIG. 1, in the individual identification apparatus of the first embodiment, in outline, a measurement and detection unit 10, a signal processing unit 20, an A/D conversion unit 30, and a FIFO (First In First Out) memory 84 are connected in series, and the FIFO memory 84, RAM 40, ROM 41, a judgment result signal output unit 70, and CPU (control part) 100 are connected through a bus 28. A timing control unit 80 is connected to the FIFO memory 84 and the CPU 100, and the timing control unit 80 detects an output timing signal of a mouse button unit and outputs it to the FIFO memory 84 and the CPU 100.

Figure 7:
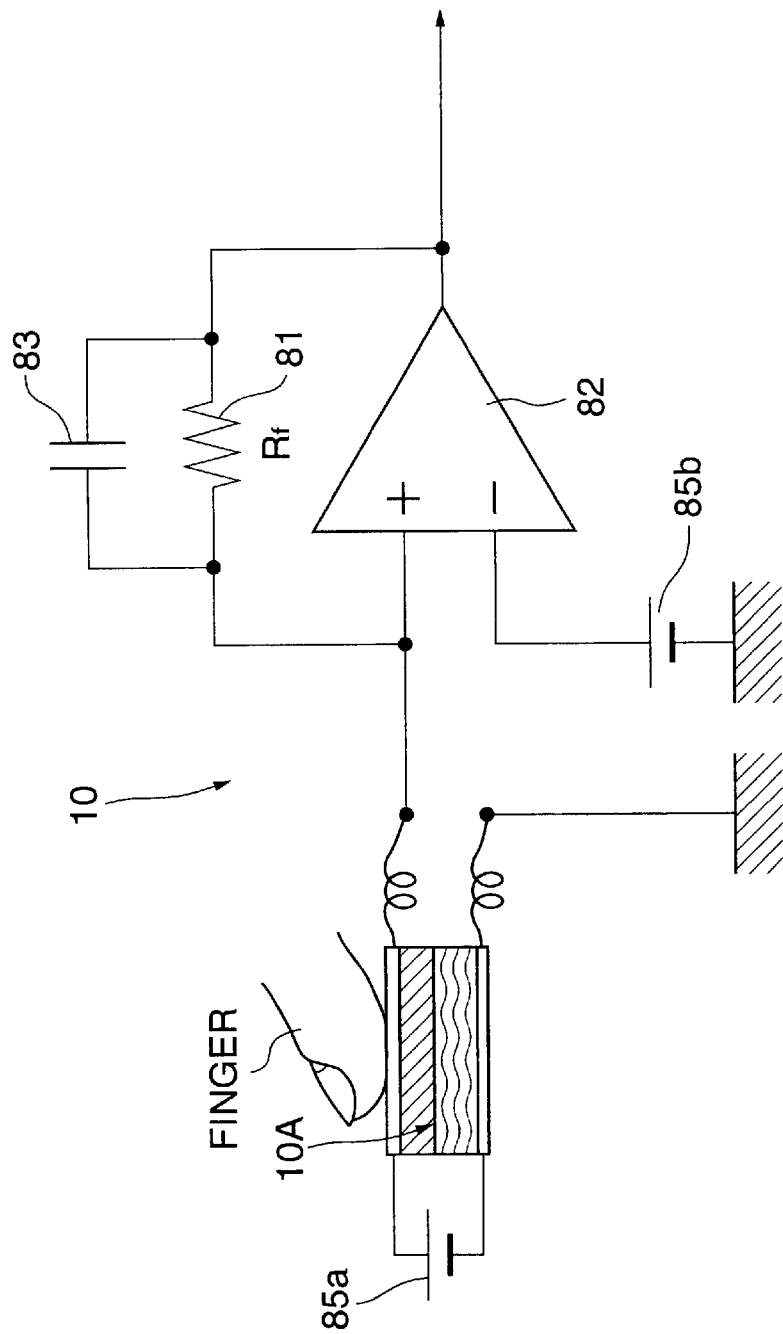
FIG. 7 illustrates a schematic configuration of a measurement sensor.
Figure 8:
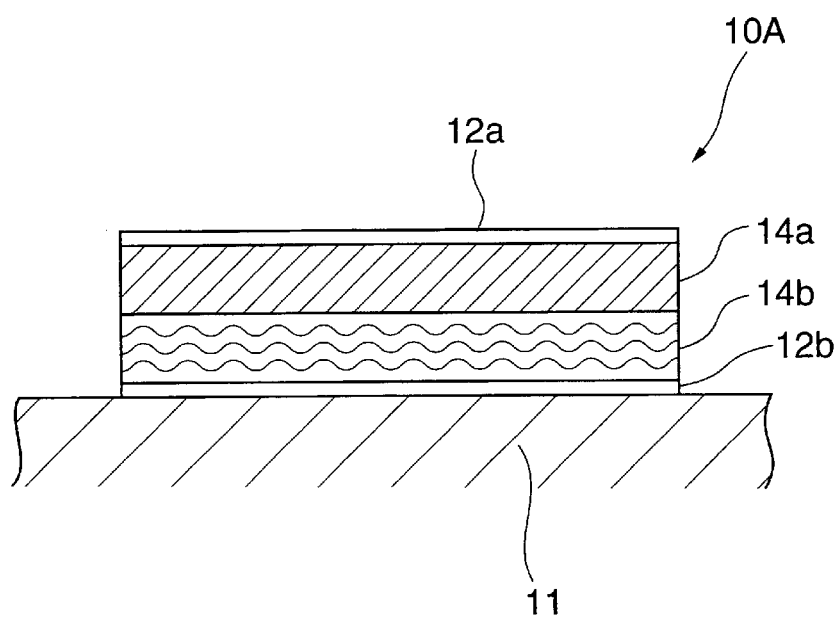
FIG. 8 is a diagram showing a schematic configuration of a measurement sensor of the first embodiment.

The measurement and detection unit 10, which corresponds to a detecting apparatus of the present invention, as shown in FIG. 7, includes a measurement sensor 10 A (measurement unit), a first constant-voltage power supply 85a, and an I-V converter circuit (detection unit). The measurement sensor 10A, as shown in FIG. 8, includes a first electrode 12a, a first resistance layer 14a, a second resistance layer 14b, and a second electrode 12b, stacked in that order on a mouse button pressed with a finger surface during clicking.

The first constant-voltage power supply 85a is connected to the first electrode 12a and the second electrode 12b of the measurement sensor 10A, between which a constant voltage is applied. The first electrode 12a is connected to an I-V converter circuit and the second electrode 12b is grounded.

The interface between the first resistance layer 14a and the second resistance layer 14 is electrically disconnected by contact resistance, and a contact area increases and contact resistance changes in accordance with the magnitude of pressing force applied by the pressing operation with a finger, so that the first electrode 12a and the second electrode 12b are electrically connected.

Specifically, in accordance with button pressing, clicking, and button release operations, pressing force applied to the measurement sensor 10A changes, and in accordance with changes of the pressing force, the contact pressure between the first resistance layer 14a and the second resistance layer 14b changes. In accordance with the changes of the contact resistance, the electrical resistance between the first resistance layer 14a and the second resistance layer 14b decreases gradually, reaches a peak during clicking, and then increases gradually to a stable state. Specifically, the amount of current flowing between the first electrode 12a and the second electrode 12b changes in accordance with changes of applied pressing force, and voltage values converted by the I-V converter circuit also exhibit the same tendency.

Figure 9A:
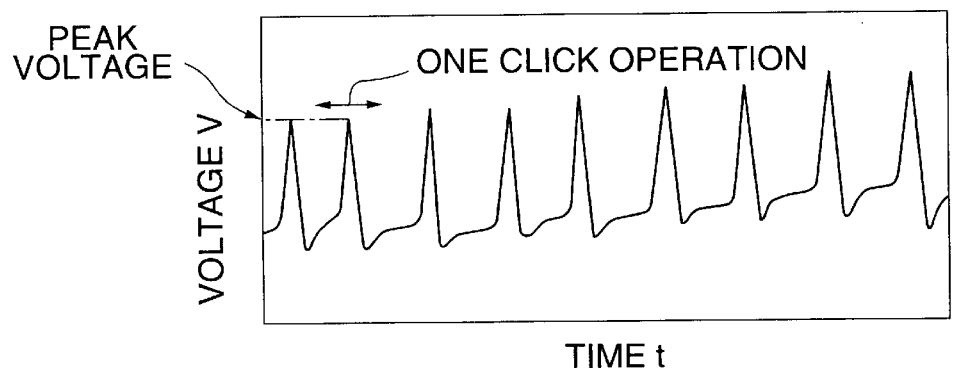
FIG. 9A is a graph showing a voltage waveform during single clicking.
Figure 9B:
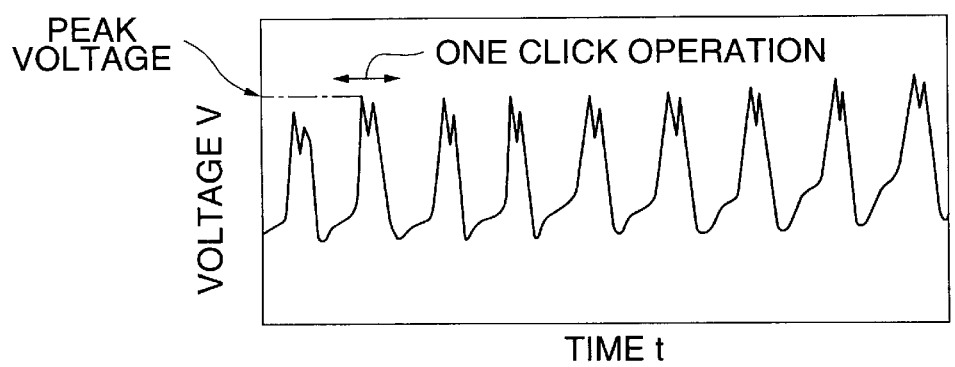
FIG. 9B is a graph showing a voltage waveform during double clicking.
Figure 10A:
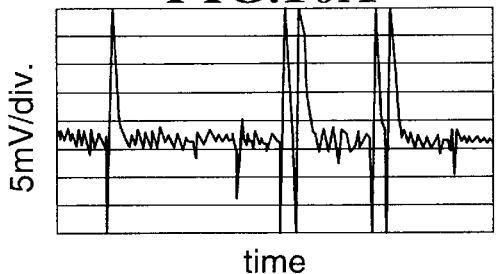
FIG. 10 is a graph showing changes of voltage values detected when 10 users performed single clicking using the measurement unit of the first embodiment.
Figure 10F:
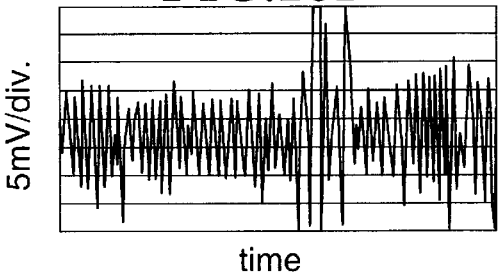
Figure 10B:
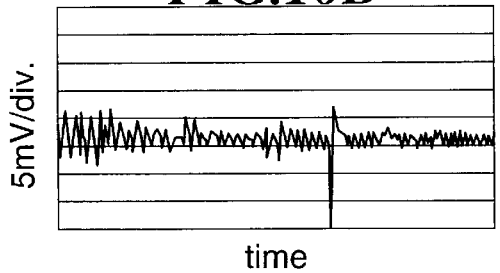
Figure 10G:
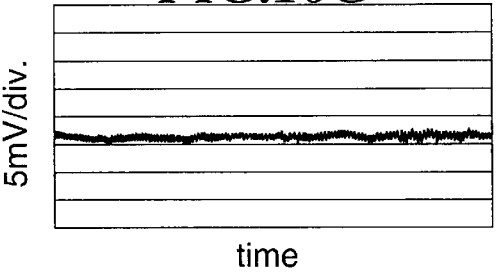
Figure 10C:
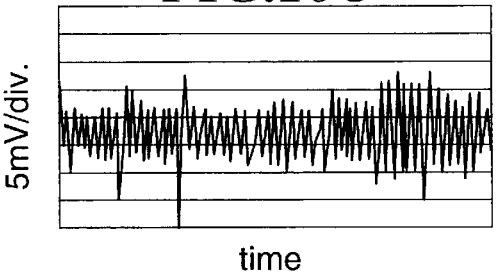
Figure 10H:
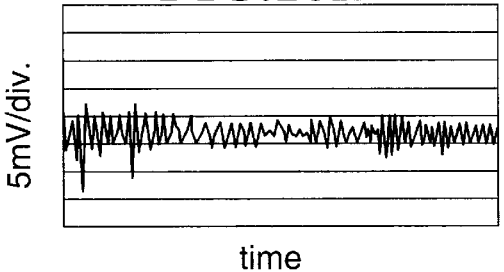
Figure 10D:
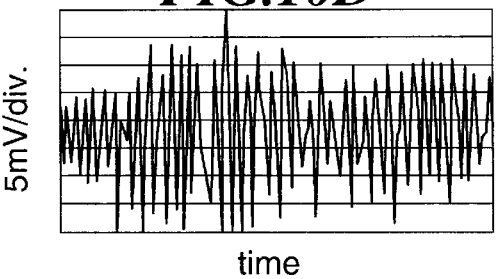
Figure 10I:
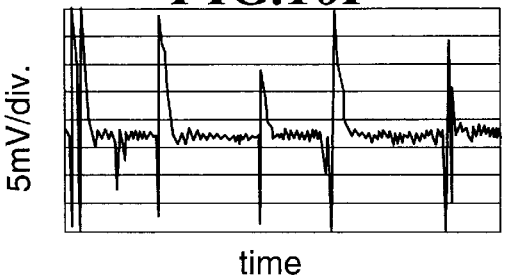
Figure 10E:
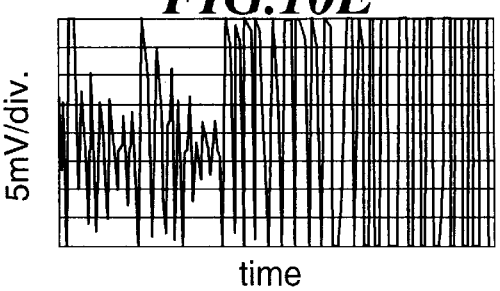
Figure 10J:
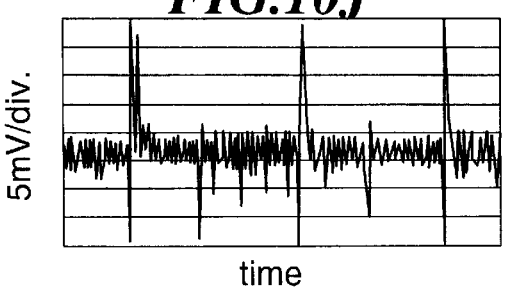

A graph showing the changes of voltage values is shown in FIG. 9. In FIG. 9, the vertical axis represents voltage V and the horizontal axis represents time t. As shown in FIG. 9, since one peak develops during single clicking (FIG. 9A) and two peaks develop during double clicking (FIG. 9B), it is understood that this waveform reflects finger movements.

FIG. 10 is graphs showing changes of voltage values detected when 10 users randomly selected perform single clicking using this apparatus. It is clearly shown from FIG. 10 that a graph of a waveform having a different feature is produced for each of the 10 users.

The first electrode 12a and the second electrode 12b making up the measurement sensor 10A can be formed of an excellent conductive metal film (preferably approximately 10 to 30 $\mu$m thick for Cu or Ni, or approximately 0.1 to 3 $\mu$m thick for Au) such as alloys made of one or more types of Cu, AU, and Ni formed approximately 0.1 to 3 $\mu$m thick by, e.g., a plating method, or a metal film of approximately 1 to 10 $\mu$m thick, patterned by forming and then etching a thin film such as Pt and Pb. The first resistance layer 14a and the second resistance layer 14b are formed so that they are so thin as not to cause a sense of unpleasantness during button operations and are resistant to cracking, chipping, and plastic deformation.

As materials of the resistance layers, for example, metals, resins subjected to conduction processing, graphite, and amorphous carbon molded products can be used. Specifically, filmy molded products are suitable which are molded to have a thickness of 100 to 1000 $\mu$m and a resistivity of $10^2$ to $10^4$ $\Omega$cm by dispersing graphite in an organic viscous adhesive such as acrylonitrile-butadiene-styrene ternary copolymer (ABS), polycarbonate (PC), or polypropylene (PP). Films and the like having a resistivity of $10^2$ to $10^6$ $\Omega$cm can also be used which are obtained by evaporating and then oxidizing an indium oxide with a tin oxide appended to the surface of a heat-resistant polymeric film such as a polyester film 50 to 500 $\mu$m thick.

The I-V converter circuit connected to the first electrode 12a detects changes of electrical resistance values between the first electrode 12a and the second electrode 12b as changes of voltage, and includes an operational amplifier 82, a resistor Rf 81, a capacitor 83, and a constant-voltage power supply 85b.

The first electrode 12a is connected to the noninverting input end of the operational amplifier 82, and the output end of the operational amplifier 82 is connected to the output end of the operational amplifier through the resistor Rf 81 and the capacitor 83 in parallel. On the other hand, a second constant-voltage power supply 85b is connected to the inverting input end of the operational amplifier 82, to which a constant voltage of the same magnitude as the first constantvoltage power supply 85a is applied.

The output of the I-V converter circuit is temporarily inputted to the signal processing unit 20 and is outputted to the A/D conversion unit 30 after being subjected to proper signal processing such as noise elimination. The A/D conversion unit 30 subjects an amplitude waveform signal generated by one click operation to A/D conversion and quantizes the resulting signal as a vector of plural dimensions.

Generally, since time required for one single click operation is approximately 0.4 to 0.7 seconds and time required for one double click operation is approximately 0.5 to 0.8 seconds, 100 ms or less is sufficient as a sampling time interval. However, to more accurately locate the peak position (or bottom position) of voltage, a sampling time interval should be made as short as possible. For this reason, in the A/D conversion unit 30 of the first embodiment, a sampling time interval is set at 12.5 ms (80 Hz).

The output of the A/D conversion unit 30 is all stored in the FIFO (First In First Out) memory 84. To the FIFO memory 84, the timing control unit 80 is connected, and although not shown, it is constructed so that an electrical signal outputted from a mouse by a click operation is inputted.

The timing control unit 80 outputs click timing to the FIFO memory 84 and the CPU 100 described later through the bus 28, wherein the click timing is generated when files accessed by a click operation, for example, files containing the most important secrete information and files storing personal private information that must be protected against access from third parties, are accessed, each time a click operation is performed, or during the first click operation after a predetermined, specified time elapses.

Click timing occurs at a peak position where the highest voltage value develops (or a bottom position where the lowest voltage value develops) in an amplitude waveform signal generated by one click operation, and the FIFO memory 84 outputs, as one set, a total of 60 voltage values or amplitude values, which are broken down as 20 voltage values sampled every 12.5 ms (80 Hz) before the instant when the timing is inputted, 39 voltage values sampled every 12.5 ms (80 Hz) after the instant, and a voltage value at the peak, which is a sampling point of the click timing.

Figure 11:
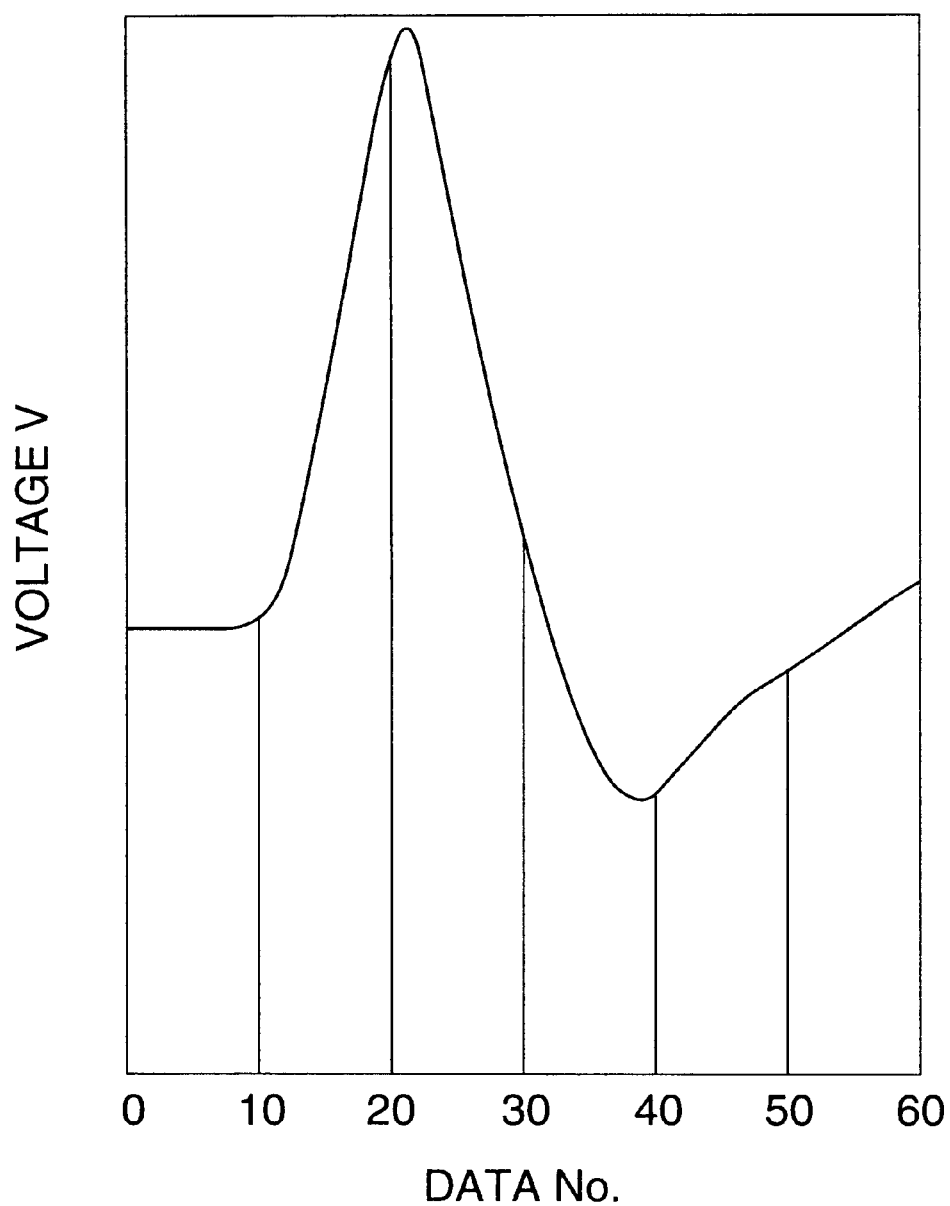
FIG. 11 is a graph showing a waveform of single clicking.
Figure 12:
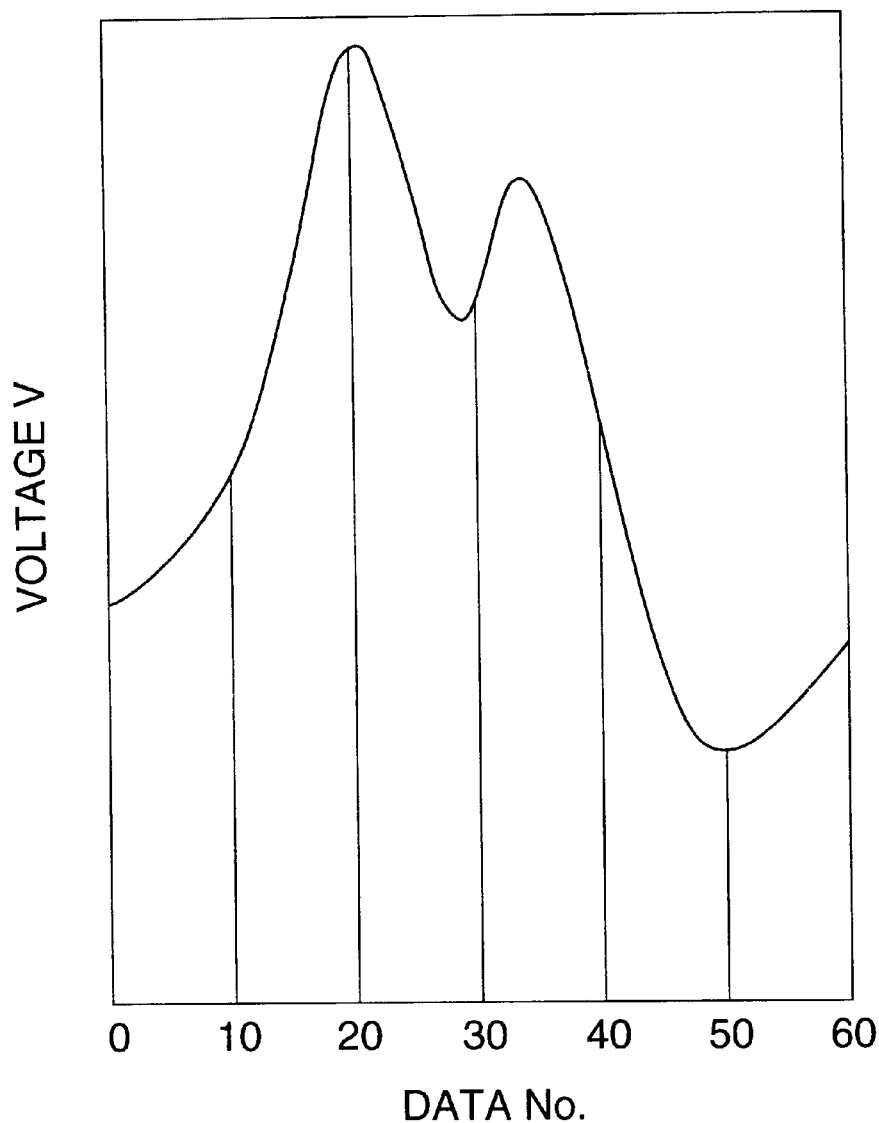
FIG. 12 is a graph showing a waveform of double clicking.
Figure 15:
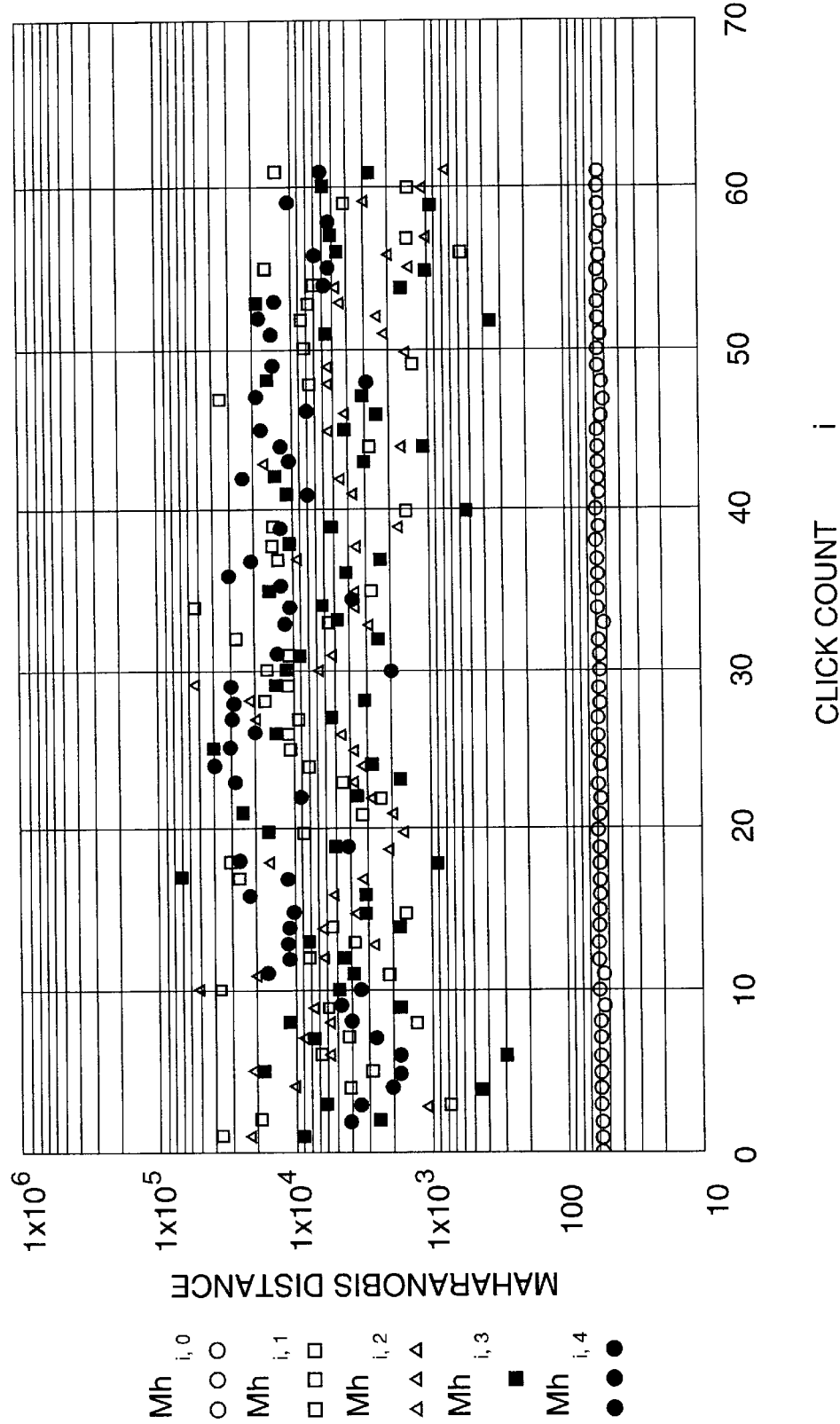
FIG. 15 is a graph showing Maharanobis distances of four in five users, with respect to features obtained by single clicking by a first user of them.
Figure 16:
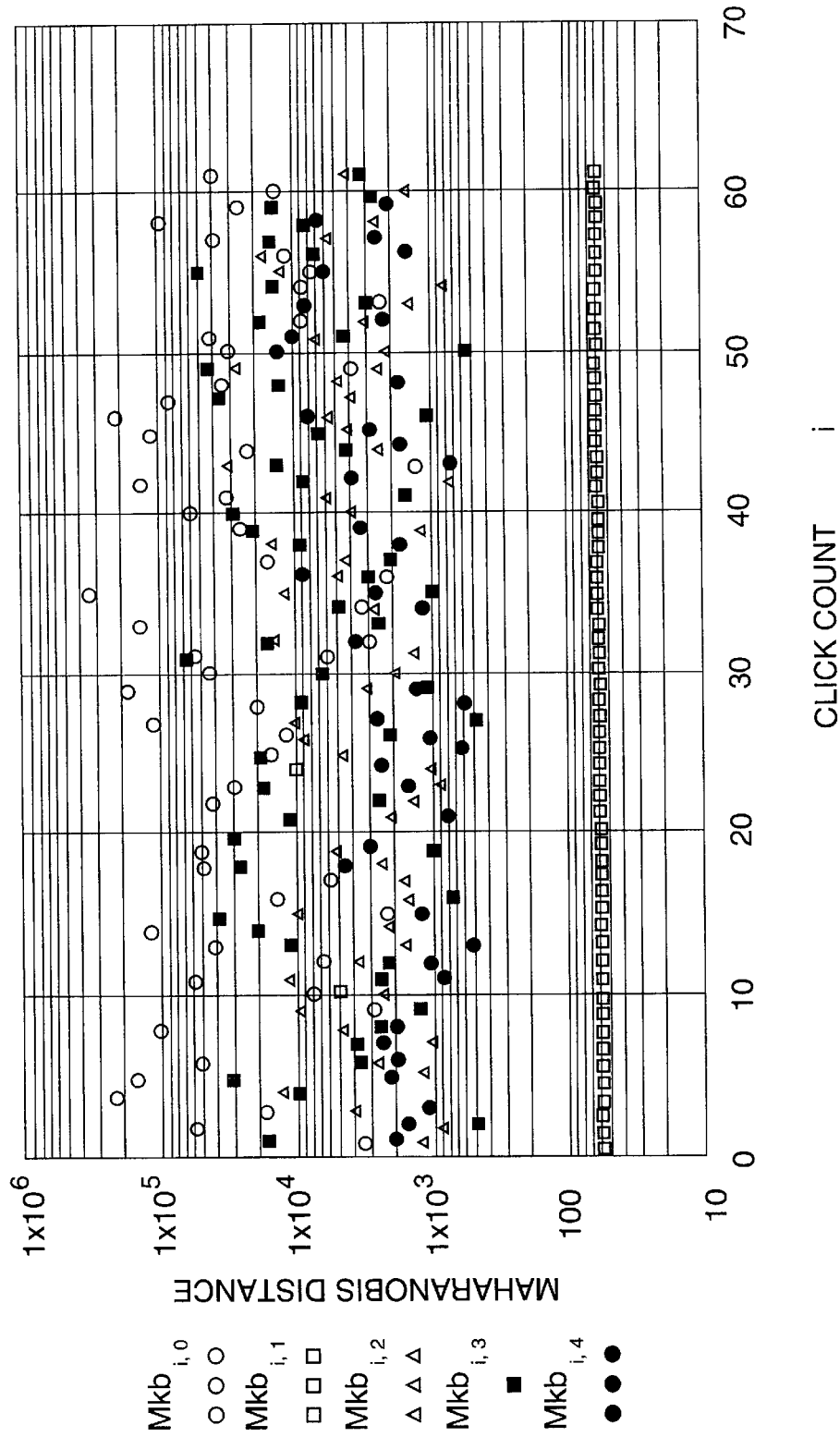
FIG. 16 is a graph showing Maharanobis distances of four in five users, with respect to features obtained by single clicking by a second user of them.
Figure 17:
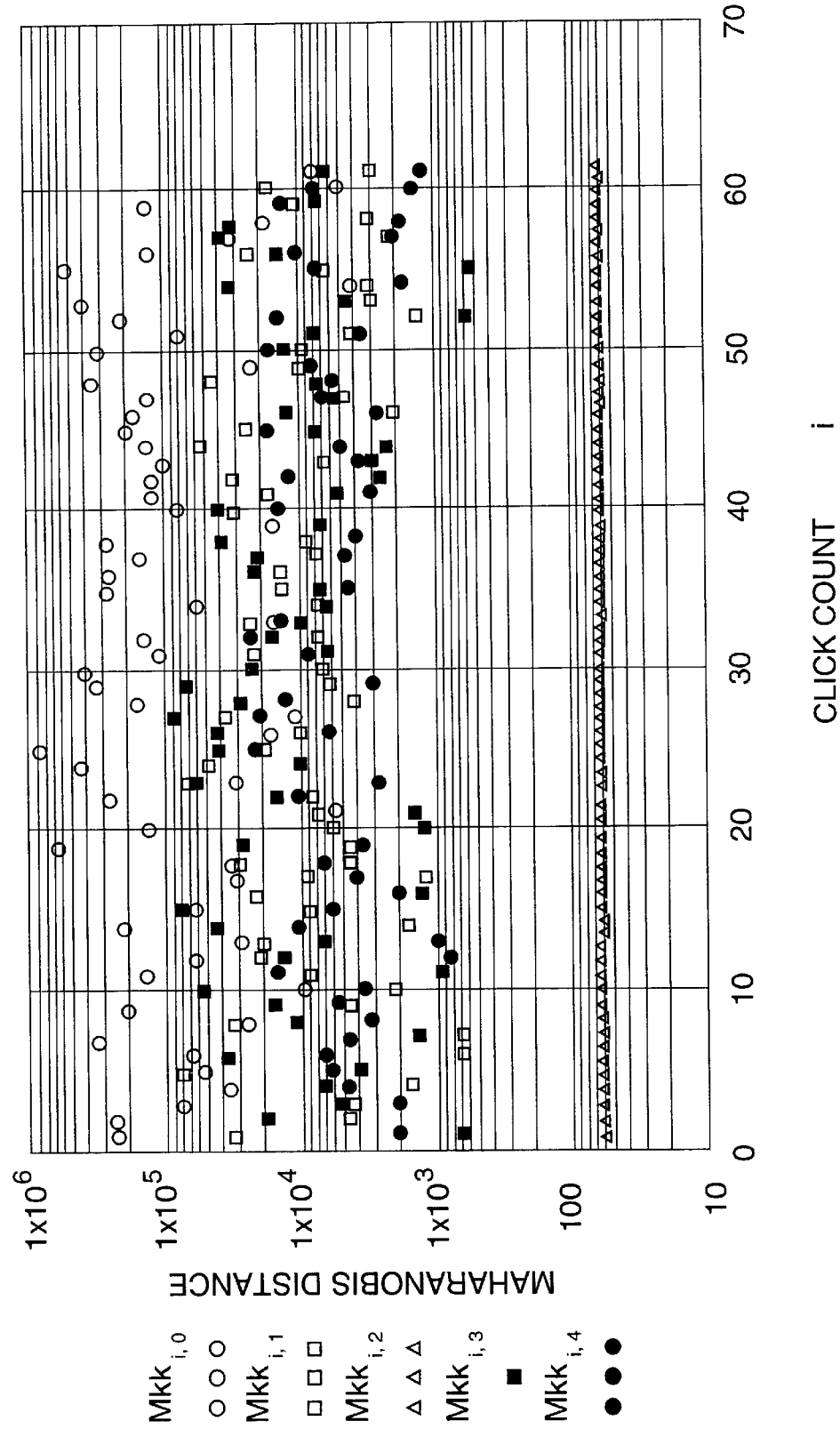
FIG. 17 is a graph showing Maharanobis distances of four in five users, with respect to features obtained by single clicking by a third user of them.
Figure 18:
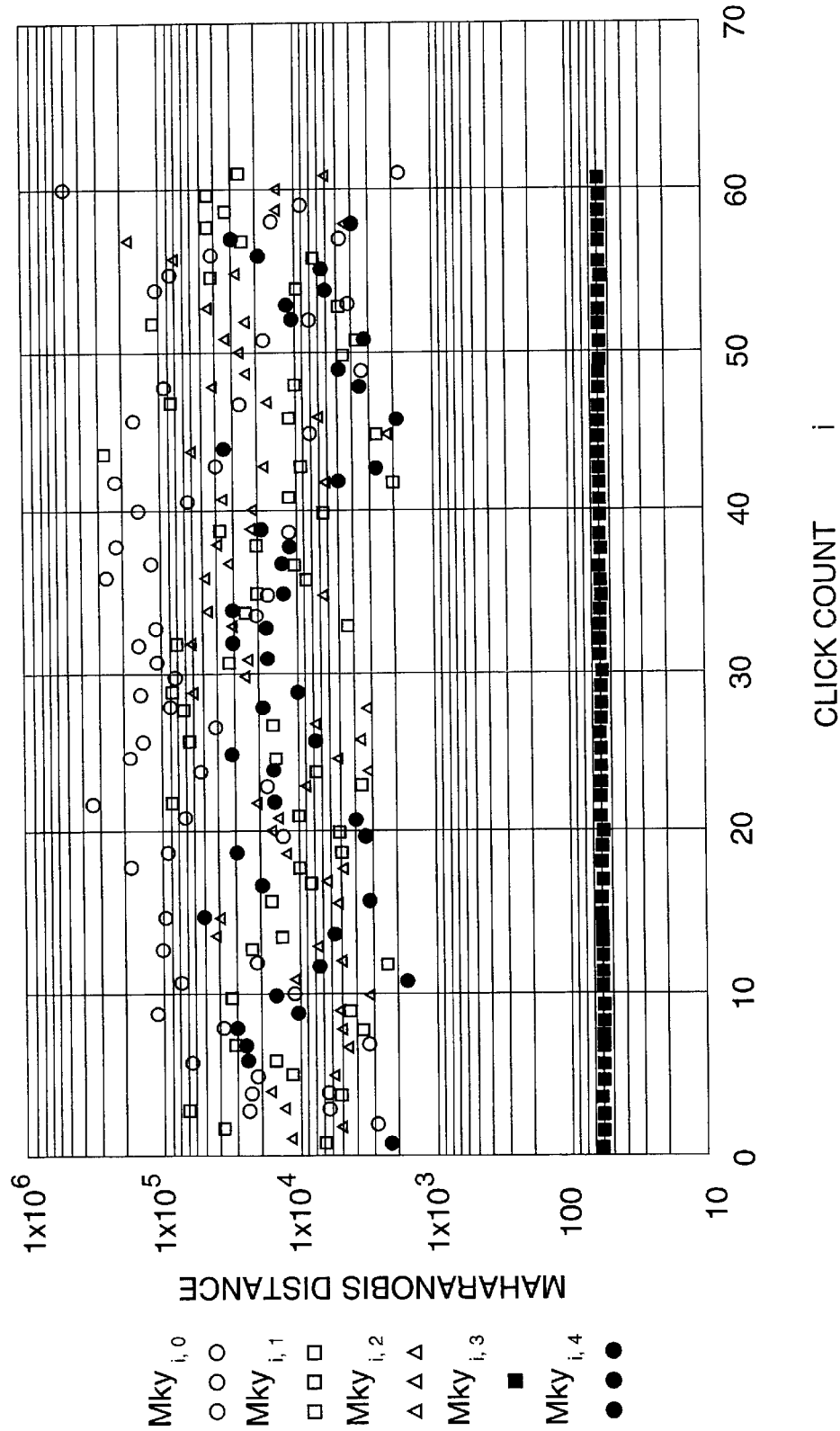
FIG. 18 is a graph showing Maharanobis distances of four in five users, with respect to features obtained by single clicking by a fourth user of them.
Figure 19:
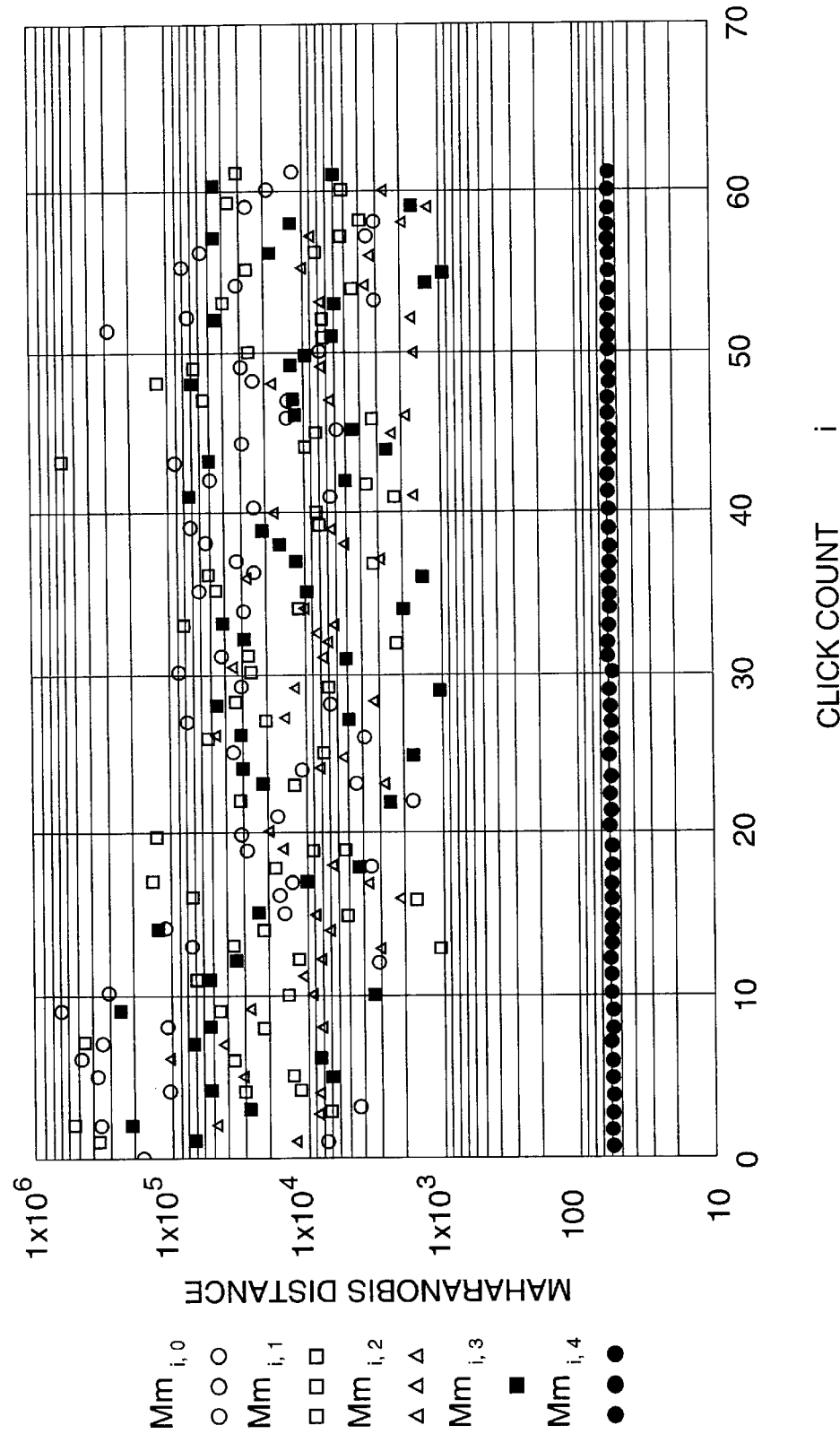
FIG. 19 is a graph showing Maharanobis distances of four in five users, with respect to features obtained by single clicking by a fifth user of them.
Figure 20:
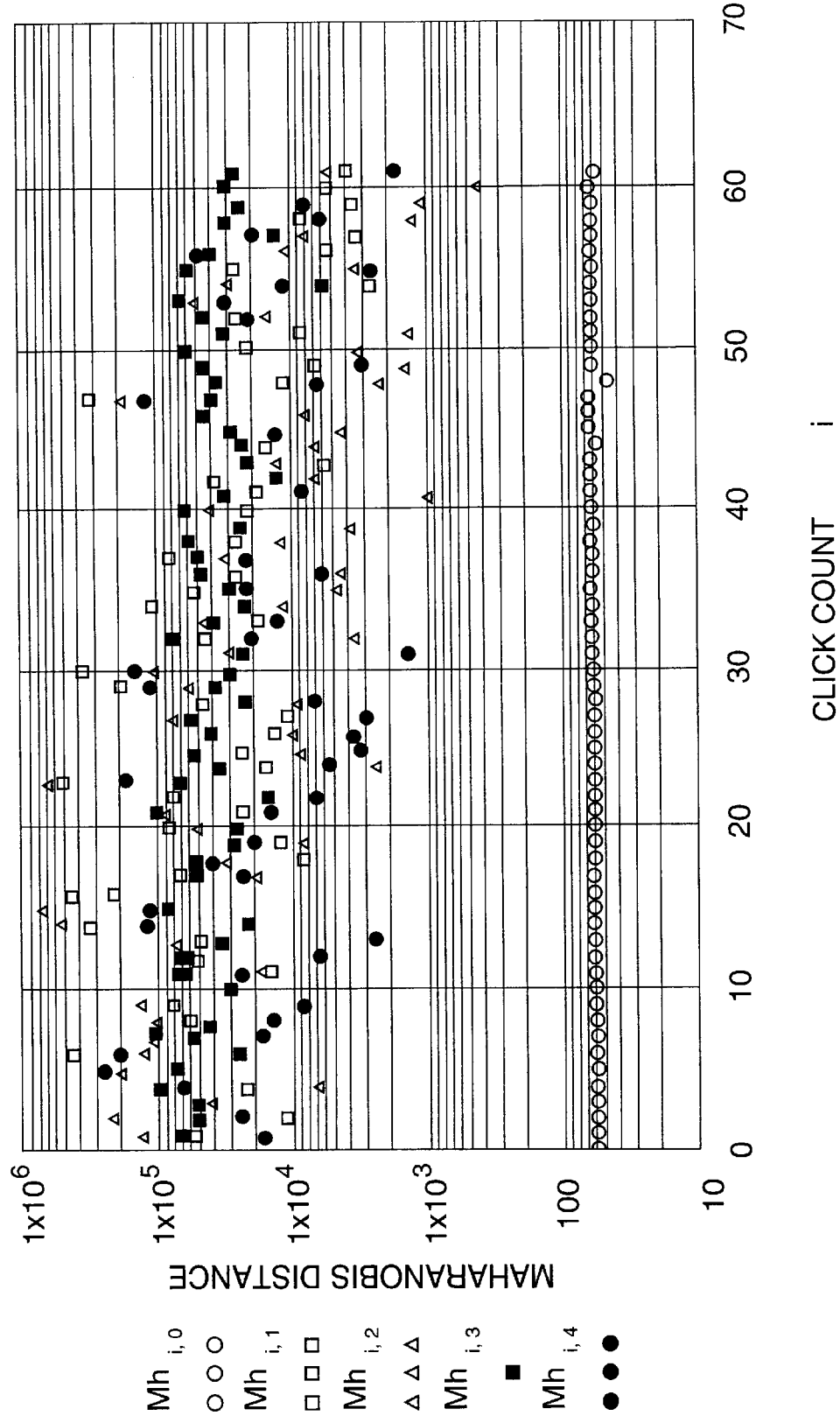
FIG. 20 is a graph showing Maharanobis distances of four in five users, with respect to features obtained by double clicking by a first user of them.
Figure 21:
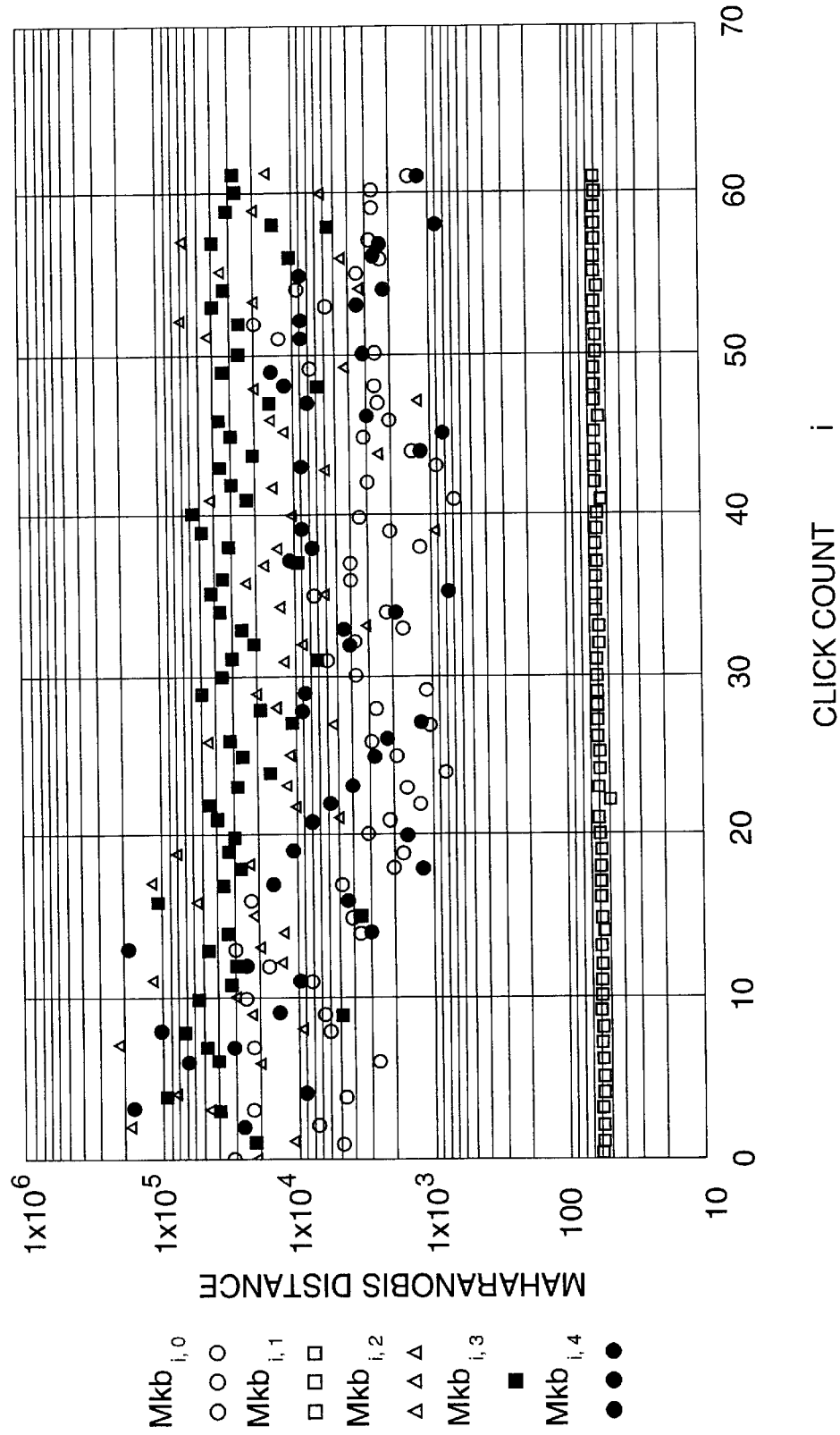
FIG. 21 is a graph showing Maharanobis distances of four in five users, with respect to features obtained by double clicking by a second user of them.
Figure 22:
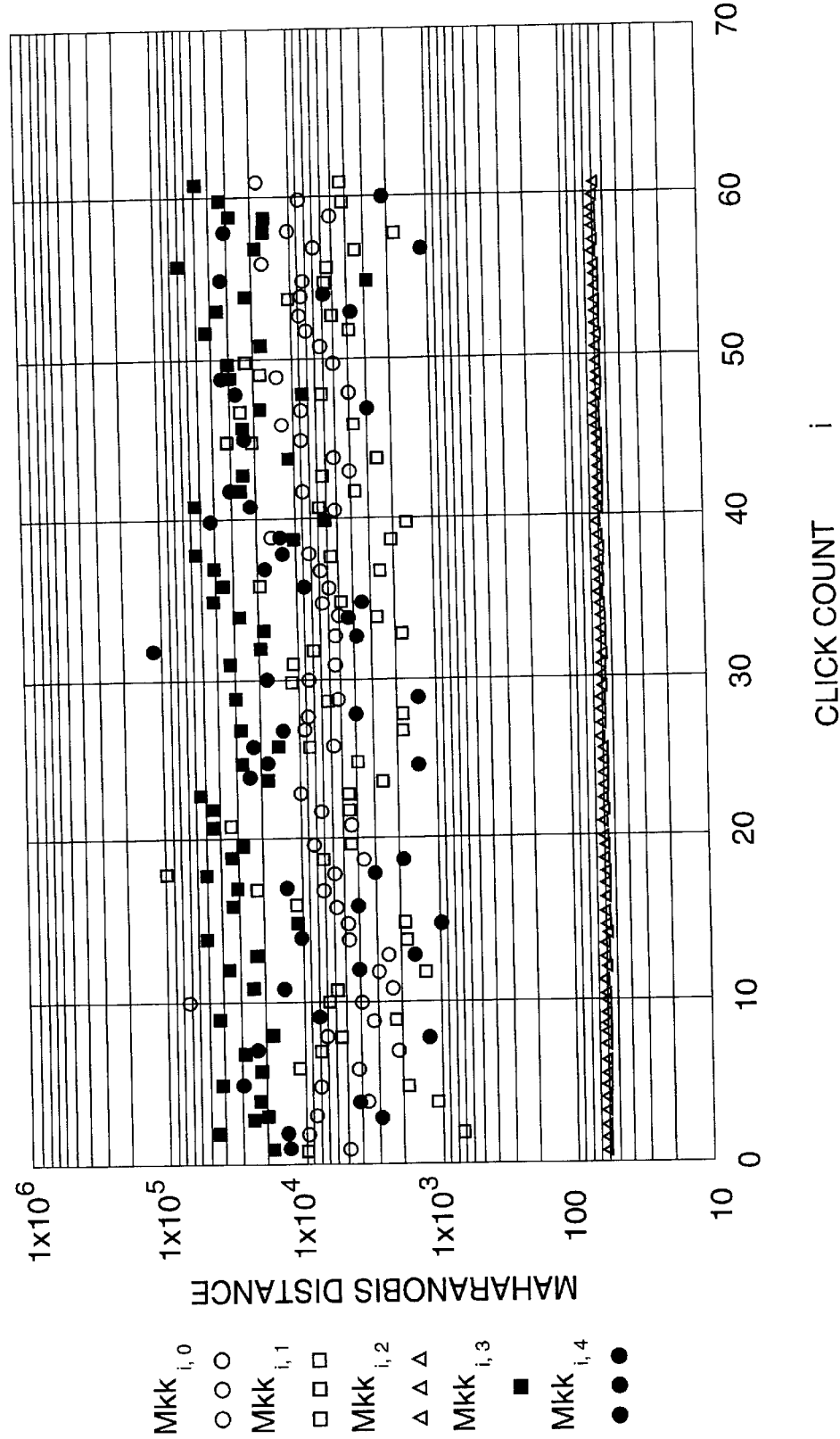
FIG. 22 is a graph showing Maharanobis distances of four in five users, with respect to features obtained by double clicking by a third user of them.
Figure 23:
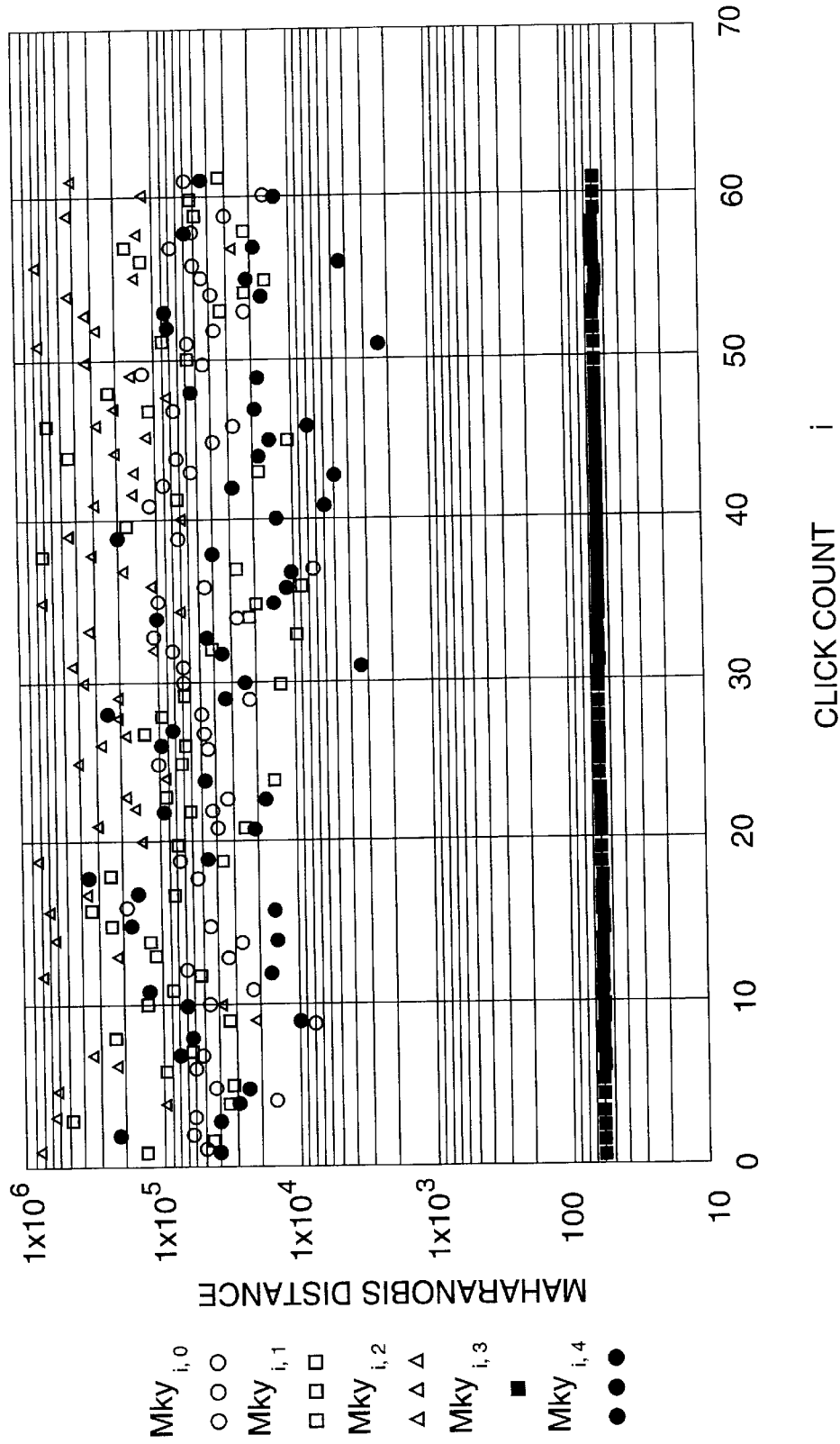
FIG. 23 is a graph showing Maharanobis distances of four in five users, with respect to features obtained by double clicking by a fourth user of them.
Figure 24:
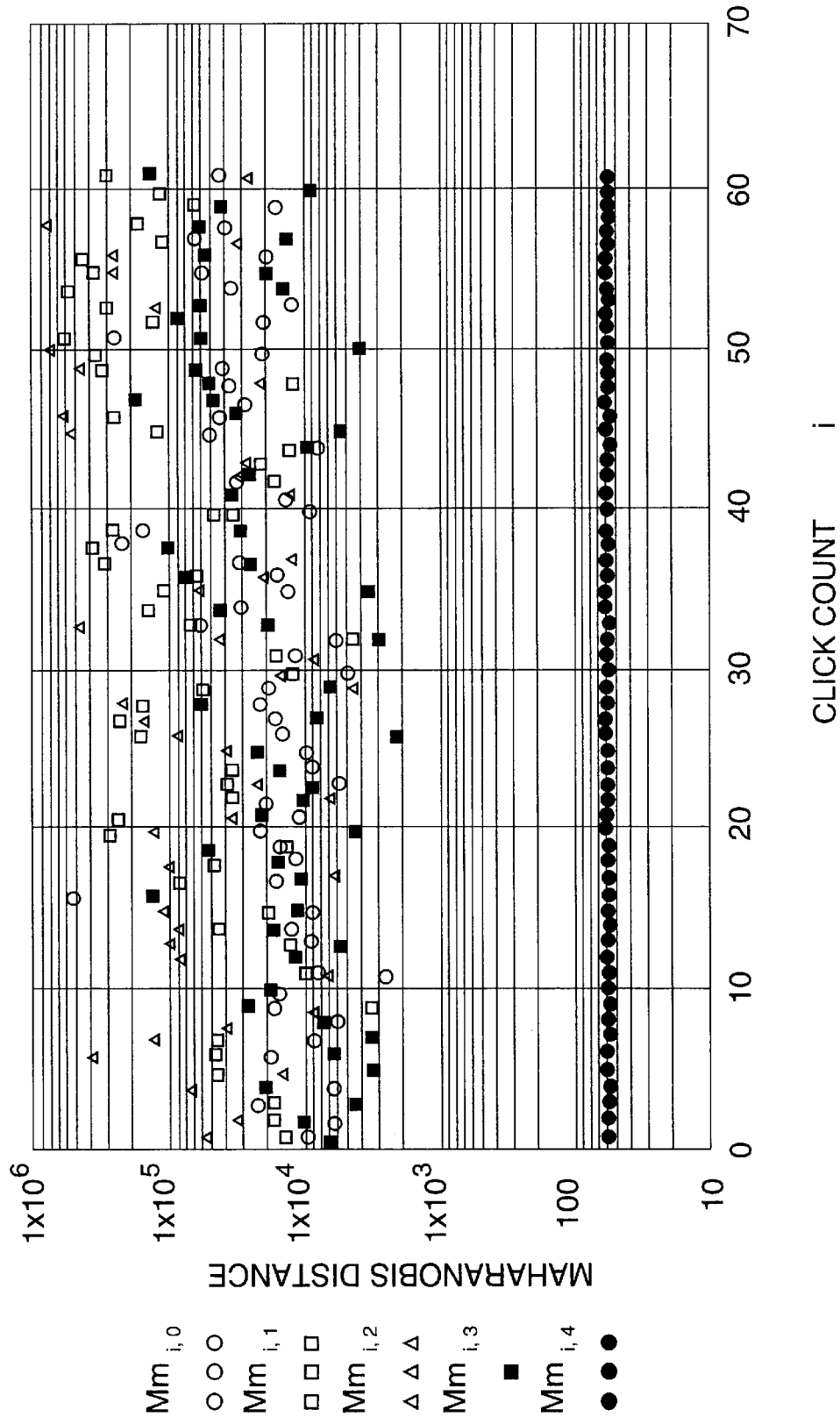
FIG. 24 is a graph showing Maharanobis distances of four in five users, with respect to features obtained by double clicking by a fifth user of them.

Specifically, as shown in FIGS. 11 and 12, in an amplitude waveform signal generated by one click operation, a peak position where the highest voltage value develops (or a bottom position where the lowest voltage value develops) is used as a base of feature extraction, and a total of 60 voltage values or amplitude values ($v_1, v_2, v_3 \ldots, v_{60}$) are outputted as a set of features wherein the 60 voltage values include voltage values at 20 points ($v_1, v_2 \ldots, v_{20}$) before the time when the peak voltage was observed, those at 39 points ($v_{22}, v_{23} \ldots, v_{60}$) after the time, and a voltage value at peak ($v_{21}$), a sampling point in the click timing. Since an element of a waveform vector during clicking is an amplitude value (voltage) at a feature extraction point for each sampling time and the number of feature extraction points is the number of vector dimensions, in this embodiment, a vector of 60 dimensions is obtained.

A set of features outputted from the FIFO memory 84 is stored in the RAM 40 via the bus 28. The stored features are read from the RAM 40 by the CPU 100 connected via the bus 28 and are subjected to individual registration processing or matching and identification processing.

The CPU 100 performs, according to the program stored in the ROM 41, processing for registering individuals as the subject of authentication (individual registration) or matching and identification processing.

For example, if five users are selected at random and each of them performs a single click operation 100 times, 100 sets of features will be obtained per user. This is graphed as shown in FIG. 13. Also, when five users are selected at random and each of them performs a double click operation 100 times, 100 sets of features will be similarly obtained per user. This is graphed as shown in FIG. 14.

When individuals are registered as the subject of authentication (individual registration), the CPU 100 calculates a feature vector and a feature matrix based on the 100 sets of features.

Specifically, the 100 sets of features are averaged for each dimension and an obtained product is stored as a feature vector together with personal identification data, and a product obtained by calculating a variance/covariance matrix (or correlation matrix) from the 100 sets of features is stored in the RAM 40 as a feature matrix together with a personal identification number, like the feature vector.

Although at least a feature vector and a feature matrix may be stored together with a personal identification number, in the case where a threshold distance used for identification to be described later is different for each registrant, the threshold distance individually determined is also stored in the RAM 40 together with the personal identification number, like the feature vector and the feature matrix.

Timing output of the timing control unit 80 is inputted via the bus 28 to the CPU 100, which, upon detection of the timing output, performs matching and identification processing.

Matching processing reads a feature vector and a feature matrix (hereinafter referred to as personal data), and a threshold distance corresponding to an input person, stored in the RAM 40 together with an identification number associated with an inputted personal name, and compares the read personal data with inputted features to determine whether the person is authorized.

To be more specific, the Maharanobis distance between an unknown waveform vector based on the inputted features and personal data read from the RAM 40 is calculated, and if the obtained distance is shorter than a properly set threshold distance, it is judged that the input person and the person indicated by the read personal data are identical.

Identification processing reads all personal data and threshold distances corresponding to the individuals from the RAM 40, and compares all the read personal data with inputted features to judge whether a pertinent person exists in all the read personal data.

To be more specific, the Maharanobis distance between an unknown waveform vector based on the inputted features and all personal data read from the RAM 40 is calculated, and it is judged that a person who registered personal data representing the closest distance is a pertinent person. If the distance between the unknown waveform vector and personal data is longer than the threshold distance, it is judged that there is no pertinent person.

The Maharanobis distance is the most desirable as distance to be calculated. Since Maharanobis distance, as described previously, is calculated from a waveform vector of an unknown user, a registered feature vector (average vector), and the inverse matrix of a feature matrix (variance/covariance matrix or correlation matrix), the individual identification apparatus of this embodiment is constructed to store the feature vector (average vector) and the feature matrix (variance/covariance matrix or correlation matrix) as personal data.

FIGS. 15 to 19 are graphs showing Maharanobis distances calculated based on features obtained by single click operations by five users. Each of the figures represents Maharanobis distances with one of the five persons as a base, for all users. FIGS. 20 to 24 are graphs showing Maharanobis distances calculated based on features obtained by double click operations by five persons selected at random, and, like FIGS. 15 to 19, represent Maharanobis distances with one of the five persons as a base, for all users tested. These figures explicitly shows that each of the five users has a different distance.

In addition to the Maharanobis distance, distances used in statistical discriminant analysis and cluster analysis, e.g., street distances, Euclidean distances, standardization Euclidean distances, Minkowski distances, and other statistical distances can also be used.

A judgement result of the CPU 100 is outputted to the judgment result signal output unit 70 via the bus 28. The judgment result signal output unit 70 converts the judgement result of the CPU 100 to a signal, and reflects the result in program processing within the computer, by, e.g., outputting the signal to the CRT 35, which prevents the reading by unregistered third parties by executing a screen saver, or defining program processing within the computer so as to ignore all indications from an input unit. If a judgment of match is given in matching and identification processing based on the next click operation, all these settings can be reset and processing can be restarted.

A matching and identification program to be described later is stored in the ROM 41. The program is read and executed as soon as power to the personal computer is turned on.

Figure 25:
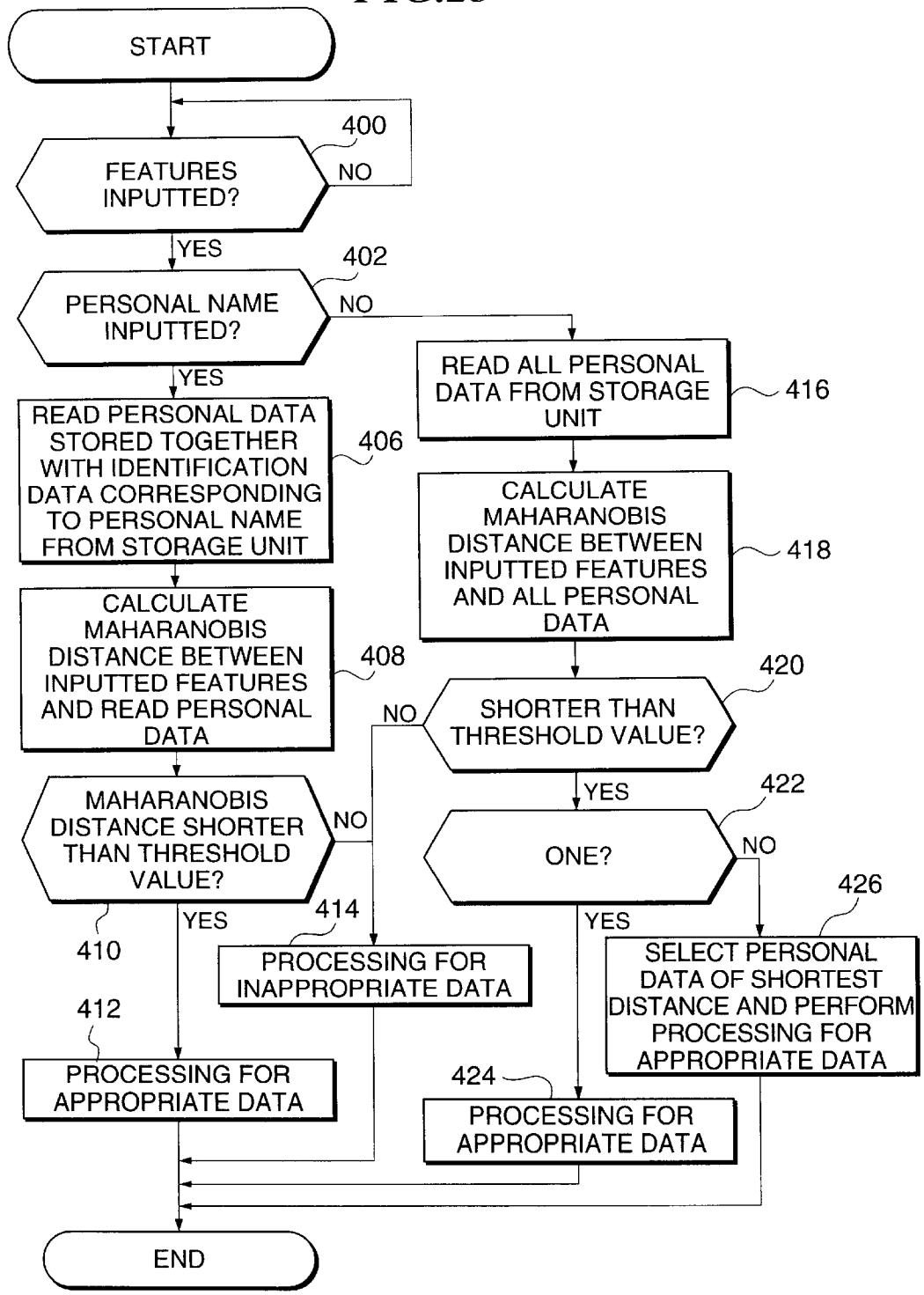
FIG. 25 is a flowchart showing a matching and identification program.

The matching and identification program will be described with reference a flowchart of FIG. 25. In step 400, it is judged whether features are inputted. The features are inputted at the timing when a user logs on, a user clicks a mouse, a user opens a file specified as important secret, or a predetermined time has elapsed.

If it is judged in step 400 that features are inputted, control proceeds to step 402, where a personal name is inputted. If it is judged in step 402 that a personal name is inputted, matching processing is performed. If it is judged in step 402 that a personal name is not inputted, identification processing is performed.

Specifically, if it is judged in step 402 that a personal name is inputted, control proceeds to step 406, where identification data corresponding to the personal is read from the RAM 40 and personal data stored together with the identification data is read and temporarily stored. In the next step 408, a Maharanobis distance between the inputted features and the stored personal data is obtained.

In the next step 410, it is judged whether the condition that the Maharanobis distance is shorter than the threshold distance is satisfied, and if it is satisfied, control proceeds to step 412, where OK processing (to be described later) is performed and this routine terminates. If it is not satisfied, control proceeds to step 414, where N.G. processing (to be described later) is performed and this routine terminates.

On the other hand, if it is in step 402 judged that a personal name is not inputted, control proceeds to step 416, where all identification data registered in the RAM 40 is read, and personal data stored together with each piece of the identification data is read and temporarily stored.

In the next step 418, Maharanobis distances between the inputted features and all the stored personal data are obtained.

In the next step 420, it is judged whether the condition that all Maharanobis distances obtained for each piece of the personal data are shorter than the threshold distance is satisfied. In step 420, if there is personal data satisfying the condition that all Maharanobis distances obtained for each piece of the personal data are shorter than the threshold distance, control proceeds to the next step 422, where it is judged whether the number of pieces of the personal data satisfying the condition is one.

If the number of pieces of the personal data satisfying the condition is one, control proceeds to step 424, where it is judged that the personal data matches, OK processing (to be described later) is performed, and this routine terminates. If the number of pieces of the personal data satisfying the condition is not one (plural), it is judged that the personal data closest in Maharanobis distance matches, OK processing (to be described later) is performed, and this routine terminates.

In step 420, if the condition that all Maharanobis distances obtained for each piece of the personal data are shorter than the threshold distance is not satisfied, control proceeds to step 414 to perform N.G. processing (to be described later), and this routine terminates.

The OK processing continues processing currently being performed or processing to be performed, includes features used for identification (or matching) judgment in the personal data of a new pertinent person, newly recalculates the personal data (feature vector and feature matrix), and stores the resulting product.

The N.G. processing presents reflections to program processing within the computer, such as prevention of the reading by unregistered third parties by executing a screen saver, or the setting of program processing within the computer so as to ignore all indications from an input unit.

By processing data as described above, matching and identification can be performed to determine, regularly or each time a predetermined file is opened, whether a current user is a registered user, by capturing individuals' features from finger movements during button operations, for example, changes of a contact state between a finger and a button during clicking.

Figure 26:
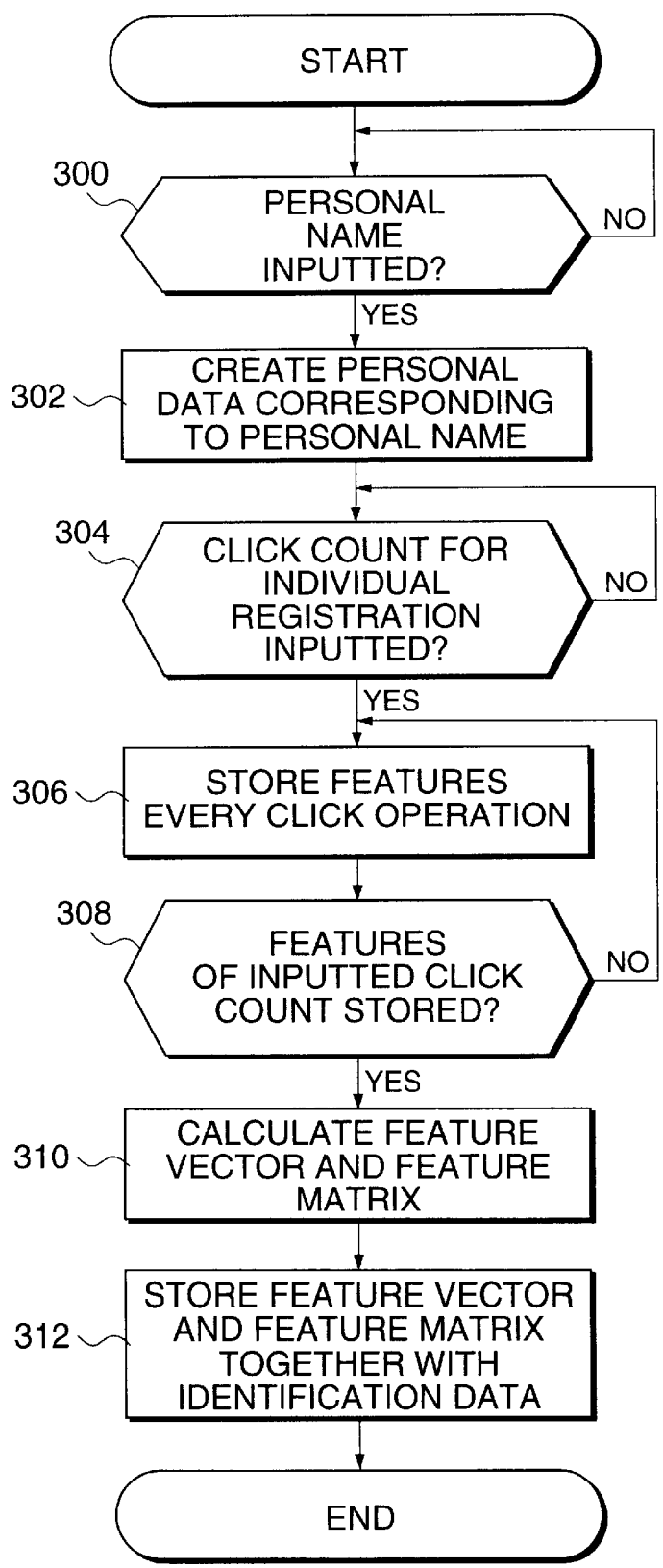
FIG. 26 is a flowchart showing an individual registration program.

A program to perform individual registration processing is described with reference to a flowchart of FIG. 26. In step 300, it is judged whether a personal name to be registered is inputted, and when a personal name is inputted, control proceeds to step 302, where identification data (identification address) associated with the inputted personal name is generated.

In the next step 304, it is judged whether a click count for individual registration is inputted. If a click count for individual registration is inputted, control proceeds to step 306, and features inputted for each click operation are stored.

In the next step 306, it is judged whether the storing of features of a click count for individual registration terminates, and if not so, control returns to step 306 again, where features inputted every click operation are stored.

When it is judged in step 306 that the storing of features of a click count for individual registration terminates, control proceeds to step 310, where a feature vector and a feature matrix (variance/covariance matrix or correlation matrix) are calculated from all features. Thereafter, in step 312, the feature vector and the feature matrix (variance/covariance matrix or correlation matrix) are stored together with the identification data created in step 302, and this routine terminates.

In this embodiment, the measurement sensor 10A is provided with two resistance layers, the first resistance layer 14a and the second resistance layer 14b, between the first electrode 12a and the second electrode 12b. However, a measurement sensor (measurement unit) of the present invention, without being limited to this configuration, may have one or more non-insulation layers and two conductive layers stacked with the non-insulation layer(s) sandwiched therebetween.

Of course, the resistance layers are not limited to two layers, and three or more resistance layers may be provided. Preferably, at least one of the one or more non-insulation layers should be elastic or fluid so that values more clearly reflecting finger movements are obtained. Not all the layers need to be resistive and part of them may be conductive. Furthermore, a protective insulation layer may be provided on the surface of the measurement sensor 10A.

Although, in this embodiment, the identification program is started as soon as the power to the computer is turned on, the identification program may be started by an instruction from an operator.

In the first embodiment, for an identification result of mismatch, program processing within the computer is discontinued as N.G. processing so that the reading by third parties is prevented by executing a screen saver. Alternatively, the program processing may be forcibly terminated.

In the first embodiment, an example of using data outputted by sensing finger movements as changes of electrical resistance is shown. However, quantized data is processed in the same way even if finger movements are sensed as changes of capacitance (to be described later), optically measured (to be described later), mechanically measured in change of pressing force, speed, and position, or measured in change of sound.

Although the matching and identification program is stored in the ROM 41 in the previously-described embodiment, without the invention being limited to this, while the program is stored in a floppy disk, it may be read from the floppy disk and be installed in a hard disk provided in the computer. Alternatively, the program may be transmitted to a wired or wireless network by transmission parts such as telephone lines and installed. The program, without being limited to being stored in a floppy disk, may be stored in CD-ROM or magnetic tape, and may be installed in a hard disk of apersonal computer from the CD-ROM or magnetic tape. Also, a hard disk storing the program may be provided. Furthermore, the program may be directly written to a hard disk or RAM of a personal computer. Thus, the program can be distributed by at least one of a tangible recording medium and a transmission part.

Second Embodiment

Another configuration of the measurement sensor 10A of the above-described first embodiment is described as a second embodiment. A description of other configurations, which are the same as those of the first embodiment, is omitted.

Figure 27:
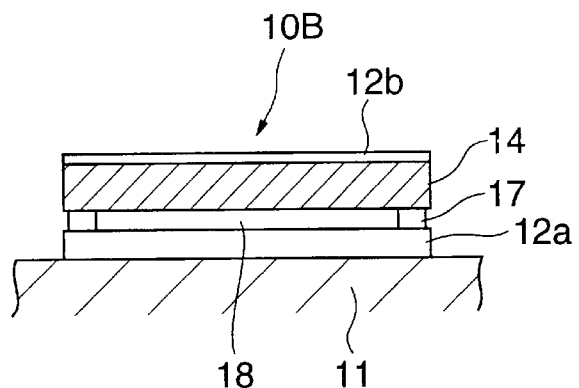
FIG. 27 illustrates a schematic configuration of a measurement sensor of a second embodiment.

A measurement sensor 10B of the second embodiment, as shown in FIG. 27, includes the first electrode 12a, a fluid layer 18, a resistance layer 14, and the second electrode 12b, stacked in that order on the side of a mouse pressed with a finger surface during clicking.

The first electrode 12a is formed by a conductive layer approximately 100 μm thick constructed from a metal such as an alloy of copper and nickel having a resistivity of $10^{-6}$ Ωcm, a conductive rubber having a resistivity of approximately $10^{-1}$ Ωcm produced by dispersing a carbon black in an ethylene-propylene rubber (EPM, EPDM), a conductive polymeric material doped with iodine, such as polyacetylene, or a rubber or plastic dispersed with a conductive filler such as metal powder.

The fluid layer 18 is filled with an insulative gas such as air and nitrogen, or electrically insulative liquid such as mineral oil and silicon oil within a hermetic space formed by an insulative spacer 17 such as acryl, epoxy, polyvinyl chloride, glass, rubber, and ceramic, disposed between the first electrode 12a and the resistance layer 14.

The thickness of the fluid layer 18 is set so as not to cause a sense of unpleasantness during operations of a button provided with the measurement sensor 10B, and is set at approximately 10 to 100 μm, a thickness that allows the contact of the resistance layer 14 above the fluid layer 18 with the first electrode 12a when the measurement sensor 10B is pressed with a finger.

The resistance layer 14 above the fluid layer 18 is constructed from the same material as that of the above-described first embodiment. The second electrode 12b, like that of the first embodiment, can be formed of an excellent conductive metal film (preferably approximately 10 to 30 μm thick for Cu or Ni, or approximately 0.1 to 3 μm thick for Au) such as alloys made of one or more types of Cu, AU, and Ni formed approximately 0.1 to 3 μm thick by, e.g., a plating method, or a metal film of approximately 1 to 10 μm thick, patterned by forming and then etching a thin film such as Pt and Pb.

In the measurement sensor 10B of the second embodiment, the first electrode 12a and the second electrode 12b are electrically disconnected by the fluid layer. In accordance with the magnitude of pressing force applied by the pressing operations with a finger, the second electrode 12b is bent and invades into the fluid layer, and like the above-described first embodiment, the magnitude of pressing force applied in accordance with button pressing, clicking, and button releasing operations changes. In accordance with the changes of pressing force, the contact area between the first electrode 12a and the second electrode 12b increases and the amount of current flowing between the first electrode 12a and the second electrode 12b increases.

Accordingly, like the above-described first embodiment, electrical resistance values between the first electrode 12a and the second electrode 12b are detected by the I-V converter circuit connected to the first electrode 12a, so that data reflecting finger movements can be obtained. In this case, data indicating resistance changes reflecting changes in the contact area and the contact pressure is obtained.

Third Embodiment

A further configuration of the measurement sensor 10A of the above-described first embodiment is described as a third embodiment. A description of other configurations, which are the same as those of the first embodiment, is omitted like the second embodiment.

Figure 28:
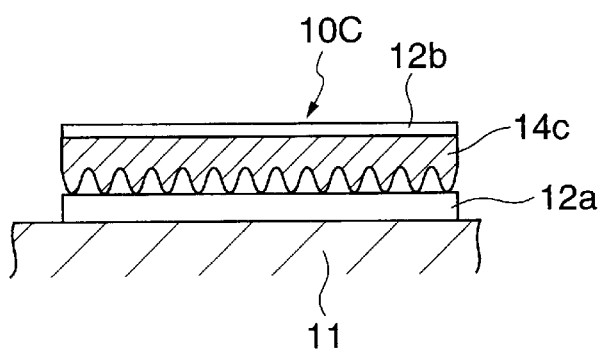
FIG. 28 illustrates a schematic configuration of a measurement sensor of a third embodiment.

A measurement sensor 10C of the third embodiment, as shown in FIG. 28, includes the first electrode 12a, an elastic resistance layer 14c knurled in one surface thereof, and the second electrode 12b, stacked in that order on a button 11a of a mouse 11 pressed with a finger surface during clicking.

Since the elastic resistance layer 14c knurled in one surface thereof, under pressure, contacts lightly the first electrode 12a in the knurling tips and has high contact resistance to it, little current flows. Upon application of pressing force, the knurling tips of the resistance layer 14c deform and a contact area with the first electrode 12a and contact pressure applied to the first electrode 12a increase. At this time, since the second electrode 12b provided on the layer above the resistance layer 14c is formed much thinner than the resistance layer 14c, it will deform in accordance with elastic deformation of the resistance layer 14c.

Accordingly, according to changes of the magnitude of pressing force applied in accordance with button pressing, clicking, and button release operations, the electrical resistance between the resistance layer 14c and the first electrode 12a drops and the amount of flowing current increases. Hence, like the above-described first embodiment, electrical resistance values between the first electrode 12a and the second electrode 12b are detected by the I-V converter circuit connected to the first electrode 12a, so that data reflecting finger movements can be obtained.

Where the resistance layer 14c is inelastic and the first electrode 12a is elastic, since the knurling tips of the resistance layer 14c invade into the first electrode 12a and the same increase in contact areas and contact pressure applied to the first electrode 12a occurs, finger movements can be observed as the same changes of electrical resistance.

As the elastic resistance layer 14c, for example, a conductive rubber having a resistivity of approximately $10^2$ Ωcm produced by dispersing carbon black in a silicon rubber or ethylene-propylene rubber (EPM, EPDM) can be used.

Also, as the elastic first electrode 12a, similarly, for example, conductive rubber approximately 100 to 1000 μm thick having a resistivity of approximately $10^{-1}$ Ωcm produced by dispersing carbon black in a silicon rubber or ethylene-propylene rubber (EPM, EPDM) can be used.

A conductive rubber is the most suitable because a desired knurled side can be relatively easily formed by frame molding or cutting. Of course, it goes without saying that resistive materials or conductive materials from which a knurled side can be formed can be used. Between the first electrode 12a and the resistance layer 14c, there may be provided a gas layer such as air and nitrogen, or an electrically insulative liquid layer such as mineral oil and silicon oil.

Fourth Embodiment

Figure 29:
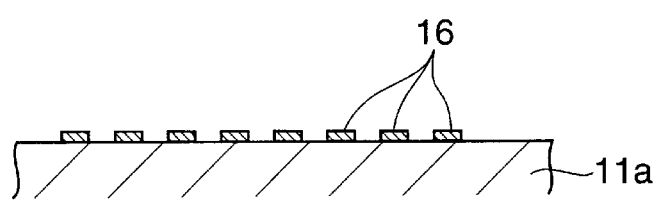
FIG. 29 illustrates a schematic configuration of a measurement sensor of a fourth embodiment.

FIG. 29 shows, as a fourth embodiment, another method of sensing finger movements as changes of electrical resistance. FIG. 29 shows, as a measurement unit, a group of a large number of stripe-shaped or island-shaped discrete, minute electrodes 16 formed on the button 11a of the mouse 11, wherein the electrodes 16 are formed on a side so that they are electrically disconnected from each other, and are conducted through a finger when the finger contacts on the side. This configuration is based on the fact that the electrical resistance of a human body is usually 150 to 500Ω within the body, and on the skin when 15 VAC is applied, the resistivity of the dry hand is approximately $5 \times 10^3 \Omega$ and that of the wet hand is approximately $2 \times 10^3 \Omega$.

Specifically, in the fourth embodiment, since only the portion of discrete, minute electrodes 16 in an area contacting a finger is conducted during pressing, by measuring the resistance between adjacent electrodes, while resistance changes corresponding to contact areas can be sensed, the shape of a contacting finger surface in a contact state is electrically captured by detecting the positions of conducted discrete, minute electrodes 16.

As the discrete, minute electrodes 16, for example, linear electrodes approximately 100 to 1000 μm wide may be arranged at a pitch of approximately 100 to 1000 μm wherein its length is the width of a contacting finger or longer, say, approximately 10 mm or longer, preferably almost the width of the button 11a of the mouse 11 so that the electrodes are formed throughout the button 11a of the mouse 11. As another example, plural island-shaped electrodes 500 μm square may be disposed throughout the button 11a of the mouse 11 at an interval of 500 μm. The area occupied by the entire electrode group should be larger than that of the finger side so that finger movements can be correctly reflected.

The electrode group structure can, for example, be formed by forming, by a plating method, an excellent conductive metal film such as Cu, Au, and Ni on the surface of an insulated substrate such as glass epoxy, ceramic, or a metal film subjected to insulating coating, or by forming and then etching a film such as Pt or Pb.

When a finger contacts on these electrodes formed on the side, electrodes of the contact portion are electrically connected by the finger, and an electrical resistance corresponding to skin resistance of the contacting finger area can be observed between the connected adjacent electrodes. If these resistances between adjacent electrodes are fast and successively scanned and observed at all times or repeatedly, data reflecting changes of a contact state of the finger with the electrode group can be obtained.

Higher button pressing force makes the contact area between the electrode group on the button and the finger larger so that more electrodes are brought into conduction between adjacent electrodes. At the same time, with respect to a particular pair of adjacent electrodes, the contact area between the finger and the two electrodes increases and contact pressure becomes higher, so that the resistance between the two electrodes decreases gradually.

Usually, area expansion reaches a peak during clicking, and then the contact area decreases as the finger rises. By this method, two pieces of information, namely changes of the number of pairs of adjacent conducting electrodes (or interconduction count) and changes of resistance between adjacent electrodes, can be obtained.

Specifically, with linear electrodes, when a button is pressed to perform one click operation, the number of adjacent conducting electrodes increases gradually until the click operation, and then decreases, and the resistance between adjacent electrodes, with respect to the first pair of the electrodes recognized to be conducting, decreases gradually, reaches a peak during clicking, then decreases.

With island-shaped electrodes, since each electrode is smaller than a finger area, the entire electrode is covered with the finger surface. Therefore, changes of contact areas are almost not observed by changes of resistance between adjacent electrodes, as they are as described previously. However, changes of contact resistance can be captured by changes of contact pressure to each electrode.

Changes of the number of pairs of adjacent conducting electrodes obtained in this way and changes of electrical resistance between electrodes are data reflecting finger movements and provide data representing individual differences. Therefore, by grasping individuals' features from changes of the number of pairs of adjacent conducting electrodes and changes of electrical resistance between electrodes, matching and identification can be performed to determine, regularly or each time a predetermined file is opened, whether a current user is a registered user. A description of other configurations, which are the same as those of the first embodiment, is omitted.

Although, in the fourth embodiment, a group of a large number of electrodes is formed as a measurement unit, the invention is not limited to this configuration. Thus, any measurement unit including an electrode group having at least two electrodes is qualified. Individual electrodes are not limited to the stripe or island shape and a measurement unit may be configured with a combination of electrodes of various shapes such as ring electrodes and circular electrodes. In this case, greater accuracy can be obtained by disposing electrodes of various shapes in combination to facilitate the occurrence of the features of finger movements.

Fifth Embodiment

Figure 30:
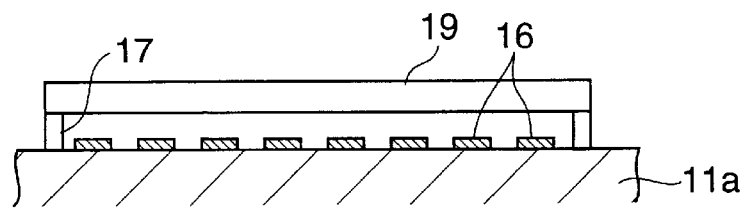
FIG. 30 illustrates a schematic configuration of a measurement sensor of a fifth embodiment.

A fifth embodiment of FIG. 30 is an example of application of the fourth embodiment. To obtain more stable data, a filmy resistance element approximately 20 to 500 μm thick or a protective layer 19 made of a conductive material to serve as substitution of skin is provided on a group of plural electrodes disposed throughout the button 11a of the mouse 11.

The protective layer 19, as shown in FIG. 30, is stretched by insulative spacers 17 provided at the circumference of the linear or island-shaped electrode group 16 (hereinafter referred to as the electrode group 16) so that it does not contact the electrode group 16 physically.

With this configuration, when no pressing force is applied, the electrode group 16 is held in an electrical noncontact state, and when pressing force is applied, changes of the number of pairs of adjacent conducting electrodes and changes of electrical resistance between electrodes are obtained corresponding to the press area and contact shape of a finger surface that change in accordance with finger movements.

If the contact resistance between the protective layer 19 and the electrode group 16 is large, the protective layer 19 may contact lightly on the electrode group 16 due to its natural weight without being stretched by the spacers 17. In this case, the protective layer 19 should be constructed so as not to move.

It is desirable that the protective layer 19 is made of such a flexible material as deforms in accordance with changes of the pressure of contact with a finger. Usable materials include, e.g., films having a resistivity of $10^2$ to $10^6$ Ωcm produced by evaporating and then oxidizing an indium oxide with a tin oxide appended to the surface of a heat-resistant polymeric film such as a polyester film 50 to 500 µm thick, and a conductive rubber 100 to 200 µm thick having a resistivity of approximately $10^{-1}$ to $10^2$ Ωcm produced by dispersing a carbon black, black lead, Ag powder, or Ni powder in a silicon rubber or ethylene-propylene rubber (EPM, EPDM). With this configuration, a conduction state between the electrode groups 16 changes in accordance with deformation of a shape of a finger surface by applying pressing force by the finger, so that data reflecting finger movements can be obtained.

Sixth Embodiment

Figure 31A:
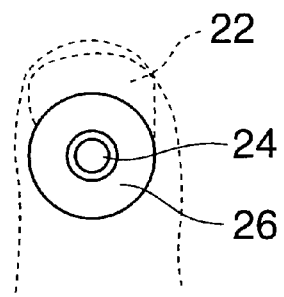
FIG. 31 illustrates a schematic configuration of a measurement sensor of a sixth embodiment.

FIG. 31 shows an example of another configuration of a measurement sensor sensing finger movements as changes of electrical resistance. As shown in FIG. 31A, there are provided a circular electrode 24 approximately 2 mm in diameter, provided at a portion (e.g., near the center of a curved surface, if any, on a button at which a finger first touches) in which the surface of a finger 22 touches first during operations of the button of the mouse 11, and a ring electrode 26 approximately 3 mm in inside diameter and approximately 10 mm in outside diameter, formed concentrically with the circular electrode 24. By making the dimension of an area occupied by the two electrodes 24 and 26 slightly larger than that of the contact area of a finger during button operations, information of all changes of contact areas can be obtained. Since the dimension of a finger surface during button operations is generally approximately 10 mm in diameter, the outer dimension of the ring electrode 26 may be 10 mm or more. In this embodiment, the ring electrode 26 has an outer dimension of approximately 10 mm.

Figure 31B:
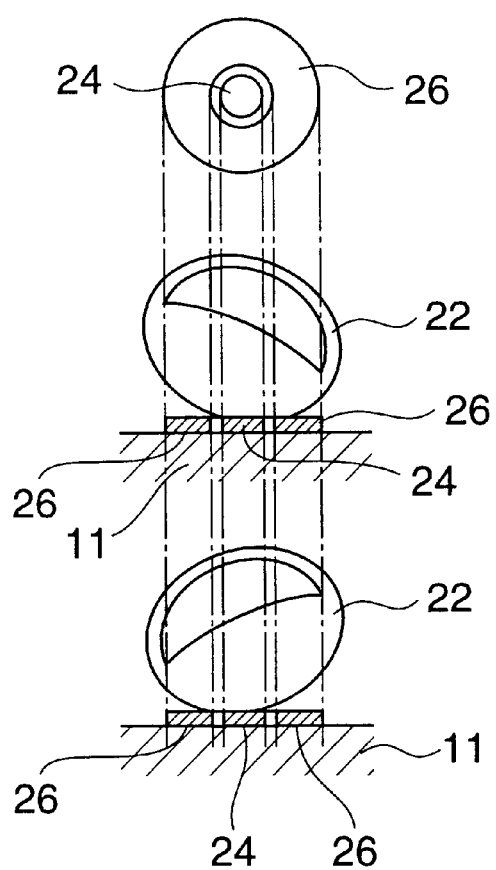

In this configuration, as shown in FIG. 31B, when a button is pressed, a finger touches the two electrodes at the same time and thereby the two electrodes are brought into conduction. Since the state of contact of the finger surface with the two electrodes 24 and 26 changes in accordance with finger movements, electrical resistance between the two electrodes 24 and 26 changes in accordance with changes of contact resistance between the finger and the electrodes and changes of a contact area between the finger and the electrodes, so that data reflecting finger movements during button operations will be detected.

Particularly, this configuration is effective when a groove or a curved surface for stabling a contact position of a finger is provided on the button 11a or housing of the mouse 11. Although, in the sixth embodiment, one ring electrode is provided to be concentric with the circular electrode 24, of course, the present invention is not limited to this configuration. Thus, the present invention may be constructed to include an electrode provided on a side and at least one electrode displaced so as to surround the electrode.

For example, plural ring electrodes may be provided to be concentric with the circular electrode 24, or the circular electrode 24 may be surrounded by a large number of electrodes, without being limited to ring electrodes. In either case, the same effect could be obtained. In these configurations, by measuring changes of electrical resistance between each electrode and the central electrode 24, a contact shape of the finger surface can be detected. A description of other configurations, which are the same as those of the fourth embodiment, is omitted.

Seventh Embodiment

Figure 32A:
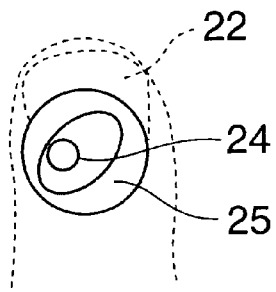
FIG. 32 illustrates a schematic configuration of a measurement sensor of a seventh embodiment.

A seventh embodiment of FIG. 32 is an example of application of the sixth embodiment. To obtain more stable data, as shown in FIG. 32A, the inside area of the ring electrode 25 is elliptic and placed off the center of the circular electrode 24. The inside area of the ring electrode 25, in this embodiment, is approximately 7 mm in the long axis and approximately 3 to 5 mm in the short axis. The ellipse is disposed with the long axis direction tilted by, e.g., 45 degrees with respect to the direction of the length of a finger so that it is asymmetrical to the right and left sides.

Figure 32B:
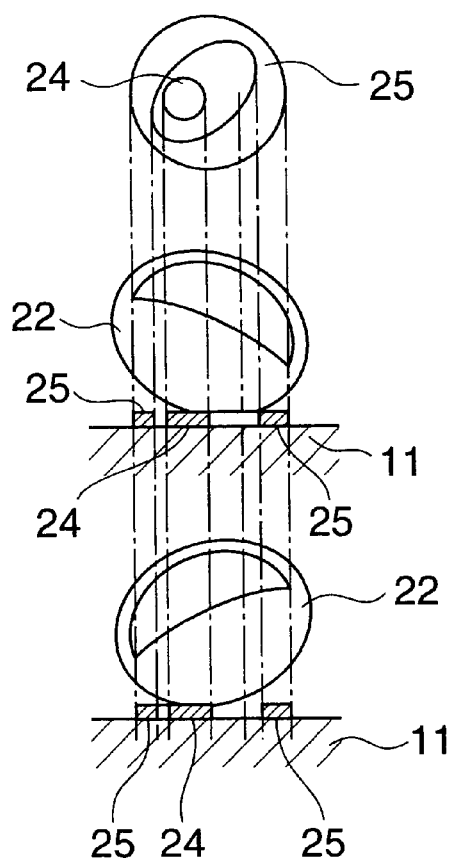

By this arrangement, as shown in FIG. 32B, even when a finger is tilted like mirror symmetry as viewed from the front of the finger, since there is a difference between the areas of contact with the two electrodes 24 and 25, individual differences can be more clearly identified. Accordingly, data reflecting individual differences in the tile of the finger (as viewed from the front thereof) can be obtained, in addition to changes of electrical resistance occurring in accordance with changes of contact resistance between the finger and the electrodes and changes of a contact area between the finger and the electrodes.

Although, in the seventh embodiment, there is provided one ring electrode in which an elliptic inside area with its center located off the center of the circular electrode 24 is formed, of course, the present invention is not limited to this configuration.

For example, plural elliptic ring electrodes with its center located off the center of the circular electrode 24 may be concentrically provided, or the circular electrode 24 may be surrounded by a large number of electrodes, without being limited to ring electrodes. In either case, the same effect could be obtained. In these configurations, by measuring changes of electrical resistance between each electrode and the central electrode 24, a contact shape of the finger surface can be detected. A description of other configurations, which are the same as those of the fourth embodiment, is omitted.

Although, in this embodiment, the inside area the ring electrode 25 is elliptic, of course, without being limited to elliptic shapes, any shape which is asymmetric to the right and left sides, including egg shapes, is permitted.

Eight Embodiment

Although the above-described first to seventh embodiments detect changes of resistance flowing between a pair of electrodes, the eighth embodiment detects finger movements as physical amounts by using a material that changes in capacitance in accordance with changes of a contact area between a finger and a side. Capacitance is measured with the same configurations (not described) as those of the first embodiment, except for the configuration of a measurement sensor 10D.

Figure 33:
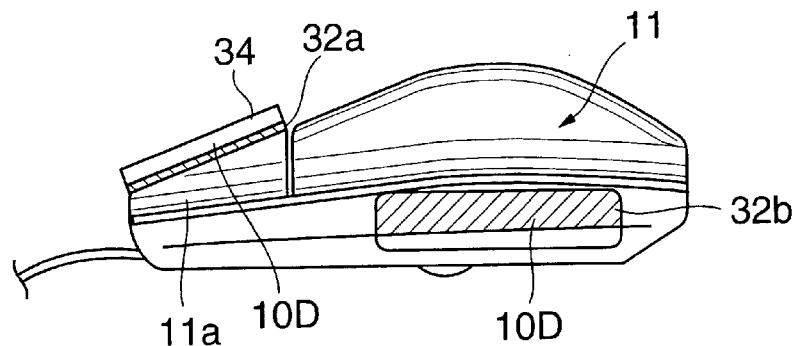
FIG. 33 illustrates a schematic configuration of a measurement sensor of an eighth embodiment.

The measurement sensor 10D of the eighth embodiment, as shown in FIG. 33, includes a first conductive layer 32a and a dielectric layer 34 stacked on the button 11a of the mouse 11 pressed with a finger surface during clicking, and a second conductive layer 32b provided at a portion contacting a hand palm when the mouse 11 is grasped by a user, which is, in the eight embodiment, the side of the mouse 11.

A constant voltage is applied to the first conductive layer 32a and the second conductive layer 32b, and a capacitance measurement apparatus (not shown) is connected to measure capacitance between the first conductive layer 32a and the second conductive layer 32b, with the output of the capacitance measurement apparatus being used as the output of the measurement sensor 10D. The first conductive layer 32a and the second conductive layer 32b may be made of, e.g., a conductive material produced by dispersing a conductive powder, such as a carbon powder, a metal powder, or metal fiber in a metal, or a plastic material constituting the housing and buttons.

The dielectric layer 34 is made of an elastic material that deforms in accordance with the pressing force applied by a finger. Such suitable elastic materials include, e.g., silicon rubbers ($\epsilon/\epsilon_0$=8.6 to 8.5) 100 to 1000 μm thick under no pressure, natural rubbers ($\epsilon/\epsilon_0$=2.4), and Neoprene rubbers ($\epsilon/\epsilon_0$=6.5 to 5.7).

Since, when a user grasps the mouse 11 thus constructed, human skin resistance, as described above, is approximately $5 \times 10^3 \Omega$ in a dry condition and approximately $2 \times 10^3 \Omega$ in a wet condition, the finger of the user operating the button 11a of the mouse 11 goes to almost the same potential as the second conductive layer 32b, and therefore the finger tip can be seen as the second conductive layer 32b. Hence, since operations on the button 11a by the user bring the finger tip close to the first conductive layer 32a, it can be the that the distance d between the first conductive layer 32a and the second conductive layer 32b becomes short.

There is a relation of $C = \epsilon \cdot S/d$ among capacity C, the distance d between electrodes, an electrode area S, and a dielectric constant $\epsilon$. Therefore, it will be appreciated that the reduction in the distance d between the first conductive layer 32a and the second conductive layer 32b increases capacitance C. Specifically, the magnitude of capacitance C changes reflecting the sum of changes of a contact area between a finger and the dielectric layer 34 when a user operates the button 11a, and changes of pressing amounts at minute points within a contact surface of the finger.

Changes of a contact area of a finger and changes of a pressing amount of the finger tip are data reflecting finger movements, as shown in FIGS. 2 to 6, and provide data representing individual differences. Specifically, in accordance with button pressing, clicking, and button release operations, a contact area of a finger contacting with the measurement sensor 10D and the distance between the electrodes at each minute point of the finger contacting with the measurement sensor 10D change, and in accordance with these changes, the output values of the capacitance measurement apparatus change with the same tendency as that of voltage changes with respect to time, shown in FIG. 9.

By capturing individuals' features based on changes of capacitance C as described above, matching and identification can be performed to determine, regularly or each time a predetermined file is opened, whether a current user is a registered user. A description of other configurations, which are the same as those of the first embodiment, is omitted.

Without constructing the first conductive layer 32a and the second conductive layer 32b independent of the mouse, they may be electrically disconnected by dispersing a conductive powder, such as a carbon powder, a metal powder, or a metal fiber in each of the button portion and the cabinet portion of the mouse, with the dielectric layer 34 made of an elastic material provided on the button surface of the mouse.

Ninth Embodiment

As a ninth embodiment, another configuration of a measurement sensor sensing finger movements as changes of capacitance is described. A description of configurations other than the configuration of a measurement sensor 10E, which are the same as those of the eighth embodiment, is omitted.

Figure 34:
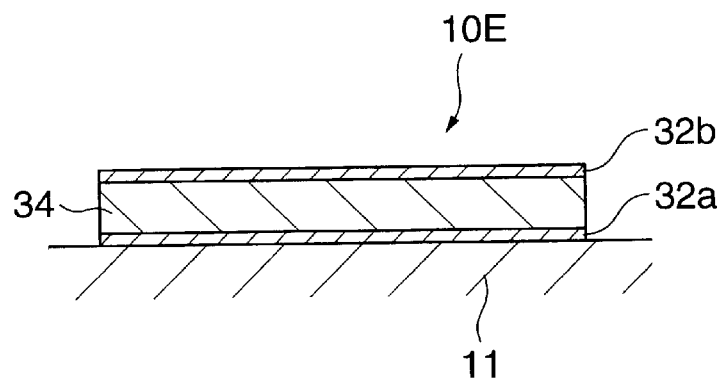
FIG. 34 illustrates a schematic configuration of a measurement sensor of a ninth embodiment.

A measurement sensor 10E of the ninth embodiment, as shown in FIG. 34, includes the first conductive layer 32a, an elastic dielectric layer 34, and the second conductive layer 32b stacked on the button 11a of the mouse 11 pressed with a finger surface during clicking.

A constant voltage is applied to the first conductive layer 32a and the second conductive layer 32b, and the capacitance measurement apparatus (not shown) is connected to measure capacitance between the first conductive layer 32a and the second conductive layer 32b, with the output of the capacitance measurement apparatus being used as the output of the measurement sensor 10E. The dielectric layer 34 between the first conductive layer 32a and the second conductive layer 32b is constructed to deform in accordance with the pressing force applied by a finger.

In the measurement sensor 10E thus configured, in accordance with the magnitude of pressure applied by a press operation with the finger, the dielectric layer 34 deforms so that the first conductive layer 32a and the second conductive layer 32b provided on top of the dielectric layer 34 are brought closer, resulting in an increase in capacitance C. The dielectric layer 34 with gas filled in a hermetic cell not open to air is particularly preferable for the following reason. Since a dielectric constant $\epsilon$ changes with molecular density, measured values including a change of a dielectric factor $\epsilon$ corresponding to a compression by pressing force, as well as a change of the distance d between the electrodes are obtained, so that more accurate data for identifying individuals is obtained.

Changes of a contact area of a finger and changes of a pressing amount of the finger tip are data reflecting finger movements, as shown in FIGS. 2 to 6, and provide data representing individual differences. Specifically, in accordance with button pressing, clicking, and button release operations, a contact area of a finger contacting the second conductive layer 32b and the distance between the electrodes at each minute point of the finger contacting the second conductive layer 32b change, and in accordance with these changes, and the magnitude of capacitance C changes reflecting the sum of changes of a pressing amount at each minute point.

Therefore, the output values of the capacitance measurement apparatus change with the same tendency as that of voltage changes with respect to time, shown in FIG. 9.

By capturing individuals' features based on changes of capacitance C as described above, matching and identification can be performed to determine, regularly or each time a predetermined file is opened, whether a current user is a registered user. A description of other configurations, which are the same as those of the first embodiment, is omitted.

Although, in the ninth embodiment, the first conductive layer 32a and the second conductive layer 32b may be rigid it is desirable that the second conductive layer 32b contacting a finger particularly has flexibility so that it deforms along the shape of the finger surface.

Particularly, when the second conductive layer 32b is flexible, since it becomes susceptible to finger shapes, changes of capacitance exhibit individual differences more clearly. Specifically, among persons pressing a button with the same pressure, in the case of a rigid conductive layer, changes of capacitance C are equal because the distance d between the electrodes changes equally, while, in the case of a flexible electrode, changes of capacitance differ slightly because the shape of the dielectric layer 34 between the first conductive layer 32a and the second conductive layer 32b differs depending on the shape of a finger tip or the softness of the finger and the distance between the electrodes differs depending on spots.

As such flexible conductive materials, films having a resistivity of $10^2$ to $10^6$ $\Omega$cm which are obtained by evaporating and then oxidizing an indium oxide with a tin oxide appended to the surface of a heat-resistant polymeric film such as a polyester film 10 to 100 μm thick, and metal sheets such as stainless steel can be used.

When the dielectric layer 34 is an elastic solid, the conductive layers 32a and 32b may be directly formed on the dielectric layer 34 by conductive coating produced by dispersing a conductive filler such as a Ni flake, Cu powder, Ag powder, or carbon black in a polymer matrix such as an acryl resin, polyurethane, polyester, polyvinyl chloride (PVC) or a conductive ink produced by dispersing a black lead, carbon black, Ag powder, Cu powder, or the like in an epoxy resin, phenolic resin, saturated copolymerized polyester, polyurethane, or the like.

The dielectric layer 34 may be made of any material that can deform according to the pressing force applied by a finger, such as fluid like gas or liquid, or an elastic solid. The most suitable materials are, e.g., gas such as air, nitrogenous gas, and helium gas; liquid such as ethyl alcohol ($\epsilon/\epsilon_0$=24.3), silicon oil ($\epsilon/\epsilon_0$=2.2), paraffin oil ($\epsilon/\epsilon_0$=2.2); and elastic rubber such as silicon rubber 100 to 1000 $\mu$m thick ($\epsilon/\epsilon_0$=8.6 to 8.5) under no pressure, natural rubber ($\epsilon/\epsilon_0$=2.4), neoprene rubber ($\epsilon/\epsilon_0$=6.5 to 5/7). For gas and liquid, spacers 100 to 1000 $\mu$m thick should be provided in the edges between the conductive layers 32a and 32b to keep the distance d between the electrodes stable under no pressure.

The measurement sensor 10E thus constructed may be provided on the back of the button 11a (see FIG. 33) of the mouse 11. In this case, for example, the first conductive layer 32a may be stuck to the back of the button 11a and an elastic, deformable projection may be provided just near the surface of the second conductive layer 32b so that the projection elastically deforming in accordance with click operations presses against the second conductive layer 32b to reduce the distance between the first conductive layer 32a and the second conductive layer 32b, thereby changing capacitance C. This construction has the advantage of having little danger of contamination and damage because the measurement sensor 10E is inside the housing of the mouse.

Tenth Embodiment

Figure 35:
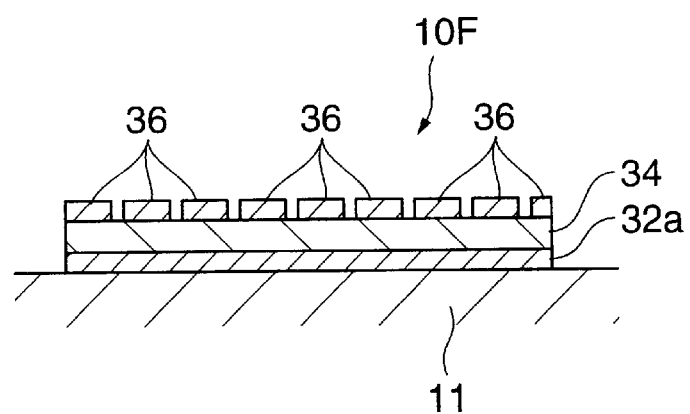
FIG. 35 illustrates a schematic configuration of a measurement sensor of a tenth embodiment.

FIG. 35 shows an example of another configuration of a measurement sensor sensing finger movements as changes of capacitance. Plural capacitors are used. A description of configurations other than the configuration of a measurement sensor 10F, which are the same as those of the eighth embodiment, is omitted.

A measurement sensor 10F of the tenth embodiment, as shown in FIG. 35, includes a conductive layer 32, a dielectric layer 34, and plural minute conductive layers 36 disposed on the surface of the dielectric layer 34, stacked on the button 11a of the mouse 11 pressed with a finger surface during clicking.

Constant voltages are respectively applied to the first conductive layer 32 and the plural minute conductive layers 36, and a capacitance measurement apparatus (not shown) is connected to each of the minute conductive layers 36 to measure capacitance between the conductive layer 32 and the minute conductive layers 36, with the capacitance output of the capacitance measurement apparatus and the position of a corresponding minute electrode 36 being used as the output of the measurement sensor 10F. The dielectric layer 34 between the conductive layer 32 and the plural minute conductive layers 36 is constructed to deform in accordance with the pressing force applied by a finger, like that of the ninth embodiment.

The plural minute conductive layers 36, each of which is, e.g., of linear shape 100 to 1000 $\mu$m wide, may be arranged at an interval of 50 to 100 $\mu$m. Although the length of each minute electrode may be the width of a contacting finger or longer, preferably, e.g., 10 mm or more, in the tenth embodiment, it is set to nearly the width of the button so that the plural minute conductive layers 36 are formed throughout the button.

As another configuration, the minute conductive layers 36 each, e.g., 800 $\mu$m square may be two-dimensionally disposed at an interval of 500 $\mu$m. With such a construction, the respective intervals between the plural minute conductive layers 36 and the opposed conductive layer 32 will take respectively different values in accordance with changes of the shape of a finger surface. Data reflecting finger movements can be obtained by measuring changes of the capacitance between each minute conductive layer 36 and the conductive layer 32.

Specifically, the eighth and ninth embodiments use one capacitor to detect data representing changes of capacitance reflecting the sum of changes of the contact area of a finger and changes of a pressing amount, while the tenth embodiment disposes plural capacitors on a side of a mouse to detect data representing changes of capacitance reflecting the sum of changes of a contact area of the finger and changes of a pressing amount, and detects a contact shape of the finger surface based on position information corresponding to the output information of each capacitor to include the contact shape in data reflecting finger movements.

A description of materials the conductive layer 32, the dielectric layer 34, and the minute conductive layers are made of is omitted because the same materials as described in the ninth embodiment can be used.

Eleventh Embodiment

The following eleventh to seventeenth embodiments detect finger movements by optical measuring parts. The optical measuring parts basically irradiate a finger with light and observe how reflected light from the finger changes according to finger movements, or use changes of optical properties of an object that is deformed or moved by the button pressing force by the finger.

In the eleventh embodiment, a description is made of the configuration of a measurement sensor which uses a material which changes the amount of light transmitted therethrough in amount in accordance with changes of a contact area between a finger and a side to detect finger movements as changes of the amount of transmitted light. Also in the optical detection, except for the configuration of the measurement sensor 10D, the same configuration (not described) as that of the first embodiment is used.

Figure 36:
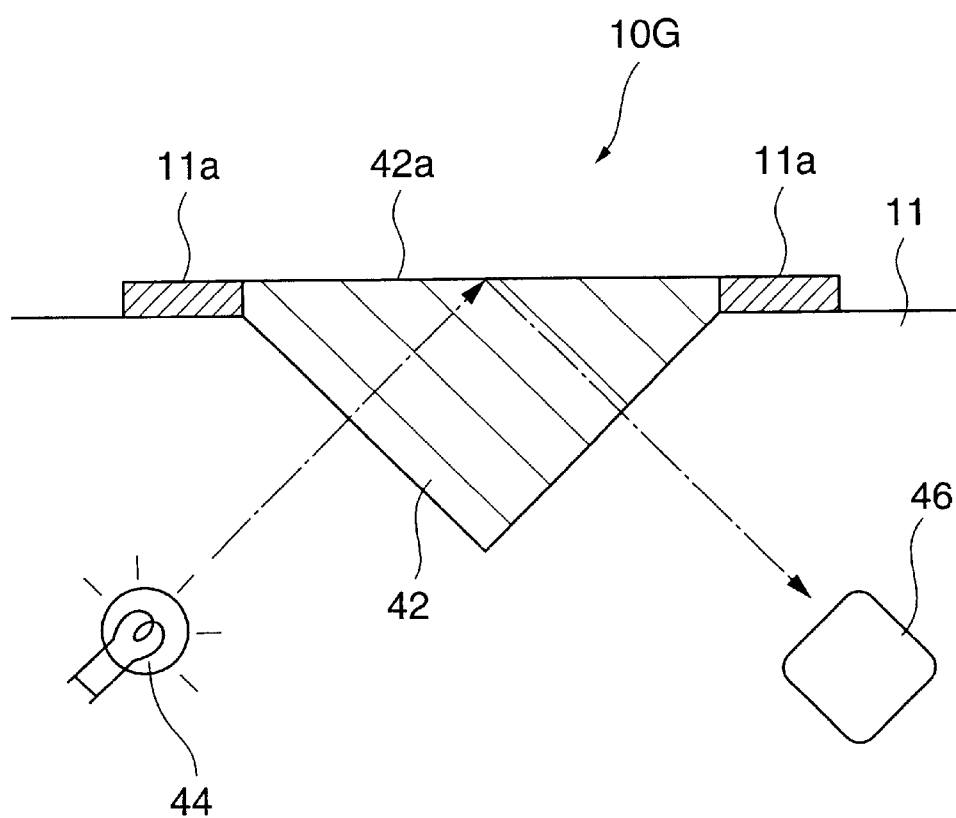
FIG. 36 illustrates a schematic configuration of a measurement sensor of an eleventh embodiment.

The measurement sensor 10G of the eleventh embodiment, as shown in FIG. 36, includes a prism 42 incorporated in a side of the button 11a (see FIG. 33) surface of the mouse 11, an LED 44 to illuminate the prism 42 from the back of the mouse 11, and a light amount detection sensor 46 to detect the amount of light from the prism 42.

The LED 44 is provided at the back of the button of the mouse 11 by a spacer (not shown) so as to always irradiate the same position, and starts illumination as soon as the matching and identification program is started.

As the light amount detection sensor 46, which detects light reflected by the prism, PN photodiodes such as GaP, amorphous Si, and GaAs, and photoconductive elements such as Pbs, CdS, and CdSe can be used.

In this configuration, when nothing is mounted on the finger mounting side 42a of the prism 42, since light from the LED 44 is totally reflected, more reflected light is detected by the light amount detection sensor 46. When a finger is mounted on the finger mounting side 42a, since the refractive index of grease and sweat on the finger surface, and the prism is close at the mounted portion, light from the LED 44 reaches the skin surface. As a result, the color of the skin is detected by the light amount detection sensor 46, so that a light amount decreases.

Figure 2:
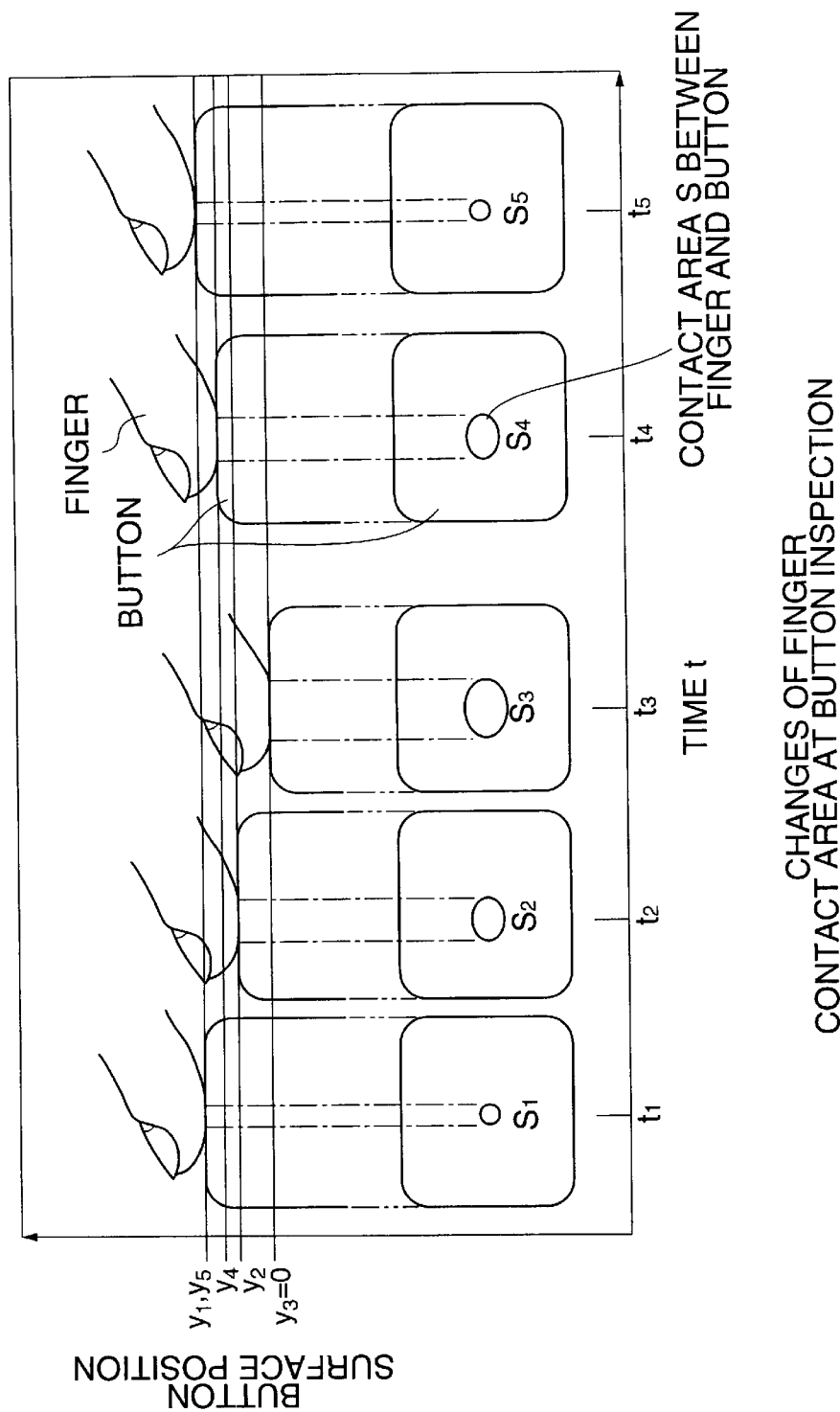
FIG. 2 illustrates the relationship between button surface positions and contact areas between a button and a finger during button operations.
Figure 3:
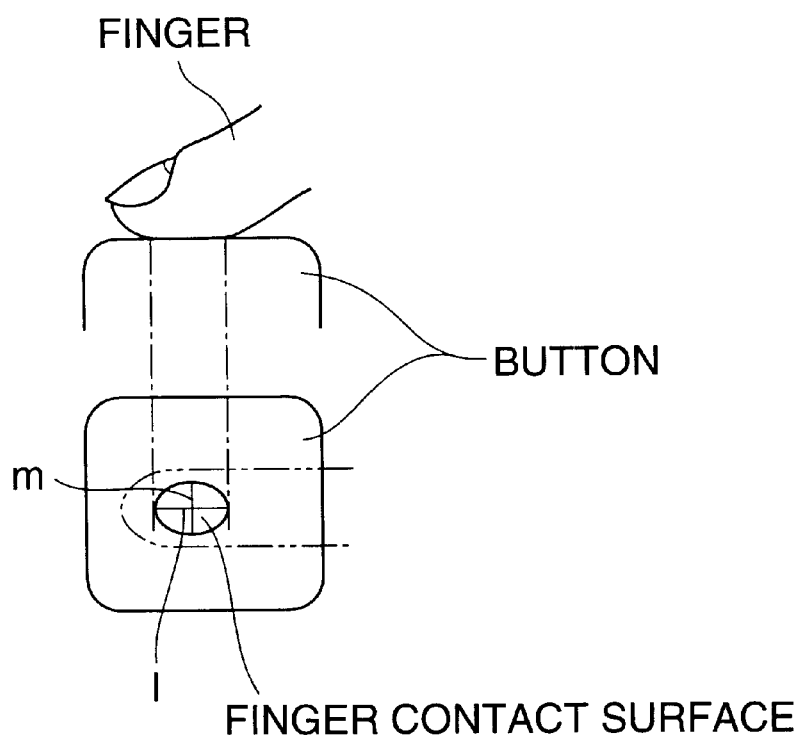
FIG. 3 illustrates an example of the shape of a finger when a side is pressed.
Figure 4:
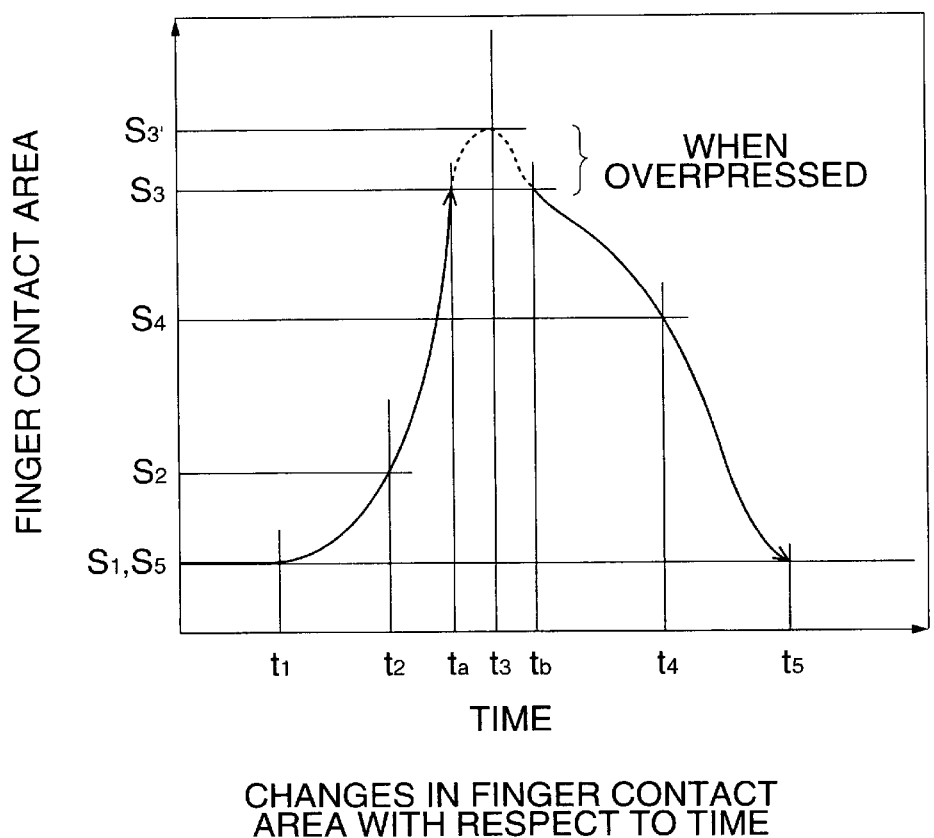
FIG. 4 is a graph showing changes of contact areas with respect to time.
Figure 5:
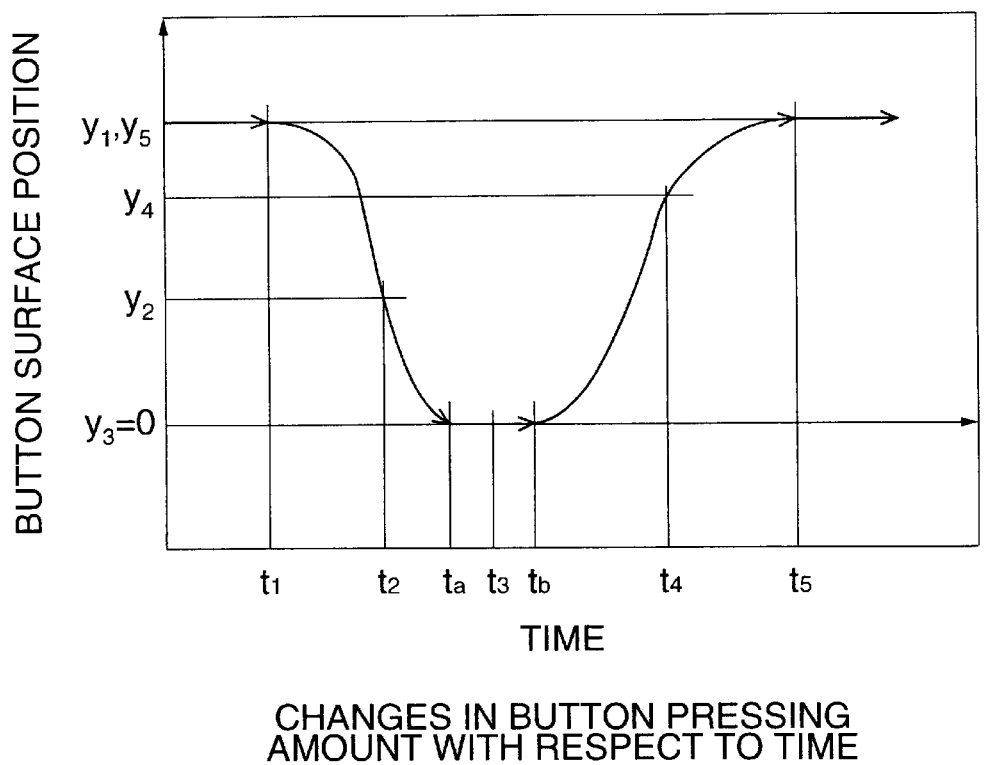
FIG. 5 is a graph showing changes of button surface positions with respect to time.
Figure 6:
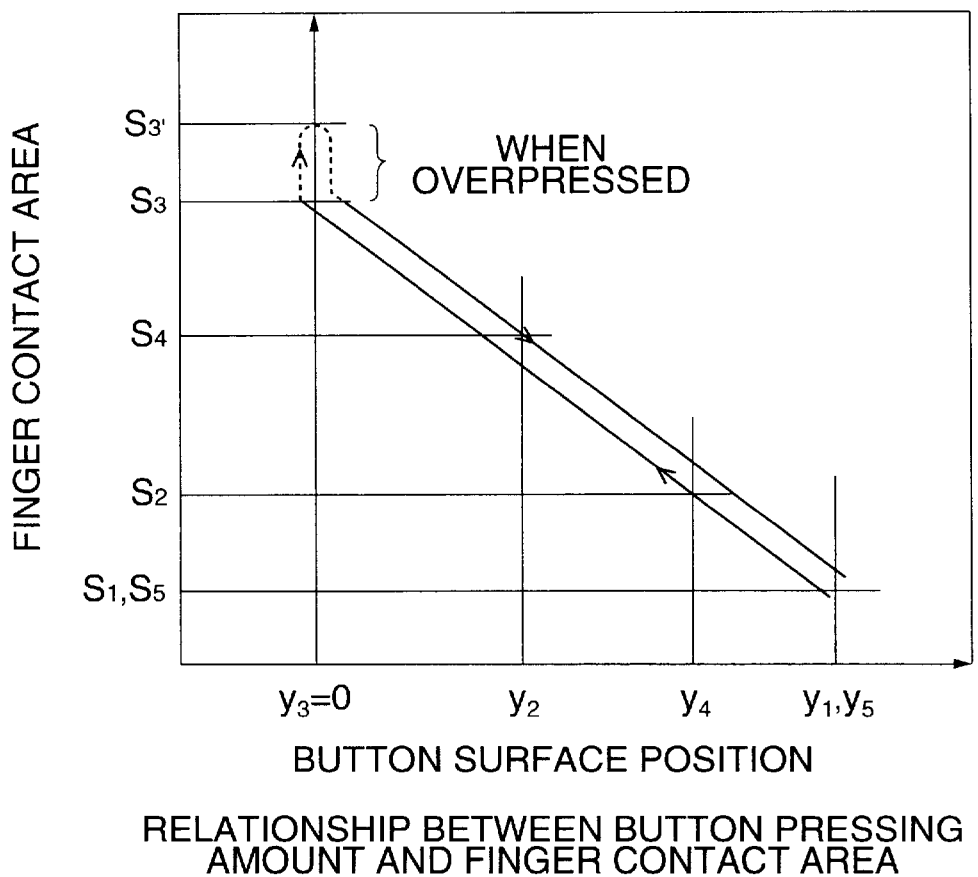
FIG. 6 is a graph showing a numerical representation of the relationship between button surface positions and contact areas between a button and a finger during button operations of FIG. 2.

Accordingly, as shown in FIG. 2, the amount of light incident to the light amount detection sensor 46 will change in accordance with changes of a contact area between the finger and the prism 42. In this case, the amount of light incident to the light amount detection sensor 46 decreases as the button 11a of the mouse is pressed downward, and as the finger goes up after clicking, the amount of light incident to the light amount detection sensor 46 increases, so that data having a stable value is ultimately obtained.

The obtained data is data indicating individual differences that has values reflecting finger movements, and finger shape and softness. Accordingly, matching and identification can be performed to determine, regularly or each time a predetermined file is opened, whether a current user is a registered user, by capturing individuals' features based on changes of a light amount.

As the light amount detection sensor 46, in place of sensors detecting only light amount, one-dimensional or two-dimensional solid image sensors of CCD, MOS, CPD, and other types can also be used. In this case, in addition to detection of changes of the amount of reflected light, data, as information, containing changes of a contact shape between a finger and the prism as shown in FIG. 2 is obtained, so that more accurate data for identifying individuals is obtained. A description of other configurations, which are the same as those of the first embodiment, is omitted.

Twelfth Embodiment

In the twelfth embodiment, a description is made of another configuration of a measurement sensor optically capturing finger movements. A description of configurations other than the configuration of a measurement sensor 10H, which are the same as those of the eleventh embodiment, is omitted.

Figure 37A:
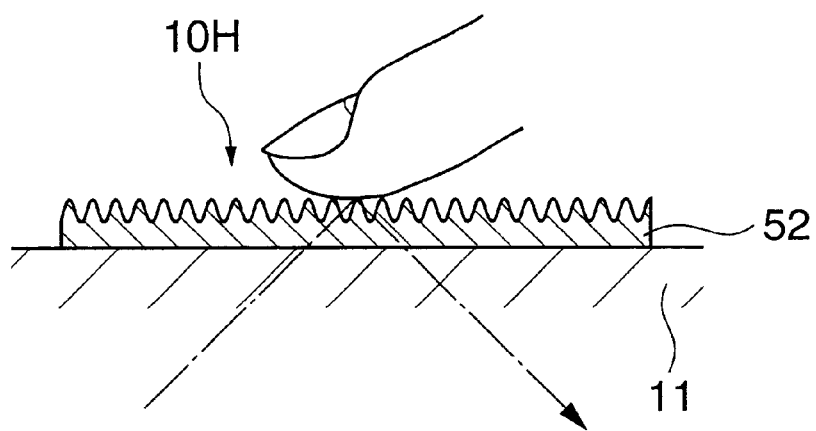
FIG. 37 illustrates a schematic configuration of a measurement sensor of a twelfth embodiment.

In the twelfth embodiment, the button 11a (see FIG. 33) of the mouse 11 is made of a transparent material. The measurement sensor 10H, as shown in FIG. 37A, includes: a semitransparent layer 52, stuck to the side of the button 11a surface, roughly finished so that light is scattered at a side contacting a finger; the LED 44 (see FIG. 36) to illuminate the semitransparent layer 52 from the back of the mouse 11; and the light amount detection sensor 46 (see FIG. 36) to detect the amount of light from the semitransparent layer 52.

The semitransparent layer 52 is made of inorganic glass, polymethylmethacrylate (PMMA), polycarbonate (PC), polystyrene, acrylonitrile-styrene copolymer, or the like each 100 to 1000 $\mu$m thick, and the surface contacting a finger is roughly finished by grinding, corroding, and embossing.

When a finger contacts on the rough surface, the depressions at the contact portion are buried in sweat or the invading finger, and the contact portion changes from milky color due to irregular reflection to the color of the finger. By detecting changes of reflected light amounts varying with the change by the photoconductive element or sensing changes of the amount of reflected light and its color by a sensor such as a solid image sensor, data containing changes of finger contact areas varying with finger movements and finger size, shape, softness, and the like is obtained.

Specifically, the amount of light incident to the light amount detection sensor 46 increases as the button 11a of the mouse is pressed downward, and as the finger goes up after clicking, the amount of light incident to the light amount detection sensor 46 decreases, so that data having a stable value is ultimately obtained.

Figure 37B:
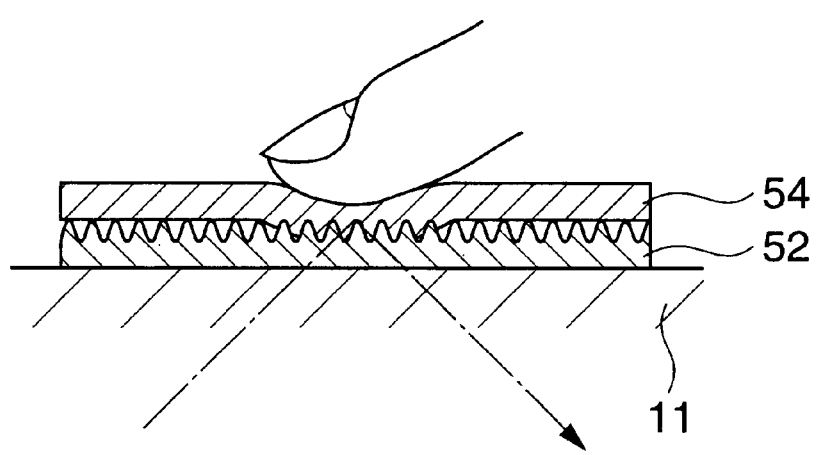

As shown in FIG. 37B, if an colored layer 54 is provided on top of the semitransparent layer 52, the portion of the colored layer 54 to which pressure is applied by the pressing force of a finger invades into the knurled side of the semitransparent layer 52 and changes from a cloudy color to the color of the colored layer. Consequently, since a contrast between portions where pressure is applied more intensively and those where not so is obtained, more accurate data can be detected. Although, in this configuration, a colored layer is used as a layer provided on top of the semitransparent layer 52, any configuration is permitted which allows the occurrence of a contrast between portions where pressure is applied and those where not; for example, a total reflection mirror layer may be provided.

The semitransparent layer 52 itself may be made of a soft material such as plasticized-polyvinyl chloride (PVC) with its surface knurled by molding or other methods. In this case, the semitransparent layer 52 may be constructed to deform to obtain different reflected light amounts at portions where pressure is applied by the pressing force of a finger. In this case, by disposing the knurled side in opposed relation to the side of the button 11a surface, when the soft semitransparent layer 52 is pressed with a finger, the projections at portions where pressure is applied become flat and the pressed portions become nearly transparent. As a result, desirably, there occurs a contrast between portions where pressure is applied and those where pressure is not applied.

Figure 38:
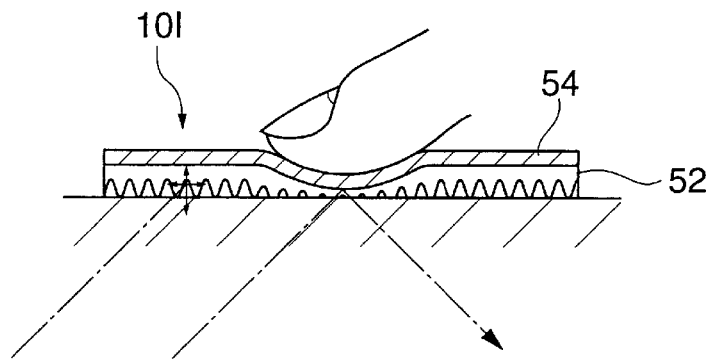
FIG. 38 illustrates a schematic configuration of an application example of the measurement sensor of the twelfth embodiment.

FIG. 38 shows an example of application of the twelfth embodiment. A measurement sensor 10I, which is made of an elastic material, includes the semitransparent layer 52 whose knurled side is disposed in opposed relation to the side of the button 11a surface, and a colored layer provided on top of the semitransparent layer 52.

This configuration has the advantage of being capable of more clearly detecting light amount changes at portions where pressure is applied. In this case, if the colored layer is black, the spread of a contact area can be regarded as a decrease in the amount of reflected light. Conversely, if the colored layer is white, the spread of a contact area can be regarded as an increase in the amount of reflected light.

Although, in the twelfth embodiment, a semitransparent layer knurled at one side is used, a semitransparent layer knurled at both sides may be used. In this case, the measurement sensor may be constructed so that a transparent, elastic layer is provided at the reverse of the side on which a finger contacts, and, upon pressing, the elastic layer invades into depressions of the knurled side and the finger invades into the depressions.

Thirteenth Embodiment

In the thirteenth embodiment, a description is made of another configuration of a measurement sensor optically capturing finger movements. A description of configurations other than the configuration of a measurement sensor 10J, which are the same as those of the eleventh embodiment, is omitted.

Figure 39A:
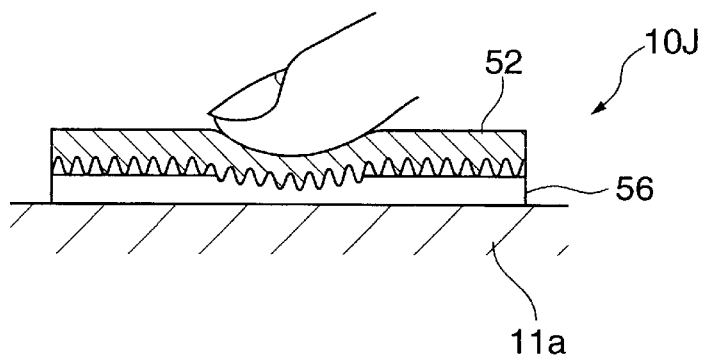
FIG. 39 illustrates a schematic configuration of a measurement sensor of a thirteenth embodiment.

In the thirteenth embodiment, the button 11a (see FIG. 33) of the mouse 11 is made of a transparent material. The measurement sensor 10J, as shown in FIG. 39A, includes: a transparent, elastic layer 56 made of a material whose refractive index is almost equal to that of the semitransparent layer 52, stuck to the side of the button 11a surface; and the semitransparent layer 52, disposed on top of the transparent, elastic layer 56 and knurled at a side facing thereto.

In the measurement sensor 10J, when the knurled side of the semitransparent layer 52 is brought into contact with the transparent, elastic layer 56 by the pressing force of a finger, the knurled side at the contact portion invades into the transparent, elastic layer 56 and the depressions are buried in the transparent, elastic layer 56.

Thereby, the portions where pressure is applied become from a semitransparent state to a transparent state, and the finger is observed when viewed from the back of the button 11a. Since the refractive index of the semitransparent layer 52 and that of the transparent, elastic layer 56 are almost equal, light 58a incident to a transparent portion is reflected and arrives in the light amount detection sensor 46, while most of light 58b arriving in other portions is scattered and does not arrive in the light amount detection sensor 46.

Accordingly, by observing the total amount of light reflected from the finger observed through the layers and a milky-colored side not in contact therewith by the light amount detection sensor 46 (see FIG. 33), data containing changes of finger contact areas varying with finger movements and finger size, shape, softness, and the like is obtained.

Figure 39B:
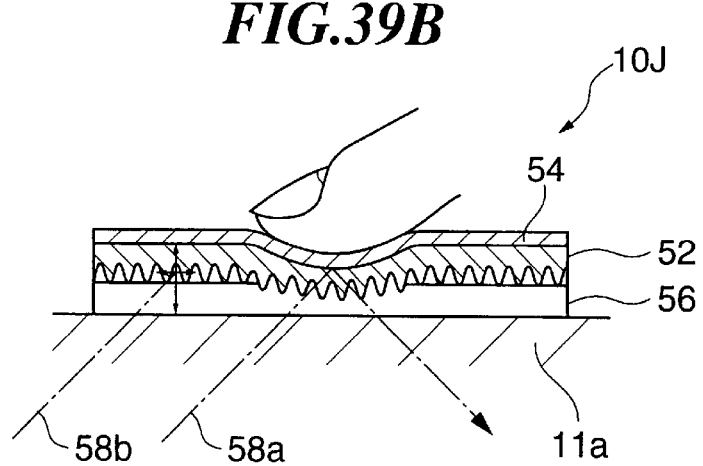

As shown in FIG. 39B, by providing a colored layer 54 at the top layer on which a finger contacts directly, since a contrast between portions where pressure is applied more intensively and those where not so is obtained, more accurate data can be detected. Although, in this configuration, a colored layer is used as a layer provided on top of the semitransparent layer 52, any configuration is permitted which allows the occurrence of a contrast between portions where pressure is applied and those where not so; for example, a total reflection mirror layer may be provided.

As the semitransparent layer 52, the following materials roughly finished by grinding, corroding, or embossing can be used: inorganic glass (refractive index 1.42 to 1.92); polymethylmethacrylate (PMMA) (refractive index 1.49); polycarbonate (PC) (refractive index 1.59); polystyrene (refractive index 1.59); and acrylonitrile-styrene copolymer (refractive index 1.57), or the like each 100 to 1000 µm thick. As the transparent, elastic layer 56, plasticized-polyvinyl chloride (PVC) (refractive index 1.52 to 1.55) or the like 50 to 1000 µm thick can be used.

Fourteenth Embodiment

In the fourteenth embodiment, a description is made of another configuration of a measurement sensor optically capturing finger movements, which optically grasps finger movements by moving fluid by pressing force. A description of configurations other than the configuration of a measurement sensor 10K, which are the same as those of the eleventh embodiment, is omitted.

Figure 40:
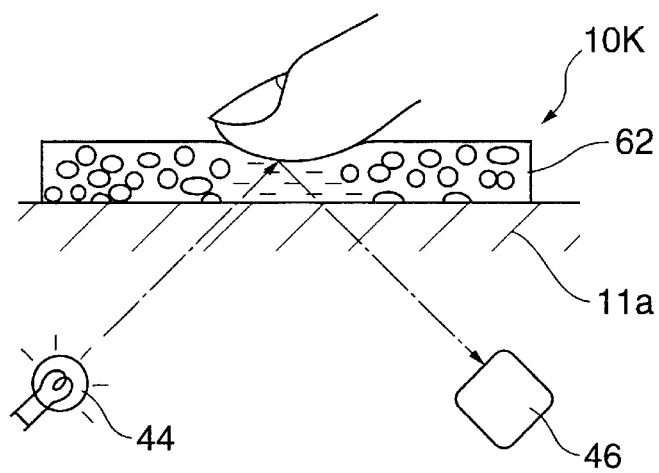
FIG. 40 illustrates a schematic configuration of a measurement sensor of a fourteenth embodiment.

In the fourteenth embodiment, the button 11a (see FIG. 33) of the mouse 11 is made of a transparent material. The measurement sensor 10K is formed by a porous layer 62 made of an elastic, transparent material, as shown in FIG. 40. The porous layer 62, which is light scatterable because of numerous internal pores, can be relatively easily formed using, e.g., an organic resin.

Although the porous layer 62 is milky-colored under no pressure because it scatters incident light, when pressed with a finger, it allows incident light to transmit therethrough because pores at the pressed portion become flat. Specifically, the amount of light incident to the light amount detection sensor 46 increases as the button 11a of the mouse is pressed downward, and as the finger goes up after clicking, the amount of light incident to the light amount detection sensor 46 decreases, so that data having a stable value is ultimately obtained.

Methods for forming the porous layer 62 by using an organic resin include, e.g., phase transformation method, stretching method, filler padding method, and the like. The phase transformation method solves an organic resin in a solvent and produces a film by casting and expanding the resulting product on a flat plate. After evaporating part of the solvent, the film is dipped in a liquid and coagulated to obtain the porous layer 62.

The filler padding method uses an organic resin as a binder and disperses a soluble filler in a liquid that does not react or dissolve with a supporting substrate, and after coating the supporting substrate, dissolves and removes the filler.

The stretching method produces a film from a crystalline organic resin, then heats it or appends a plasticizer to stretch one axis or two axes, and distorts the film to make pores. The porous layer 62 is required to have elasticity (Young's modulus $3 \times 10^2$ kgf/mm$^2$ or less) so as to deform with the pressure applied by a finger and return to its original shape when the finger is released, and optical transparency.

Suitable materials having such characteristics include thermoplastic elastomers such as polystyrene TPE (Thermo Plastic Elastomer), polyolefin TPE, polyurethane TPE, polyester TPE, polyamide TPE, chlorinated polymer TPE, and fluorine TPE.

The thermoplastic elastormers are easier to mold and easier to process in a film shape than vulcanized rubbers, and can maintain high strength without reinforcements such as a carbon black. Cellulose, cellulose nitrate, acetyl cellulose, polyvinyl alcohol, polypropylene (PP), polyethylene (PE), and the like can also be used.

The elastic porous layer 62 may be infiltrated with a transparent liquid of which the refractive index is almost equal to that of the material of the porous layer 62. The amount of the infiltrating liquid should be smaller than the whole pore volume of the porous layer 62. By doing so, since the pores are completely filled with the liquid when pressed, the amount of scattering can be minimized and the degree of collapse of pores can be reflected more accurately.

The following materials excellent in safety and stability are the most suitable as the above-described liquids: esters such as isopropyl myristate, isopropyl palmitate, hexyl laurate, and octyldodecyl myristate; vegetable oils such as corn oil, sunflower oil, palm oil, olive oil, and jojoba oil; alcohols such as ethyl alcohol and benzyl alcohol; and ethylene glycol, propylene glycol, 1,5-pentanediol, glycerin, silicon oil, water, and mixtures of them. To prevent the spillage and evaporation of the infiltrating liquid, it is usually desirable to cover the porous layer surface with a transparent film.

Although not shown, a colored layer or mirror layer may be provided at the side of the elastic porous layer 62 contacting a finger. This helps to increase the difference of the amount of reflected light between portions where scattering is suppressed by pressing force and a light transmittancy is increased, and those where no pressing force is applied.

Fifteenth Embodiment

In the fifteenth embodiment, a description is made of another configuration of a measurement sensor optically capturing finger movements by moving fluid by pressing force. A description of configurations other than the configuration of a measurement sensor 10L, which are the same as those of the eleventh embodiment, is omitted.

Figure 41:
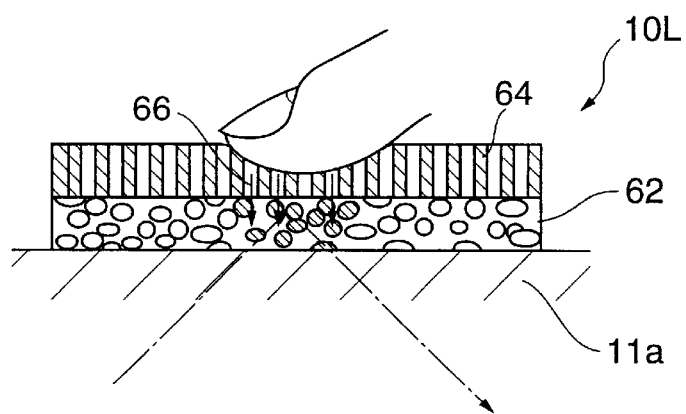
FIG. 41 illustrates a schematic configuration of a measurement sensor of a fifteenth embodiment.

In the fifteenth embodiment, the button 11a (see FIG. 33) of the mouse 11 is made of atransparent material. The measurement sensor 10L, as shown in FIG. 41, includes: the porous layer 62 made of an elastic, transparent material; and a liquid holding layer 64 infiltrated with a transparent liquid 66 of which the refractive index is almost equal to that of the porous layer 62.

At least one of the light scatterable porous layer 62 or the liquid holding layer 64 is an elastic body deformable by pressing force. In the fifteenth embodiment, a description is made of the case where the liquid holding layer 64 is an elastic body.

When pressing force is applied to the liquid holding layer 64, the liquid holding layer 64 at that portion contacts with the porous layer 62 and the transparent liquid 66 pressed out in accordance with the pressing force infiltrates from the liquid holding layer 64 to the porous layer 62. The infiltrated portion becomes almost transparent because pores of the porous layer 62 are filled with the transparent liquid 66.

As the button 11a of the mouse is pressed downward, the transparent liquid 66 infiltrates gradually from the liquid holding layer 64 to the porous layer 62 and the infiltrated portion becomes transparent. As the finger goes up after clicking, the transparent liquid 66 returns from the porous layer 62 to the liquid holding layer 64, so that the transparent portion into which the transparent liquid 66 infiltrated becomes semitransparent gradually in accordance with finger movements, and accordingly the amount of light incident to the light amount detection sensor 46 changes.

Specifically, a finger color and background colors such as the color of the liquid holding layer are detected in the transparent portion. Therefore, for dark background colors, as the button 11a of the mouse is pressed downward, a light absorption amount increases gradually, the amount of reflected light decreases, and the amount of light incident to the light amount detection sensor 46 decreases gradually. Afterward, as the finger goes up after clicking, the amount of light incident to the light amount detection sensor 46 increases gradually, so that data having a stable value is ultimately obtained. For bright background colors, since the amount of reflected light increases, the reverse light amount changes of the above are detected.

In this case, if the liquid holding layer 64 is made of a colorless material appearing in milky-color due to light scattering, like the light scatterable porous layer 62, even if the transparent liquid 66 moves to the light scatterable porous layer 62, the liquid holding layer 64 in the movement area is light-scattered and becomes milky-colored, making it difficult to obtain a contrast. In this case, it is desirable that the liquid holding layer 64 is colored or is made of a transparent material free of light scattering.

The porous layer 62 can be obtained by the above-described methods such as the phase transformation method, stretching method, filler padding method, and the like. Materials may be the thermoplastic elastomers as described previously; cellulose, cellulose nitrate, acetyl cellulose, polyamide, polymethyl methacrylate, polycarbonate, polyvinyl alcohol, and polyurethane produced by the phase transformation method and the filler padding method; or polypropylene (PP) and polyethylene (PE) produced by the stretching method. To increase the mechanical strength of the porous layer 62, a filler may be appended to the above-described organic resins.

Suitable fillers used in this case are silica, polymerized melamine, and calcium carbonate that are close to the above-described organic materials in refractive index. A desirable range of filler size is 0.1 to 5 $\mu$m because less than 0.1 $\mu$m is little effective in increasing strength and more than 5 $\mu$m reduces the milky-color level of the light scatterable porous layer 62. It is desirable that the fillers are appended with a mixture ratio of 5% to 75% of weight to increase reinforcement effect.

It is desirable that the thickness of the porous layer 62 is between 5 to 1000 $\mu$m, preferably between 10 to 100 $\mu$m. When 5 $\mu$m or less, a sufficient milky-color level cannot be obtained, so that it is difficult to obtain a contrast. When 1000 $\mu$m or more, button operability decreases. If the volume ratio of the pore volume of the porous layer 62, or porosity is 10 to 85% and an average pore ratio is 0.01 to 200 $\mu$m, then a sufficient light scattering state, that is, a milky color is obtained. For a porosity of 10% or less, a milky-color level is insufficient and a satisfactory contrast cannot be obtained. For a porosity of 85% or more, the mechanical strength of the porous layer 62 decreases and cannot withstand repeated operations of the button.

The liquid holding layer 64 may be made of any material and may be of any construction so long as it can hold the transparent liquid 66 by, e.g., capillarity and swelling. The materials may be, e.g., gel, porous, web-like, or nonwoven-like. Such constructions can be formed by natural fibers or synthesized fibers; webs and nonwovens made from metal fibers or glass fibers; flocked bodies; porous rubbers; resins with numerous small pores formed by micromachining or stretching; fine-machined ceramics; or fine particles and combinations of organic or inorganic materials.

The liquid holding layer 64 is infiltrated with the following transparent liquids 66: esters such as isopropyl myristate, isopropyl palmitate, hexyl laurate, and octyldodecyl myristate; vegetable oils such as corn oil, sunflower oil, palm oil, olive oil, and jojoba oil; alcohols such as ethyl alcohol and benzyl alcohol; and ethylene glycol, propylene glycol, 1,5-pentanediol, glycerin, silicon oil, water, and mixtures of them.

As described previously, the transparent liquid 66 infiltrates into the porous layer 62 by the pressing force of a finger, and a contrast can be obtained by the dimension of the infiltrated portion and the amount of the infiltrating liquid with which the pores are filled. Usually, when a filling ratio to the porous layer 62 is in the range of 40 to 60% of the volume, a light transmittancy changes depending on the filling ratio. Beyond 60% of the volume, the light transmittancy goes into saturation, where the infiltrated portion becomes almost transparent if the difference of the refractive indexes of the porous layer 62 and the transparent liquid 66 is within 0.1.

It is desirable that there is a relation of $\alpha > \beta$, where $\alpha$ is the contact angle between the transparent liquid 66 and the light scatterable porous layer 62 and $\beta$ is the contact angle between the transparent liquid 66 and the liquid holding layer 64. With this relation established, the transparent liquid 66 remains held in the liquid holding layer 64 all the time in a stable state under no pressure, and only when pressing force is applied, the transparent liquid 66 moves to the porous layer 62.

Specifically, changes of pressing force can be regarded as changes of movement to the transparent liquid 66, that is, changes of contrast of the porous layer 62. The porous layer 62 becomes difficult to wet for contact angles of 90 degrees or larger, and becomes wet for contact angles of 90 degrees or smaller. Therefore, in order that the transparent liquid 66 flows smoothly from the porous layer 62 under no pressure, it is desirable that the contact angle a between the transparent liquid 66 and the porous layer 62 is 90 degrees or larger.

Too high repellency arrests smooth infiltration into pores, leaving air gaps and scattering light. Conversely, too small a contact angle arrests perfect removal of the transparent liquid 66 under no pressure. Accordingly, the contact angle β between the transparent liquid 66 and the liquid holding layer 64 must be smaller than 90 degrees so that the transparent liquid 66 is stably held under no pressure. For these reasons, materials must be combined so that a relation of α≧90°>β is satisfied.

An example of materials is a combination of water as the transparent liquid 66, polytetrafluoroethylene (PTFE) (tetrafluoroethylene resin) as the porous layer 62, and nitrocellulose as the liquid holding layer 64.

Herein, examples of methods for improving the wet property are described. Methods for increasing the susceptibility to wetting include: the chemical method of polarizing a material surface by using agents such as concentrated sulfuric acid and potassium bichromate; physical methods such as framing, corona discharging, plasma processing, and surface grafting; and the method of coating transparent liquid with a material having a wet property.

Methods for increasing the resistance to wetting include the chemical method of lowering surface energy by using agents such as fluoric repellents and silicon repellents, and the method of processing the surface to a projection/depression shape or fibriform while taking air in.

Of course, a colored layer or mirror layer may be stacked at the side contacting with a finger, of the light scatterable porous layer 62 or the liquid holding layer 64. This helps to increase the difference of the amount of reflected light between portions where the transparent liquid 66 is moved to the porous layer 62 bypressing force and a light transmittancy is increased, and those where no pressing force is applied.

Sixteenth Embodiment

In the sixteenth embodiment, a description is made of another configuration of a measurement sensor optically capturing finger movements by moving fluid by pressing force. A description of configurations other than the configuration of a measurement sensor 10M, which are the same as those of the fifteenth embodiment, is omitted.

Figure 42:
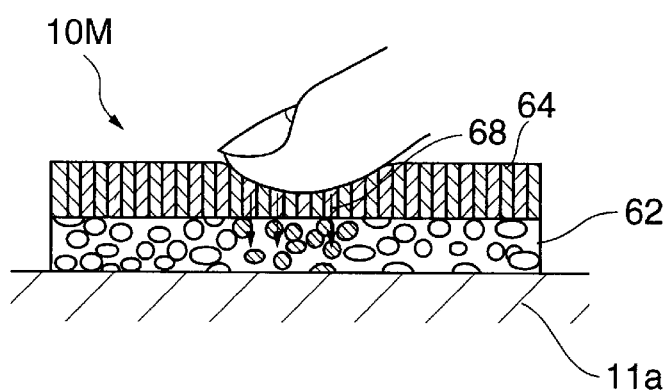
FIG. 42 illustrates a schematic configuration of a measurement sensor of a sixteenth embodiment.

A measurement sensor of the sixteenth embodiment has the same layer structure as the measurement sensor 10L of the fifteenth embodiment but is different from it in coloring principle, as shown in FIG. 42. The porous layer 62 is, e.g. white-colored or milky-colored due to light scattering, and the color of the back layer of the porous layer 62 is usually hidden from view from the back of the button 11a of the mouse 11. The liquid holding layer 64 to hold the colored liquid 68 is provided on top of the porous layer 62.

When pressing force is applied to the measurement sensor 10M thus configured, the portion of the liquid holding layer 64 to which the pressing force is applied contacts the porous layer 62, and the colored liquid 68 pressed out by the pressing force infiltrates from the liquid holding layer 64 into the porous layer 62. The infiltrated portion is colored because pores of the porous layer 62 are filled with the colored liquid 68.

Specifically, as the mouse button 11a is pressed downward, the colored liquid 68 infiltrates gradually from the liquid holding layer 64 to the porous layer 62, the infiltrated portion is colored, the amount of light incident to the light amount detection sensor 46 increases in accordance with the color of the colored liquid 68, and as the finger goes up after clicking, the transparent liquid 66 returns from the porous layer 62 to the colored liquid 68. Accordingly, the colored portion into which the colored liquid 68 infiltrates becomes semitransparent gradually in accordance with finger movements after clicking and the amount of light incident to the light amount detection sensor 46 decreases, so that data having a stable value is ultimately obtained.

It is desirable that the light scatterable porous layer, like the fifteenth embodiment, has a thickness of 5 to 1000 μm, preferably 10 to 100 μm, a porosity of 10 to 85%, and an average pore diameter of 0.01 to 200 μm.

When a colored porous layer is used, although it is desirable that its thickness is 5 to 1000 μm, the pores may be of any shape so long as the lower layer is sufficiently hidden when viewed from an observation direction, and the colored fluid can move, since light does not need to be scattered.

The structures for of layers to achieve such a function include: e.g. the structure of through holes provided randomly or regularly; the structure of fiber bulk aggregates; structures in which linear materials are regularly disposed like fabrics; and three-dimensional mesh structure by high polymers like membrane filters.

The liquid holding layer 64 may, like the forgoing description, be made of any material and may be of any construction so long as it can hold the colored liquid 68 by capillarity and swelling. The materials may be, e.g., gel, porous, web-like, or nonwoven-like.

The colored liquid 68 described in this embodiment is liquid containing one or more types of color materials such as dyes and pigments. The following can be used as media for dispersing color materials: esters such as isopropyl myristate, isopropyl palmitate, hexyl laurate, and octyldodecyl myristate; vegetable oils such as corn oil, sunflower oil, palm oil, olive oil, and jojoba oil; alcohols such as ethyl alcohol and benzyl alcohol; and ethylene glycol, propylene glycol, 1,5-pentanediol, glycerin, silicon oil, water, and mixtures of them.

For the same reason as the fifteenth embodiment, it is desirable that there is a relation of γ>δ, where γ is the contact angle between the colored liquid 68 and the porous layer 62 and δ is the contact angle between the colored liquid 68 and the liquid holding layer 64. By doing so, the colored liquid 68 can be stably held in the liquid holding layer 64 all the time under no pressure.

An example of creating such a layer structure is described below. First, a white porous layer having a thickness of 50 μm, an average pore diameter of 2 μm, and a porosity of 75% was obtained by stretching a tetrafluoroethylene resin (polytetrafluoroethylene (PTFE)) film 100 μm thick.

Next, 40 parts of fibrillated polyethylene (PE) fiber and 60 parts of cellulosic synthetic fiber were mixed and thermally bonded to obtain a liquid holding layer 200 μm thick. The absorption of a colored liquid of the liquid holding layer was dominated by capillary absorption to pores between fibers, with little swelling to the fibers themselves.

Polyethylene (PE) 15 μm thick was laminated on one side of the liquid holding layer by heating and the porous layer described previously was bonded to the other side by heating. Three parts of direct black BH (trade name: Pontamin diazo black (E.I. du Pont de Nemoars and Co.)), 10 parts of glycerin, 3 parts of ethylene glycol, and 84 parts of ion exchange water were agitated and then were pressurized and filtered to obtain a colored liquid.

The contact angle between the colored liquid and the porous layer was 95 degrees. The contact angle with the liquid holding layer could not be measured because of infiltration. The wet property is excellent and obviously 90 degrees or less. The liquid holding layer was infiltrated with the colored liquid and the porous layer was bonded to a transparent button made of polycarbonate the surface of which was processed by a silicon repellent doped with fluorine, via glass beads 30 μm in diameter as spacers for securing an air flow path and a resin 30 μm thick, 1 mm wide shaped in line with the edge of the porous layer.

When a measurement sensor thus created was pressed with a finger at the liquid holding layer, it was observed from the button back that black liquid infiltrated into the white porous layer in accordance with pressing force and a press area.

Seventeenth Embodiment

In the sixteenth embodiment, a description is made of another configuration of a measurement sensor optically capturing finger movements by moving fluid by pressing force. A description of configurations other than the configuration of a measurement sensor 10P, which are the same as those of the eleventh embodiment, is omitted.

Figure 43:
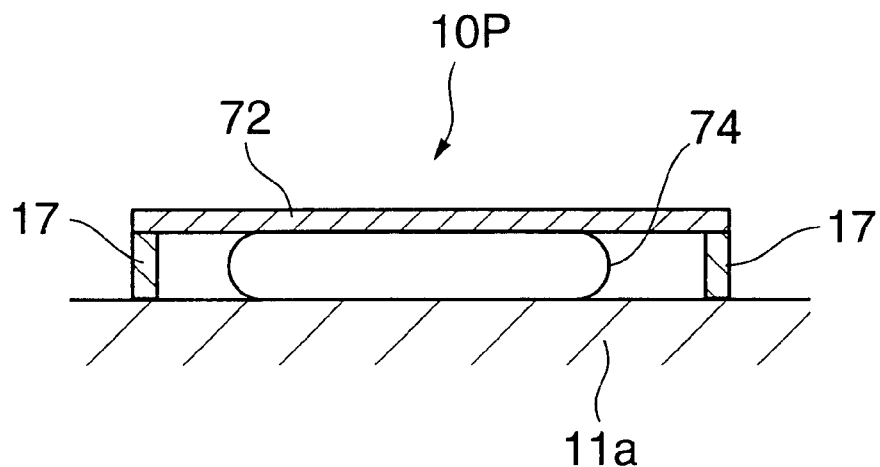
FIG. 43 illustrates a schematic configuration of a measurement sensor of a seventeenth embodiment.

In the seventeenth embodiment, the button 11a (see FIG. 33) of the mouse 11 is made of a transparent material. The measurement sensor 10P includes a gel layer 74 stacked on the button 11a and a thin-plate elastic layer 72, as shown in FIG. 43.

The elastic layer 72 is supported at a location some distance from the button 11a surface by spacers 17.

The volume of the gel layer 74 is smaller than the volume of a space surrounded by the button 11a surface and the spacers 17 and is usually adjusted to such a volume so as to bridge the elastic layer 72 and the button 11a surface. To minimize its surface energy, the gel layer 74 is, due to surface tension, crushed into a circular or spherical shape by the elastic layer 72 and the button 11a surface.

The gel layer 74 has a refractive index of approximately 1.3 to 1.7. Specifically, by constructing the gel layer 74 so as to have a different refractive index from that of air, which is approximately 1.0, the path of light incident to the gel layer 74 changes, so that deformations of the gel layer 74 can be recognized by differences of the reflection paths.

The elastic layer 72 may be made of any material that has a thickness enough to maintain strength and elasticity, such as glass, resin, metal, ceramic approximately 10 to 1000 μm thick. It is desirable that the sides of the elastic layer 72, the button 11a surface, and the spacers 17 that contact the gel layer 74 are subjected to repellency processing to prevent spillage and spread of fluid.

In the measurement sensor 10P thus constructed, when the elastic layer 72 is pressed, the elastic layer is distorted, the gel layer 74 spreads by the distorted volume, and the optical properties at the portion change.

Specifically, as the mouse button 11a is pressed downward, the elastic layer 72 is pressed and distorted, and the gel layer 74 spreads gradually and the optical properties at the area change. Consequently, the amount of light incident to the light amount detection sensor 46 decreases by the spread of the gel layer 74, and as the finger goes up after clicking, since the distortion of the elastic layer 72 is eliminated gradually and the gel layer 74 returns to its original shape according to the elimination, the amount of light incident to the light detection sensor 46 increases by the spread of the gel layer 74 and ultimately data having a stable value is obtained.

The gel layer 74 may be colored in dye, pigment, and the like. If colored, the gel layer can be easily measured by changes of the size.

The elastic layer 72 and the gel layer 74 provided in a space surrounded by the button 11a surface and the spacers 17 may be formed as one lump or plural lumps. Use of a liquid layer or a viscous liquid layer in place of the gel layer could bring about the same effect.

Gel may be held by a transparent support layer in place of the spacers 17. In this case, the transparent support layer may be made of resin or glass having a refractive index of approximately 1.3 to 1.9.

An example of creating such a measurement sensor 10P is described below. Herein, a colored liquid layer is substituted for the gel layer 72. First, cylindrical projections 800 μm in diameter, 200 μm high are formed at grid points spaced every 6.0 mm on the button surface made of polycarbonate. Next, spacers made of polyethylene terephthalate (PET) 1.0 mm wide, 400 μm thick were stuck to the button surface along the shape of the button edge.

The spacers were provided with a slit approximately 300 μm wide. The whole button surface was coated approximately 0.003 g cm$^2$with a fluoric repellent (e.g., fluoric polymer poly 111·111-pentadecafluoro-octyl-methacrylate, FC-706 produced by 3M Company) and dried at 60 degrees. On the spacers on the button, a polyethylene terephthalate (PET) film 200 μm thick the back of which was subjected to repellency processing in the same way as the foregoing was stuck to form a cell.

As a colored liquid, approximately 1.6 mm$^3$ of a viscous liquid having high surface tension, ethylene glycol, doped with ablack dye, was contained in the cell. Although the contained colored liquid is a circular lump approximately 2.2 mm in diameter under no pressure, it spreads to approximately 3.5 mm in diameter when pressed with a finger.

In the method of using the deformation of liquid or gel drops by the cell deformation, the liquid or the gel layer 74 may be made transparent without being colored and the transparent button 11a and the wall side of the cell of the elastic layer 72 may be roughly finished to cause light scattering.

Since the refractive index of liquid is usually closer to that of the button 11a and the elastic layer 72, which are solid, than that of gas, according to this configuration, the rough surface of a portion contacting with the liquid or the gel layer 74 appears transparent and a portion not contacting with the liquid or the gel layer 74 appears in milky-color. Hence, this difference may be measured.

In this case, to make the portion made transparent by the refractive index matching easier to measure, it is effective to color the elastic layer 72 or provide a colored layer or a mirror layer at the side different from the transparent roughly finished side of the elastic layer 72. of course, the elastic layer 72 may be colored and a surface of the button 11a may be roughly finished.

Needless to say, with the method of using refractive index matching, it is desired that the refractive index of liquid or the gel layer 74 is almost equal to that of the rough surface of the button 11a, the transparent support layer on the button surface, or the roughly finished elastic layer 72.

That the refractive index of liquid or the gel layer 74 is almost equal to that of the button 11a whose surface is roughly finished, the transparent support layer on the button surface, or the elastic layer 72 means that the difference between the refractive indexes of both is 0.15 or less, preferably 0.1 or less.

The reason that the difference between the refractive indexes of both is 0.15 or less is that, if the difference between the refractive indexes is 0.15 or more, the refractive index of liquid or the gel layer 74, and reflection elements on the button 11a whose surface is roughly finished, the transparent support layer on the button surface, or the interface with the elastic layer 72 would increase, so that permeability would decrease and a sufficient contrast could not be obtained.

An example of combinations of materials when the difference of the refractive indexes of both is 0.15 or less is described below. Suitable materials of the button, the transparent support layer on the button surface, or the elastic layer 72 include, e.g., inorganic glass (refractive index 1.42 or more), polymethylmethacrylate (PMMA) (refractive index 1.49), polycarbonate (PC) (refractive index 1.59), polystyrene (refractive index 1.59), diethylene glycol bisallyl carbonate (PC) (refractive index 1.59), acrylonitrile-styrene copolymer (refractive index 1.57), methylmethacrylate styrene copolymer (refractive index 1.56), and poly 4-methylpentene-1 (TPX) (refractive index 1.466), and the like. The following liquids have a refractive index of 1.3 to 1.6 and can be used: e.g., esters suchas isopropyl myristate, isopropyl palmitate, hexyl laurate, and octyldodecyl myristate; vegetable oils such as corn oil, sunflower oil, palm oil, olive oil, and jojoba oil; alcohols such as ethyl alcohol and benzyl alcohol; and ethylene glycol, propylene glycol, 1,5-pentanediol, glycerin, silicon oil, water, and mixtures of them.

The following can be used as gels: acrylonitrile graft cellulose hydrolysate, polyacrylic acid crosslinking body, polyvinyl alcohol crosslinking body, polyethylene imine crosslinking body, polyhydroxyethyl meta-acrylate crosslinking body, polyvinyl pyrrolidone crosslinking body, and the like.

It is desirable that the contact angle between the elastic layer 72, the button lla, or the wall side of the cell of the transparent support layer on the button, and transparent liquid or colored liquid is 90 degrees or larger. If the wet property is excellent, liquid flows on the cell surface, disabling response to changes of pressing force. Therefore, in some cases, the surface is improved using a repellent as described previously.

Eighteenth Embodiment

Hereinafter, in eighteenth and nineteenth embodiments, mechanical measurement units are used to detect finger movements. The mechanical measurement units detect changes of physical amounts such as finger pressing force changing with finger movement and finger movement speed, and use them as the reflection of finger movements.

First, in the eighteenth embodiment, finger movements are mechanically captured using a pressure sensor. The mechanical detection is carried out in the same configuration as that of the first embodiment, except for the configuration of a measurement sensor 10R. Details are omitted.

Figure 44:
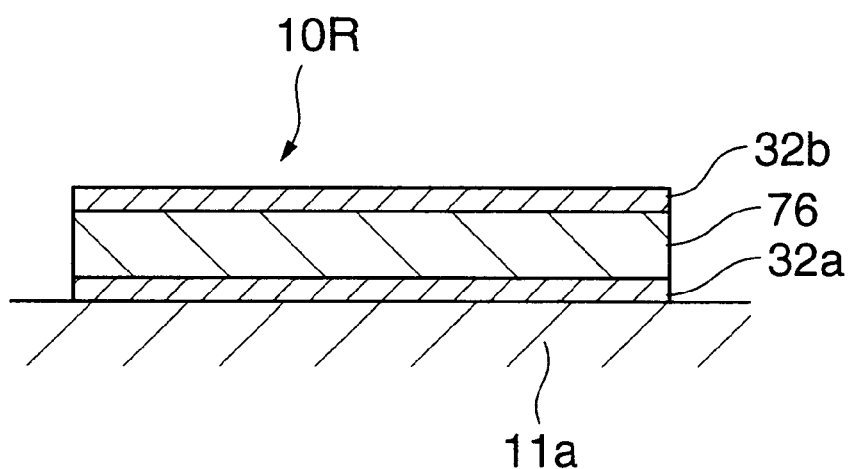
FIG. 44 illustrates a schematic configuration of a measurement sensor of an eighteenth embodiment.

The measurement sensor 10R of the eighteenth embodiment, as shown in FIG. 44, includes the first conductive layer 32a, a pressure sensitive conductive sheet 76, which is a sort of a pressure sensor, and the second conductive layer 32b, stacked on the button 11a of the mouse 11 pressed with a finger surface during clicking. The measurement sensor 10R is formed 1.0 mm or less thick so as not to cause a sense of unpleasantness during pressing.

The first conductive layer 32a and the second conductive layer 32b are made of highly flexible materials such as conductive plastic and silver paste. The pressure sensitive conductive sheet 76 is made of a material produced by dispersing a carbon black, black lead, or conductive metal powders in a silicon rubber or ethylene-propylene rubber (EPM, EPDM), and changes in resistance value per unit area in the thickness direction in accordance with changes of the distance between conductive particles by applied pressure.

Specifically, as the mouse button 11a is pressed downward, since a resistance value per unit area in the thickness direction decreases gradually in accordance with changes of the distance between conductive particles by applied pressure, a pressure value obtained increases. As the finger goes up after clicking, since a resistance value per unit area in the thickness direction increases, a pressure value obtained decreases, so that data having a stable value is ultimately obtained.

With the method of using the pressure sensitive conductive sheet 76, since responses to both the size of a contact area with a finger and contact pressure are sensed, like the electrical resistance measurement and the optical measurement as described above, data reflecting such features as the softness and size of the finger tip is obtained.

In addition to the configuration of using the pressure sensitive conductive sheet 76, a strain gauge (load cell), piezoelectric element, pressure sensitive conductive sheet, pressure sensitive diode, diaphragm (thin-film pressure sensor, diffusion semiconductor pressure sensor), Bourdon tube, bellows differential transformer (torque transducer), torsion bar (optical phase difference method, magnetic phase difference method), crystal pressure sensor, and the like can be used.

Nineteenth Embodiment

In the nineteenth embodiment, with another configuration, finger movements are mechanically captured using a pressure sensor. A description of configurations other than the configuration of a measurement sensor 10S, which are the same as those of the eighteenth embodiment, is omitted.

Figure 45A:
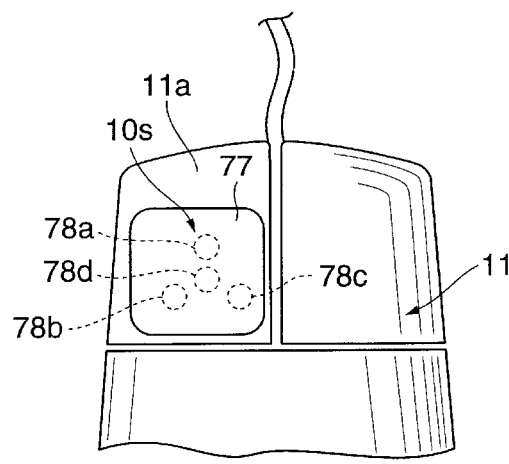
FIG. 45 illustrates a schematic configuration of a measurement sensor of a nineteenth embodiment.
Figure 45B:
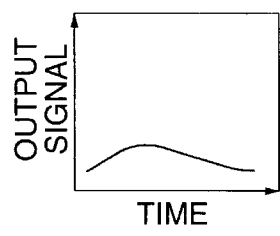
Figure 45C:
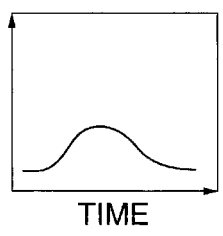
Figure 45D:
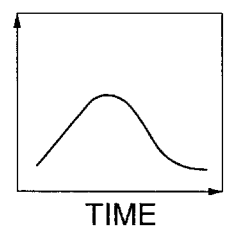
Figure 45E:
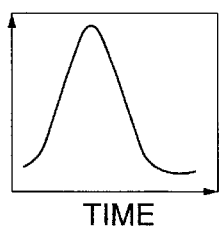

In the measurement sensor 10S of the eighteenth embodiment, as shown in FIG. 45A, on the button 11a of the mouse 11 pressed with a finger surface during clicking, four (first to fourth) strain gauges (load cells) 78a to 78d are provided in the vertexes of an equilateral triangle and its barycenter, and furthermore on top of them, a polyethylene terephthalate (PET) sheet 77 100 μm thick large enough to cover all the sensors is stuck. Pressure applied by finger press operations is detected by each of the first to fourth strain gauges (load cells) 78a to 78d via the polyethylene terephthalate (PET) sheet 77.

In the measurement sensor 10S, since pressing force applied to each of the strain gauges (load cells) 78a a to 78d differs depending on the finger contact position and angle, pressures each having a different strength are detected as shown in FIGS. 45B to 45E. For example, when the center of the finger is at the barycenter of the equilateral triangle, pressure changes (FIG. 45E) of the strain gauge (load cell) 78c at that position are usually the largest and peak pressure is also the largest, and pressure changes detected by the surrounding strain gauges (load cells) 78a to 78c change in accordance with the contact state of the finger with the strain gauges (load cells) 78a to 78d provided around the barycenter of the equilateral triangle.

Pressure changes detected by the four strain gauges (load cells) 78a to 78d are values reflecting button press manners, changes of a contact area between the finger and the measurement sensor 10S, finger movements, finger size and shape, finger softness, and the like, and therefore present data representing individual differences. Accordingly, by capturing individuals' features based on pressure changes detected by the four strain gauges (load cells) 78a to 78d, matching and identification can be performed to determine, regularly or each time a predetermined file is opened, whether a current user is a registered user.

Although strain gauges (load cells) are used here, the following can also be used: a piezoelectric element, pressure sensitive conductive sheet, pressure sensitive diode, diaphragm (thin-film pressure sensor, diffusion semiconductor pressure sensor), Bourdon tube, bellows differential transformer (torque transducer), torsion bar (optical phase difference method, magnetic phase difference method), crystal pressure sensor, and the like.

Although pressure sensors are used here, the same effect can be obtained by a displacement sensor, acceleration sensor, or a combination of them.

As a construction to detect finger movements by a mechanical measurement part, aside from the above-described configurations of the eighteenth and nineteenth embodiments, finger movements can be detected by measuring speed changes of a finger in the vertical direction of a button. In this case, an acceleration sensor of pendulum type (deformations of a thin-film gauge is used) and semiconductor type (piezoresistance effects are used or changes of capacitance are used) may be attached.

Position information in the vertical direction of a button may be read using, e.g., analog output displacement sensors such as capacitance displacement sensors, eddy current displacement sensors, differential transformers, photoelectric displacement sensors, and digital output displacement sensors such as rechargeable linear sensors and magnetic linear sensors.

Particularly, to obtain information reflecting individual differences such as press manners and finger sizes, it is effective to use plural sensors. For example, aside from combining plural sensors of the same type as in the nineteenth embodiment, it is desirable to combine sensors of different types because data reflecting finger movements can be accurately obtained. The plural sensors can efficiently obtain data by providing an elastic sheet on the upper layer, as in the nineteenth embodiment.

Further another method for sensing finger movements is to measure sounds during button operations. In this case, with a microphone incorporated inside or near a button, click and other button operation sounds converted to electrical signals may be picked up to extract physical amounts indicating features reflecting finger movements from the picked-up operation sounds.

Although the microphone may be a conductive microphone, static microphone, magnetic microphone, or piezoelectric microphone, the static microphone and magnetic microphone easy to miniaturize are particularly suitable. The method of measuring sounds can pick up not only sounds generated by a button mechanism during button pressing and clicking, but also rubbing sounds between a finger, and the button or the cabinet surface. The rubbing sounds can also be as individual identification data.

Although a measurement sensor is provided in a mouse in all the above-described embodiments, it may be provided in pointing devices other than a mouse, or a keyboard.

Although the first to nineteenth embodiments assume the use in a personal computer, the invention is applicable, without being limited to personal computers, to all button-operation-oriented constructions such as portable phones and a variety of electrical appliances.

Although, in the above-described embodiments, at least one of features reflecting changes of a contact state between a finger and a side and features reflecting changes of a pressing state between the finger and the side is electrically, optically, or mechanically detected, the present invention is not limited to these embodiments and it may be configured to detect at least one of features reflecting changes of a contact state between a finger and a side and features reflecting changes of a pressing state between the finger and the side by using at least one of electricity, magnetism, light, and pressure.

Although the foregoing description relates to only finger movements, the present invention can apply to a press object for pressing a press subject, as an alternative to a finger. So long as individuals are identified by using the natural features and acquired features of their body as identification information, the present invention may, without being limited to finger movements, be configured so that features may be extracted from values obtained by detecting, as physical amounts, e.g., movements including finger movements and arm movements before and after a button is pressed.

The present invention has the effect of being capable of detecting, as individual identification data, data utilizing information about users' bodies, which disables the fraud of impersonating authorized users, is extremely difficult to forge, and is obtained without the users having a sense of mental resistance, without their bodies being restrained during use, and independent of their mental states and health.

What is claimed is:

1. A detecting apparatus, comprising:
   a pressed member having a side being pressed with a finger; and
   a detector which detects at least one of a first feature reflecting a change of a contact state between the finger and the side and a second feature reflecting a change of a pressing state with the finger against the side, wherein the first and second features represent at least one of a contact area, an irregularity in the contact area, a finger shape, a finger electrical conductivity, a contact force, a contact resistance, a side position with respect to at least one of time, movement speed and finger elasticity.

2. The detecting apparatus according to claim 1, wherein the feature reflecting the change of the contact state is at least one of a contact area changing with time between the finger and the side when the side is pressed, a shape of the contact area, which changes with time, when the side is pressed, and an undulation change with time on a surface of the finger when the side is pressed, and
   the feature reflecting the change of the pressing state is at least one of a pressing force changing with time when the side is pressed, a pressing amount changing with time given to the side when the side is pressed, a change in stress occurring inside of the side when the side is pressed, a change of the speed of finger movement for pressing the side, and a change of a finger position when the side is pressed.

3. The detecting apparatus according to claim 1,
   wherein at least one of the feature reflecting the change of the contact state between the finger and the side, and the feature reflecting the change of the pressing state with the finger against the side is detected by using at least one of electricity, magnetism, light, and pressure.

4. The detecting apparatus according to claim 1, wherein the pressed member comprises a sensing member whose electrical resistance changes in accordance with the change of the contact area between the finger and the side.

5. The detecting apparatus according to claim 4, wherein the pressed member includes a measurement unit comprising an electrode group including at least two electrodes that are formed on the side so that they are electrically disconnected from each other, and are conducted through the finger when the finger contacts the side, and
the detector includes a detection unit that detects voltage changes in the measurement unit.

6. The detecting apparatus according to claim 5, wherein the electrodes are selected from at least one of minute electrodes, linear electrodes, ring electrodes, and circular electrodes.

7. The detecting apparatus according to claim 5, wherein the electrode group comprises an electrode disposed on the side and one or more electrodes disposed so as to surround the electrode.

8. The detecting apparatus according to claim 5, wherein the electrode group comprises a circular electrode provided on the side and a ring electrode whose inside circumferential shape is elliptic, provided so as to surround the circular electrode, wherein the center of the elliptic inside circumferential shape of the ring electrode is off the center of the circular electrode.

9. The detecting apparatus according to claim 5, wherein the area covered by the entire electrode group is larger than the area of the pressed side that is in contact with the finger.

10. The detecting apparatus according to claim 5, wherein the measurement unit comprises an electrode protection layer on the electrode group, which keeps the electrode group disconnected when no pressing force is applied, and brings the electrode group into conduction in accordance with the contact state of the finger when pressing force is applied.

11. The detecting apparatus according to claim 1, further comprising:
a measurement unit, disposed on the pressed member, having one ore more non-insulation layers each including at least one resistance layer and two conductive layers sandwiching the non-insulation layer; and
a detection unit provided in the detector, which detects a change of electrical resistance of the measurement unit.

12. The detecting apparatus according to claim 11, wherein the pressed member has elasticity.

13. The detecting apparatus according to claim 12, wherein the side of the pressed member has a knurled surface that changes in the contact area with the finger in accordance with the change of the pressing force.

14. The detecting apparatus according to claim 11, wherein at least one of the non-insulation layers is a fluid layer.

15. The detecting apparatus according to claim 11, wherein the non-insulating layer comprises at least two resistance layers whose contact resistance changes in accordance with the change of contact pressure.

16. The detecting apparatus according to claim 1, wherein the pressed member comprises a sensing member whose capacitance changes in accordance with the change of the contact area between the finger and the side.

17. The detecting apparatus according to claim 16, wherein the pressed member includes a measurement unit comprising:
an elastic dielectric layer;
a first conductive layer provided at a pressed position changing in accordance with a finger pressing state, on the surface of which the dielectric layer is provided; and
a second conductive layer provided at a position other than the pressed position, where a hand contacts when a finger presses, and
the detector includes a detection unit that detects capacitance of the measurement unit.

18. The detecting apparatus according to claim 16, wherein the pressed member includes a measurement unit comprising:
an elastic dielectric layer; and
two conductive layers stacked on the side with the dielectric layer sandwiched therebetween, and
the detector includes a detection unit that detects capacitance of the measurement unit.

19. The detecting apparatus according to claim 18, wherein one of the conductive layers that contacts the finger is elastic.

20. The detecting apparatus according to claim 18, wherein the dielectric layer is fluid.

21. The detecting apparatus according to claim 18, wherein, among the two conductive layers, the conductive layer contacting the finger is divided into plural portions, and the detection unit detects capacitance of each of the plural divided portions of the conductive layer in association with its position.

22. The detecting apparatus according to claim 1, wherein the pressed member comprises a sensing member which changes in an amount of transmitting light in accordance with changes of a contact area between the finger and the side.

23. The detecting apparatus according to claim 22, wherein
the pressed member further comprises a measured unit made of a light-permeable material,
the detecting apparatus further comprises an illuminating part that illuminates the measured unit from the side being pressed, and
the detector comprises a detection unit that detects reflected light from the measured unit.

24. The detecting apparatus according to claim 23, wherein the measured unit comprises a prism.

25. The detecting apparatus according to claim 23, wherein the measured unit comprises a semitransparent layer at least one side of which has a rough surface that causes light scattering.

26. The detecting apparatus according to claim 25, wherein the semitransparent layer has elasticity.

27. The detecting apparatus according to claim 25, wherein the measured unit further comprises a transparent, elastic layer, provided below the semitransparent layer, which has a refractive index almost equal to that of the semitransparent layer.

28. The detecting apparatus according to claim 25, wherein the measured unit further comprises at least one of a colored layer and a total reflection mirror layer that deforms in accordance with a finger pressing state.

29. The detecting apparatus according to claim 23, wherein the measured unit comprises a porous layer made of an elastic, light permeable material.

30. The detecting apparatus according to claim 29, wherein the porous layer contains a liquid that has a refractive index almost equal to that of the porous layer.

31. The detecting apparatus according to claim 29, wherein the measured unit further comprises a colored layer or a mirror layer that deforms in accordance with a finger pressing state.

32. The detecting apparatus according to claim 23, wherein the measured unit comprises a first porous layer made of a light permeable material and a second porous layer having plural pores, provided on the first porous layer, and one of the first and second porous layers holds a liquid and at least one of the layers is elastic.

33. The detecting apparatus according to claim 32, wherein the liquid has a refractive index almost equal to that of the first porous layer.

34. The detecting apparatus according to claim 32, wherein there is a relation of $\alpha>\beta$, where $\alpha$ is the contact angle between the liquid and the layer holding the liquid and $\beta$ is the contact angle between the liquid and the other layer not holding the liquid.

35. The detecting apparatus according to claim 32, wherein the contact angle $\alpha$ between the liquid and the layer holding the liquid is 90 degrees or larger and the contact angle $\beta$ between the liquid and the layer not holding the liquid is 90 degrees or smaller.

36. The detecting apparatus according to claim 32, wherein the measured unit further comprises a colored layer or a mirror layer that deforms in accordance with a finger pressing state.

37. The detecting apparatus according to claim 32, wherein the liquid is a colored liquid.

38. The detecting apparatus according to claim 23, wherein the measured unit comprises:

a flat plate material to form the side being pressed;

a viscous fluid provided below the flat plate material; and a holding unit holding the viscous fluid within a space formed between the viscous fluid and the flat plate material, the space having a volume larger than that of the viscous fluid.

39. The detecting apparatus according to claim 38, wherein at least one of the side of the flat plate which is in contact with the viscous fluid and the side of the holding unit which is in contact with the viscous fluid has a rough surface that scatters light.

40. The detecting apparatus according to claim 38, wherein the viscous fluid is a colored fluid or a colored gel material.

41. The detecting apparatus according to claim 38, wherein the flat plate material is elastic.

42. The detecting apparatus according to claim 38, wherein the flat plate material comprises a colored layer or a mirror layer that deforms in accordance with a finger pressing state.

43. The detecting apparatus according to claim 38, wherein the flat plate material is colored.

44. The detecting apparatus according to claim 38, wherein the refractive index of the viscous fluid is almost equal to that of the flat plate material or the holding unit.

45. The detecting apparatus according to claim 38, wherein both the contact angle between the flat plate material and the viscous fluid and the contact angle between the viscous fluid and the holding unit are approximately 90 degrees or larger.

46. The detecting apparatus according to claim 1, wherein the pressed member comprises a member which detects changes of applied pressure.

47. The detecting apparatus according to claim 1, wherein the pressed member comprises a member which detects a finger speed.

48. The detecting apparatus according to claim 1, wherein the pressed member comprises a member which detects a change in spatial movement of the finger.

49. An input apparatus comprising a detecting apparatus recited in claim 1.

50. A pointing device having an indication unit that gives indications to a connected equipment when pressing force is applied with a finger, the indication unit being provided with a detector of the detecting apparatus recited in claim 1.

* * * * *